US012598094B2

(12) United States Patent
Lee et al.

(10) Patent No.: US 12,598,094 B2
(45) Date of Patent: Apr. 7, 2026

(54) HOME APPLIANCE, AND METHOD FOR OUTPUTTING INFORMATION ABOUT HOME APPLIANCE

(71) Applicant: Samsung Electronics Co., Ltd., Suwon-si (KR)

(72) Inventors: Jaechan Lee, Suwon-si (KR); Jongwon Park, Suwon-si (KR); Jaegeun Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 18/397,819

(22) Filed: Dec. 27, 2023

(65) Prior Publication Data

US 2024/0129155 A1     Apr. 18, 2024

Related U.S. Application Data

(63) Continuation of application No. PCT/KR2022/011146, filed on Jul. 28, 2022.

(30) Foreign Application Priority Data

Aug. 13, 2021     (KR) ........................ 10-2021-0107623

(51) Int. Cl.
*H04L 12/28* (2006.01)
*H04W 76/10* (2018.01)

(52) U.S. Cl.
CPC ...... *H04L 12/2807* (2013.01); *H04L 12/2827* (2013.01); *H04W 76/10* (2018.02)

(58) Field of Classification Search
CPC ... H04L 12/282; H04L 67/12; H04L 12/2803; H04L 2012/285; H04L 69/26;
(Continued)

(56) References Cited

U.S. PATENT DOCUMENTS 7,383,644 B2 *   6/2008   Lyu ......................... D06F 29/00
                                                        34/596
7,844,680 B2 *  11/2010   Ha ......................... H04L 12/403
                                                        709/208
(Continued)

FOREIGN PATENT DOCUMENTS

CN          108401013 A      8/2018
KR    10-2005-0014628 A      2/2005
(Continued)

OTHER PUBLICATIONS

International Search Report and Written Opinion of the International Searching Authority dated Oct. 26, 2022 in connection with International Application No. PCT/KR2022/011146, 15 pages.

*Primary Examiner* — Djenane M Bayard

(57) ABSTRACT

A method, for outputting information related to a second home appliance. The method includes: obtaining group information for grouping the first home appliance and the second home appliance by assigning the first home appliance as an assistant device and assigning the second home appliance as an actually used device; activating a group mode for operating the first home appliance as an assistant device of the second home appliance, based on the group information; controlling a communication interface to receive information related to operations of the second home appliance from the second home appliance assigned as the actually used device, through a communication channel established based on communication connection information of the second home appliance, the communication channel to connect to the second home appliance; and outputting the information related to the operations of the second home appliance through a first user interface, while the group mode is activated.

20 Claims, 28 Drawing Sheets

(58) Field of Classification Search

CPC ............. H04L 67/10; H04L 2012/2841; H04L 12/2825; H04L 12/2818; H04L 12/2827; H04L 67/125; H04L 12/2807; H04L 12/2816; H04L 63/20; H04L 12/2823; H04L 12/2832; H04L 12/2809; H04L 12/2814; H04L 12/281; H04L 67/025; H04L 63/105; H04L 63/10; H04L 67/1097; H04L 69/329; H04L 2012/2849; H04L 63/0853; H04L 67/1001; H04L 67/34; H04L 63/102; H04L 67/51; H04L 63/08; H04L 67/01; H04L 9/40; H04L 12/2829; H04L 41/12; H04L 63/0428; H04L 12/6418; H04L 67/1068; H04L 12/10; H04L 63/062; H04L 63/1425; H04L 67/02; H04L 1/1896; H04L 5/0055; H04L 61/4511; H04L 63/1416; H04L 67/55; H04L 63/0272; H04L 67/56; H04L 63/166; H04L 12/4641; H04L 47/2441; H04L 47/24; H04L 63/0281; H04L 63/168; H04L 69/16; H04L 43/16; H04L 69/326; H04L 43/0852; H04L 43/10; H04L 69/40; H04L 63/0823; H04L 43/0829; H04L 61/2514; H04L 61/5007; H04L 67/568; H04L 45/24; H04L 47/2433; H04L 47/6215; H04L 67/141; H04L 67/563; H04L 43/0894

See application file for complete search history.

(56) References Cited

U.S. PATENT DOCUMENTS

| | | | |
|---|---|---|---|
| 8,150,986 B2 | 4/2012 | Baek et al. | |
| 10,787,762 B2 | 9/2020 | Choung | |
| 2004/0117068 A1* | 6/2004 | Lee | H04L 12/282 |
| | | | 700/275 |
| 2004/0158333 A1* | 8/2004 | Ha | H04L 61/5038 |
| | | | 709/208 |
| 2005/0184852 A1* | 8/2005 | Lee | G05B 15/02 |
| | | | 340/3.1 |
| 2005/0232301 A1 | 10/2005 | Lee et al. | |
| 2014/0172123 A1 | 6/2014 | Lee et al. | |
| 2016/0092066 A1 | 3/2016 | Jeon | |
| 2016/0182705 A1 | 6/2016 | Lee et al. | |
| 2020/0024784 A1* | 1/2020 | Yoon | D06F 34/00 |
| 2020/0106635 A1* | 4/2020 | Yoon | H04L 12/282 |
| 2021/0067622 A1 | 3/2021 | Park et al. | |
| 2021/0234712 A1 | 7/2021 | Yang et al. | |

FOREIGN PATENT DOCUMENTS

| | | | |
|---|---|---|---|
| KR | 10-2005-0014785 A | 2/2005 | |
| KR | 10-0624791 B1 | 9/2006 | |
| KR | 10-0638208 B1 | 10/2006 | |
| KR | 10-2014-0077489 A | 6/2014 | |
| KR | 10-2015-0092873 A | 8/2015 | |
| KR | 10-1563223 B1 | 10/2015 | |
| KR | 10-2016-0028740 A | 3/2016 | |
| KR | 10-2016-0037664 A | 4/2016 | |
| KR | 10-2016-0074129 A | 6/2016 | |
| KR | 10-1879762 B1 | 7/2018 | |
| KR | 10-1884351 B1 | 8/2018 | |
| KR | 10-2019-0059419 A | 5/2019 | |
| KR | 10-2019-0092329 A | 8/2019 | |
| KR | 10-2366699 B1 | 2/2022 | |

* cited by examiner

FIG. 2

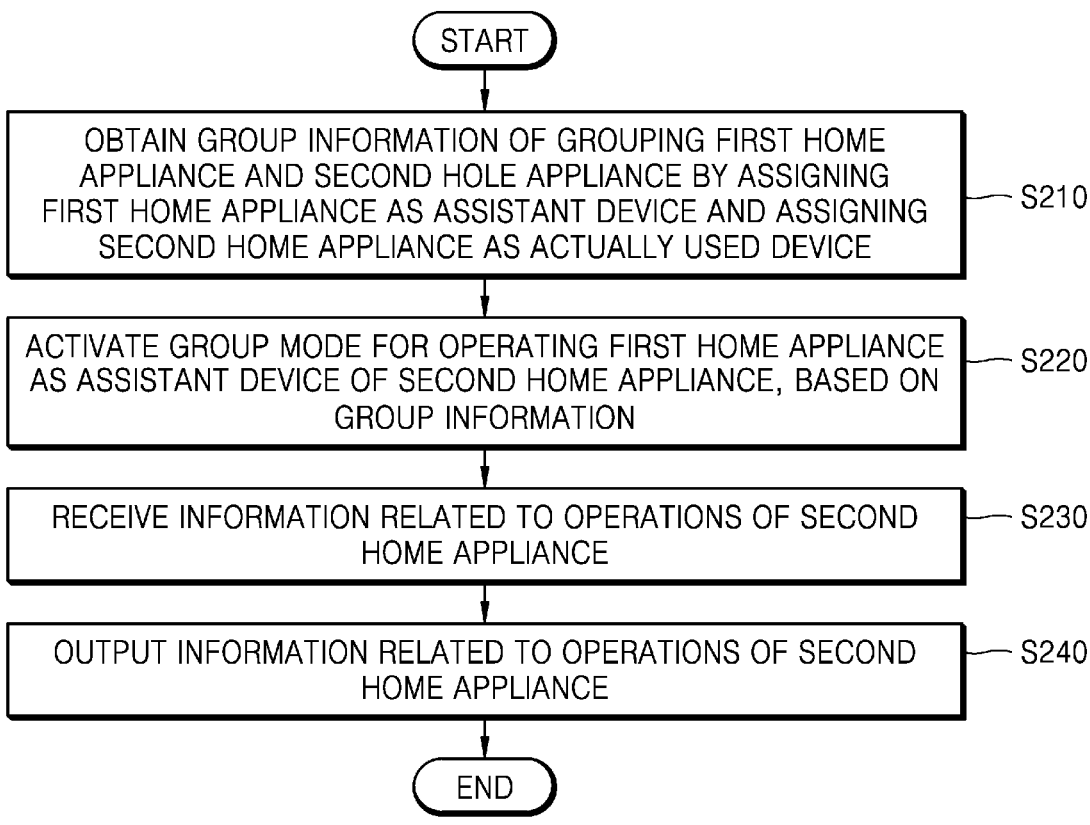

START

OBTAIN GROUP INFORMATION OF GROUPING FIRST HOME APPLIANCE AND SECOND HOLE APPLIANCE BY ASSIGNING FIRST HOME APPLIANCE AS ASSISTANT DEVICE AND ASSIGNING SECOND HOME APPLIANCE AS ACTUALLY USED DEVICE — S210

ACTIVATE GROUP MODE FOR OPERATING FIRST HOME APPLIANCE AS ASSISTANT DEVICE OF SECOND HOME APPLIANCE, BASED ON GROUP INFORMATION — S220

RECEIVE INFORMATION RELATED TO OPERATIONS OF SECOND HOME APPLIANCE — S230

OUTPUT INFORMATION RELATED TO OPERATIONS OF SECOND HOME APPLIANCE — S240

END

FIG. 7B 2500                    2510

Figure 7B:
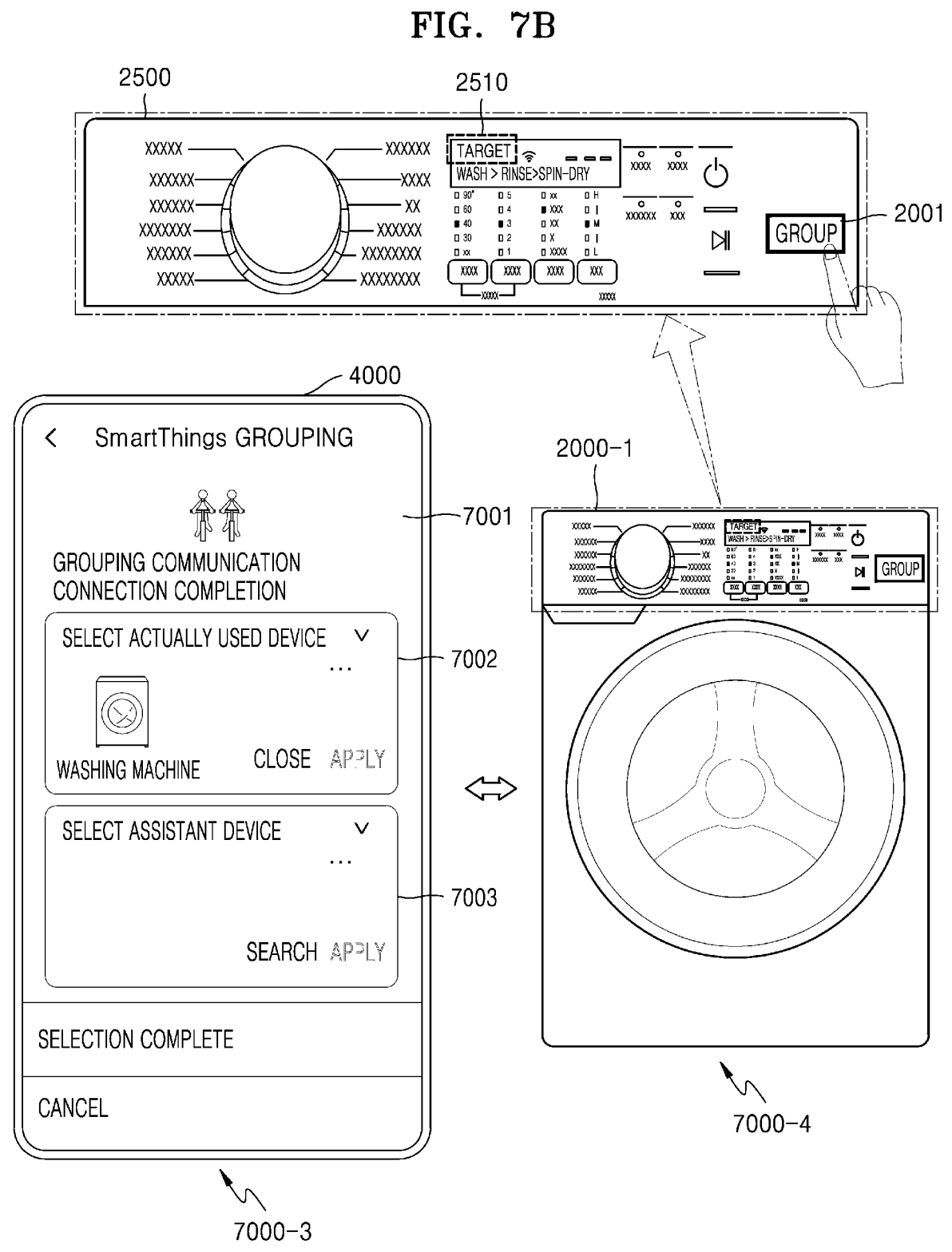

TARGET
WASH > RINSE>SPIN-DRY

GROUP — 2001

4000

< SmartThings GROUPING

GROUPING COMMUNICATION
CONNECTION COMPLETION — 7001

SELECT ACTUALLY USED DEVICE   ∨
...                                      — 7002

WASHING MACHINE    CLOSE  APPLY

SELECT ASSISTANT DEVICE   ∨
...                                      — 7003

SEARCH  APPLY

SELECTION COMPLETE

CANCEL 7000-3

2000-1

TARGET
WASH > RINSE>SPIN-DRY

GROUP 7000-4

HOME APPLIANCE, AND METHOD FOR OUTPUTTING INFORMATION ABOUT HOME APPLIANCE

CROSS-REFERENCE TO RELATED APPLICATIONS

This application is a Bypass Continuation of International Application No. PCT/KR2022/011146, filed Jul. 28, 2022, which claims priority to Korean Patent Application No. 10-2021-0107623, filed Aug. 13, 2021, the disclosures of which are herein incorporated by reference in their entirety.

BACKGROUND

1. Field

Embodiments of the present disclosure relate to a home appliance, a method of outputting information about a home appliance, and a system for grouping home appliances. More particularly, embodiments of the present disclosure relate to a system for grouping home appliances into an assistant device and an actually used device, and monitoring or controlling the actually used device through the assistant device.

2. Description of Related Art

Most general electric home appliances are fixed to installation places and may be arranged at a corner of a house, depending on an electric home appliance. Accordingly, when a user is to control a general electric home appliance or monitor an operating state thereof, there is inconvenience in that the user needs to personally move to the location of the electric home appliance.

Also, for the user to control an electric home appliance by using a smartphone, the smartphone and the electric home appliance need to access a Wi-Fi router (e.g., an access point (AP)). When a wireless environment (e.g., wireless signal quality) is poor according to the location of the Wi-Fi router (AP), it may be difficult to control and monitor the electric home appliance and there is inconvenience in that the user may need to always carry the smartphone.

Accordingly, a system for the user to conveniently monitor and control electric home appliances is required.

SUMMARY

A method, performed by a first home appliance, of outputting information related to a second home appliance, according to an embodiment of the present disclosure, includes obtaining group information for grouping the first home appliance and the second home appliance by assigning the first home appliance as an assistant device and assigning the second home appliance as an actually used device, activating a group mode for operating the first home appliance as an assistant device of the second home appliance, based on the group information, receiving information related to operations of the second home appliance from the second home appliance assigned as the actually used device, through a communication channel established based on communication connection information of the second home appliance, the communication channel for being connected to the second home appliance, and outputting the information related to the operations of the second home appliance, in the group mode.

A first home appliance according to an embodiment of the present disclosure includes a communication interface configured to communicate with the second home appliance, a first user interface configured to output the information related to the second home appliance, a memory storing one or more instructions, and at least one processor. The at least one processor of the first home appliance, according to an embodiment of the present disclosure, is configured to execute the one or more instructions to assign the first home appliance as an assistant device. The at least one processor is configured to execute the one or more instructions to obtain group information for grouping the first home appliance and the second home appliance by assigning the second home appliance as an actually used device. The at least one processor is configured to execute the one or more instructions to activate a group mode for operating the first home appliance as an assistant device of the second home appliance, based on the group information. The at least one processor is configured to execute the one or more instructions to control the communication interface to receive information related to operations of the second home appliance from the second home appliance assigned as the actually used device, through a communication channel established based on communication connection information of the second home appliance, the communication channel for being connected to the second home appliance. The at least one processor is configured to execute the one or more instructions to, in the group mode, output the information related to the operations of the second home appliance through the first user interface.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates a method by which a first home appliance outputs information related to a second home appliance, according to an embodiment of the present disclosure.

FIG. 7B illustrates an operation of grouping a first home appliance and a second home appliance through a mobile terminal, according to an embodiment of the present disclosure.

DETAILED DESCRIPTION

Figure 1:
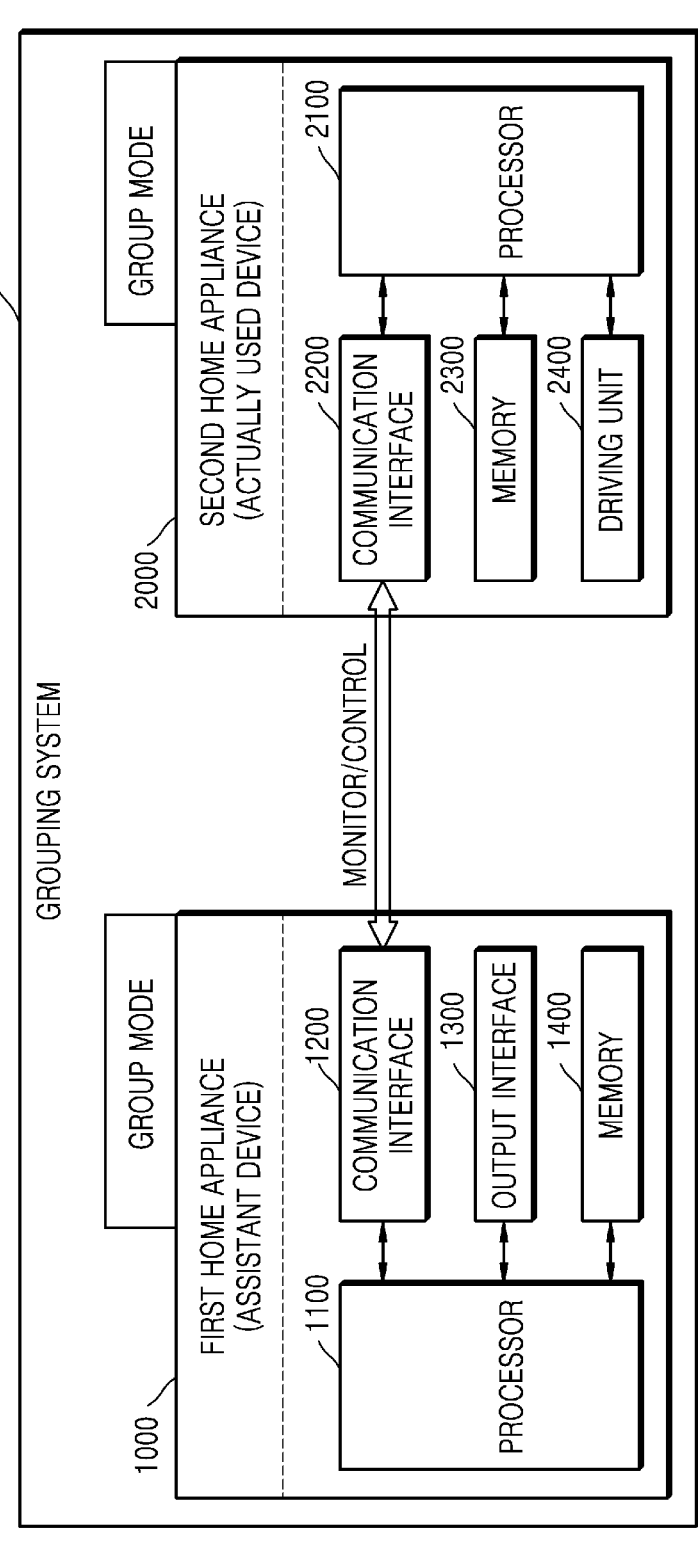
FIG. 1 illustrates a grouping system according to an embodiment of the present disclosure.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the present disclosure will be briefly defined, and an embodiment of the present disclosure will be described in detail.

All terms including descriptive or technical terms which are used herein should be construed as having meanings that are understood by one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of an embodiment of the present disclosure. Thus, the terms used herein have to be defined based on the meaning of the terms together with the description throughout the specification.

When a part "includes" or "comprises" an element, unless there is a particular description contrary thereto, the part may further include other elements, not excluding the other elements. In addition, terms such as "unit (-er/or)" and "module" described in the present disclosure denote a unit that processes at least one function or operation, which may be implemented in hardware or software, or implemented in a combination of hardware and software.

Throughout the present disclosure, the expression "at least one of a, b or c" indicates only a, only b, only c, both a and b, both a and c, both b and c, all of a, b, and c, or variations thereof.

Hereinafter, an embodiment of the present disclosure will be described in detail with reference to the accompanying drawings such that one of ordinary skill in the art may easily implement the embodiment of the present disclosure. However, the present disclosure may be implemented in various different forms and is not limited to an embodiment described herein. Also, in the drawings, parts irrelevant to the description are omitted in order to clearly describe an embodiment of the present disclosure, and like reference numerals designate like elements throughout the specification.

FIG. 1 illustrates a grouping system 100 according to an embodiment of the present disclosure.

Referring to FIG. 1, the grouping system 100 according to an embodiment of the present disclosure is a system for grouping a first home appliance 1000 and a second home appliance 2000, which are located inside a house, and may include the first home appliance 1000 and the second home appliance 2000. However, not all of the components shown are essential components. The grouping system 100 may be implemented by more components than those illustrated or the grouping system 100 may be implemented by fewer components than those illustrated. For example, the grouping system 100 may include the first home appliance 1000, the second home appliance 2000, and a server device (not shown) or may include the first home appliance 1000, the second home appliance 2000, and a mobile terminal (not shown).

According to an embodiment of the present disclosure, the first home appliance 1000 and the second home appliance 2000 may be various types of home appliances located inside the house. For example, each of the first home appliance 1000 and the second home appliance 2000 may be a washing machine, a dryer, an air purifier, a refrigerator, an air conditioner, an audio device, an induction heater (an electric range), a clothes care machine, a television (TV), a dishwasher, an oven, a microwave, an air fryer, an automatic feeder for pets, a water purifier, a lighting device, or a bidet, but is not limited thereto. According to an embodiment of the present disclosure, the first home appliance 1000 and the second home appliance 2000 may be located at different spaces inside the house. For example, the first home appliance 1000 may be located at an isolated space (e.g., a balcony) and the second home appliance 2000 may be located at a space where a user often stays (e.g., a living room or a kitchen), but are not limited thereto. The first home appliance 1000 may be located in a kitchen and the second home appliance 2000 may be located in a bathroom.

According to an embodiment of the present disclosure, in the grouping system 100, the first home appliance 1000 may be assigned as an assistant device and the second home appliance 2000 may be assigned as an actually used device, according to the user's input. Here, the first home appliance 1000 and the second home appliance 2000 may operate according to respective roles in a group, when a group mode is executed (activated). For example, the first home appliance 1000 may perform a role as an assistant device of the second home appliance 2000 and the second home appliance 2000 may perform a role as an actually used device.

According to an embodiment of the present disclosure, the role as the assistant device may be monitoring the actually used device by receiving, from the actually used device, and outputting information related to the actually used device. Also, the role as the assistant device may be controlling the actually used device by transmitting, to the actually used device, a control command related to the actually used device, when the control command is input.

The role of the actually used device may be performing original functions, and at the same time, transmitting information related to a present operating state to the assistant device. Alternatively, the role of the actually used device may be performing an operation corresponding to the control command when the control command is received from the assistant device.

Hereinafter, an example in which the first home appliance 1000 operates as the assistant device and the second home appliance 2000 operates as the actually used device in the group will be mainly described.

The first home appliance 1000 operating as the assistant device may include a processor 1100, a communication interface 1200, an output interface 1300, and a memory 1400. Each component will be described below.

The processor 1100 controls all operations of the first home appliance 1000. For example, the processor 1100 may execute programs stored in the memory 1400 to control the communication interface 1200, the output interface 1300, and the memory 1400.

The communication interface 1200 may include a communication interface for performing communication with an external device. The communication interface 1200 may include one or more components enabling communication between the first home appliance 1000 and the second home appliance 2000, between the first home appliance 1000 and the server device (not shown), and between the first home appliance 1000 and the mobile terminal (not shown). For example, the communication interface 1200 may include a short-range communication interface (short-range wireless communication interface) for performing communication between home appliances in the house, a long-range communication interface for accessing an external network, and the like.

According to an embodiment of the present disclosure, the communication interface 1200 may include a Bluetooth communication interface, a Bluetooth low energy (BLE) communication interface, a short-range wireless communication interface (near field communication (NFC) interface), a wireless local area network (WLAN) (Wi-Fi) communication interface, a Zigbee communication interface, a Z-wave communication interface, an infrared data association (IrDA) communication interface, a Wi-Fi direct (WFD) (Wi-Fi peer-to-peer (PSP)) communication interface, an ultra-wideband (UWB) communication interface, and an Ant+ communication interface, but is not limited thereto. For example, the communication interface 1200 may include the Internet, a computer network (e.g., LAN or wide area network (WAN)), and a mobile communication interface. The mobile communication interface may include a 3rd generation (3G) circuit, a 4th generation (4G) circuit, a 5th generation (5G) circuit, a long-term evolution (LTE) circuit, a node B (NB)-Internet of things (IoT) circuit, an LTE-machine type communication (LTE-M) circuit, but is not limited thereto.

According to an embodiment of the present disclosure, when the group mode is activated, the communication interface 1200 may receive, from the second home appliance 2000, information related to an operating state of the second home appliance 2000. The communication interface 1200 may transmit, to the second home appliance 2000, a control command for the second home appliance 2000, input from a user. Meanwhile, when grouping with the second home appliance 2000 is not completed or the grouping is released, the communication interface 1200 may receive, from the second home appliance 2000, the server device (not shown), or the mobile terminal (not shown), information for grouping with the second home appliance 2000. An operation of grouping the first home appliance 1000 and the second home appliance 2000 will be described in detail below.

The output interface 1300 is for outputting a video signal or an audio signal. The output interface 1300 may include a display, an audio output interface, and a vibration motor.

When the display is configured as a touch screen by forming a layer structure with a touch pad, the display may be used as an input interface as well as an output interface. The display may include a liquid crystal display, a thin-film transistor-liquid crystal display, an organic light-emitting diode, a flexible display, a 3-dimensional (3D) display, or an electrophoretic display. Also, according to an embodiment of the first home appliance 1000, the first home appliance 1000 may include two or more displays.

According to an embodiment of the present disclosure, the display may output information related to original functions of the first home appliance 1000 or may output information related to an operating state of the second home appliance 2000. For example, when the first home appliance 1000 operates as an assistant device of the second home appliance 2000, the display may display the information related to the operating state of the second home appliance 2000, received from the second home appliance 2000. Here, the display may display a graphical user interface (GUI) of the first home appliance 1000 and a GUI of the second home appliance 2000 together on one screen or may alternately display the GUI of the first home appliance 1000 and the GUI of the second home appliance 2000.

The audio output interface may output an audio signal received through the communication interface 1200 or stored in the memory 1400. The audio output interface may include a speaker, a bell, and a buzzer, but is not limited thereto. According to an embodiment of the present disclosure, the audio output interface may output an audio signal (e.g., notification sound or guide voice) related to a function performed in the first home appliance 1000. Also, when the group mode is activated, the audio output interface may output an audio signal (e.g., notification sound, termination sound, or an error message) related to an operation of the second home appliance 2000.

According to an embodiment of the present disclosure, the output interface 1300 of the first home appliance 1000 may include one from among the display and the audio output interface.

The output interface 1300 may further include a lighting device (e.g., a light-emitting diode (LED), an LED bar, or a 7-segment display device including LEDs). For example, when the group mode is activated, the output interface 1300 may use an LED lamp to output the information related to the operating state of the second home appliance 2000. The 7-segment display device may include, in addition to the LED, a cathode discharge tube, a vacuum tube, a liquid crystal display (LCD), or a mechanical display.

In the present disclosure, the output interface 1300 and a user input interface (not shown) may be integrally referred to as a user interface. For example, the user interface may include the output interface 1300 and the user input interface. Hereinafter, the user interface of the first home appliance 1000 may be referred to as a first user interface and a user interface of the second home appliance 2000 may be referred to as a second user interface.

According to an embodiment of the present disclosure, in the group mode, the first home appliance 1000 may output the information related to the operations of the second home appliance 2000 through the first user interface. For example, the first home appliance 1000 may obtain information about the second user interface corresponding to the second home appliance 2000, and display the GUI of the second home appliance 2000 on the first user interface, based on the information about the second user interface.

The memory 1400 may store a program for processes and controls by the processor 1100, or may store pieces of input/output data (e.g., role information in a group, identification information of the second home appliance 2000, communication connection information of the second home appliance 2000, and operating state information of the second home appliance 2000).

The memory 1400 may include at least one type of storage medium among a flash memory type, a hard disk type, a multimedia card micro type, a card type memory (for example, a secure digital (SD) or an extreme digital (XD) memory), a random access memory (RAM), a static RAM (SRAM), a read-only memory (ROM), an electrically erasable programmable ROM (EEPROM), a programmable ROM (PROM), a magnetic memory, a magnetic disk, and an optical disk. The programs stored in the memory 1400 may be classified into a plurality of modules depending on functions. The memory 1400 may store at least one artificial intelligence model.

Meanwhile, the first home appliance 1000 may be implemented by more components than those illustrated in FIG. 1 or the first home appliance 1000 may be implemented by fewer components than those illustrated in FIG. 1. For example, according to an embodiment, the first home appliance 1000 may further include, in addition to the processor 1100, the communication interface 1200, the output interface 1300, and the memory 1400, a user input interface (not shown), a driving circuit (not shown), a power supply circuit (not shown), and a sensor circuit (not shown). For example, when the first home appliance 1000 is an air purifier, the first home appliance 1000 may include a blowing circuit and a filter circuit as the driving circuit, and may include a fine dust sensor, a gas sensor, and a humidity sensor as the sensor circuit. When the first home appliance 1000 is a cleaning robot, the first home appliance 1000 may include an image sensor, an infrared sensor, an ultrasonic sensor, a lidar sensor, and an obstacle sensor (3D obstacle sensor) as the sensor circuit, and may include a mobile assembly and a cleaning assembly as the driving circuit.

The user input interface (not shown) is an input interface for receiving an input from the user. The user input interface may include a key pad, a dome switch, a touch pad (contact capacitance type, pressure resistive type, an infrared detection type, surface ultrasonic wave conduction type, integral tension measuring type, piezo-effect type, or the like), a jog wheel, a jog switch, or a remote control device (remote controller), but is not limited thereto.

The user input interface may include a speech recognition module. For example, the first home appliance 1000 may receive a speech signal that is an analog signal through a microphone, and convert a speech portion into computer-readable text by using an automatic speech recognition (ASR) model. The first home appliance 1000 may interpret the text by using a natural language understanding (NLU) model and obtain an utterance intention of the user. Here, the ASR model and the NLU model may be an artificial intelligence model. The artificial intelligence model may be processed by an artificial intelligence dedicated processor designed in a hardware structure specialized for processing of an artificial intelligence model. The artificial intelligence model may be generated via training. This means that the predefined operation rules or artificial intelligence model set to perform desired characteristics (or purposes) are generated by training a basic artificial intelligence model with a learning algorithm that utilizes a large number of training data. The artificial intelligence model may include a plurality of neural network layers. Each of the neural network layers includes a plurality of weight values, and performs a neural network arithmetic operation via an arithmetic operation between an arithmetic operation result of a previous layer and the plurality of weight values.

Linguistic understanding is a technology for recognizing human language/characters and applying/processing the same, and may include natural language processing, machine translation, dialog system, question answering, speech recognition/synthesis, and the like.

Meanwhile, the user input interface may be referred to as a user interface. Here, the user interface may include, in addition to the user input interface, the output interface 1300.

According to an embodiment of the present disclosure, the first home appliance 1000 may receive an input of assigning the first home appliance 1000 as an assistant device, through the first user interface. Also, the first home appliance 1000 may receive an input of switching roles of the first home appliance 1000, through the first user interface.

The second home appliance 2000 operating as an actually used device may include a processor 2100, a communication interface 2200, a memory 2300, and a driving circuit 2400. Each component will be described below.

The processor 2100 controls all operations of the second home appliance 2000. For example, the processor 2100 may execute programs stored in the memory 2300 to control the communication interface 2200, the memory 2300, and the driving circuit 2400. There may be one processor 2100 or a plurality of processors 2100. For example, when there are the plurality of processors 2100, the processors 2100 may include a main processor and a sub processor.

The communication interface 2200 may include a communication interface for performing communication with an external device. The communication interface 2200 may include one or more components enabling communication between the second home appliance 2000 and the first home appliance 1000, between the second home appliance 2000 and the server device (not shown), and between the second home appliance 2000 and the mobile terminal (not shown). For example, the communication interface 2200 may include a short-range communication interface (short-range wireless communication interface) for performing communication between home appliances in the house, a long-range communication interface for accessing an external network, and the like.

According to an embodiment of the present disclosure, the communication interface 2200 may include a Bluetooth communication interface, a BLE communication interface, a short-range wireless communication interface (NFC interface), a WLAN (Wi-Fi) communication interface, a Zigbee communication interface, a Z-wave communication interface, an IrDA communication interface, a WFD communication interface, a UWB communication interface, and an Ant+ communication interface, but is not limited thereto. For example, the communication interface 2200 may include the Internet, a computer network (e.g., LAN or WAN), and a mobile communication interface. The mobile communication interface may include a 3G circuit, a 4G circuit, a 5G circuit, an LTE circuit, an NB-IoT circuit, an LTE-M circuit, but is not limited thereto.

According to an embodiment of the present disclosure, when the group mode is activated, the communication interface 2200 may transmit, to the first home appliance 1000, the information related to the operating state of the second home appliance 2000. The communication interface 2200 may receive, from the first home appliance 1000, a control command related to control by the second home appliance 2000.

The memory 2300 may store a program for processes and controls by the processor 2100, or may store pieces of input/output data (e.g., role information in a group and identification information of the first home appliance 1000). The memory 2300 may include at least one type of storage medium among a flash memory type, a hard disk type, a multimedia card micro type, a card type memory (for example, an SD or an XD memory), RAM, SRAM, ROM, EEPROM, PROM, a magnetic memory, a magnetic disk, and an optical disk. The programs stored in the memory 2300 may be classified into a plurality of modules depending on functions. The memory 2300 may store at least one artificial intelligence model.

The driving circuit 2400 may perform original functions of the second home appliance 2000, according to control by the processor 2100. The driving circuit 2400 may be differently realized according to a type of the second home appliance 2000. For example, when the second home appliance 2000 is a washing machine, the driving circuit 2400 may include a rotating tank, a water supply, a detergent input circuit, a draining circuit, and a motor, when the second home appliance 2000 is an induction heater, the driving circuit 2400 may include an electromagnetic interference (EMI) filter, a rectifier circuit, an inverter circuit, a distribution circuit, a current sensing circuit, a driving processor, and an operating coil, and when the second home appliance 2000 is an air conditioner, the driving circuit 2400 may include a blowing circuit (an air suction circuit, a blowing fan, a motor, and an air discharging circuit) and a filter circuit (a pretreatment filter, a high-efficiency particulate air (HEPA) filter, and a deodorization filter).

Meanwhile, the second home appliance 2000 may be implemented by more components than those illustrated in FIG. 1 or the second home appliance 2000 may be implemented by fewer components than those illustrated in FIG. 1. For example, according to an embodiment, the second home appliance 2000 may further include, in addition to the processor 2100, the communication interface 2200, the memory 2300, and the driving circuit 2400, a user interface (including at least one of an input interface or an output interface), a power supply circuit (not shown), and a sensor circuit (not shown).

According to an embodiment of the present disclosure, when the first home appliance 1000 and the second home appliance 2000 are grouped and operated, even when the second home appliance 2000 is located at a corner inside a house, the user may monitor the operating state of the second home appliance 2000 through the first home appliance 1000 without having to move to a place where the second home appliance 2000 is located. Also, the user is able to control the second home appliance 2000 through the first home appliance 1000 without having to move to the place where the second home appliance 2000 is located, and thus user convenience may be increased. Hereinafter, a method of grouping and operating the first home appliance 1000 and the second home appliance 2000 will be described in detail below.

FIG. 2 illustrates a method by which the first home appliance 1000 outputs the information related to the second home appliance 2000, according to an embodiment of the present disclosure.

In operation S210, the first home appliance 1000 according to an embodiment of the present disclosure may obtain group information of grouping the first home appliance 1000 and the second home appliance 2000 by assigning the first home appliance 1000 as an assistant device and assigning the second home appliance 2000 as an actually used device. Here, the group information of grouping the first home appliance 1000 and the second home appliance 2000 may be information related to a user input of grouping the first home appliance 1000 and the second home appliance 2000.

According to an embodiment of the present disclosure, the group information may include at least one of role information of the first home appliance 1000 indicating that the first home appliance 1000 has been assigned as the assistant device, role information of the second home appliance 2000 indicating that the second home appliance 2000 has been assigned as the actually used device, or communication connection information of the second home appliance 2000, but is not limited thereto.

According to an embodiment of the present disclosure, the first home appliance 1000 may obtain the group information through various paths. For example, the first home appliance 1000 may obtain the group information from a server device, a mobile terminal, or the second home appliance 2000.

According to an embodiment of the present disclosure, the first home appliance 1000 may obtain the group information from the server device that has received a user input of assigning the first home appliance 1000 as the assistant device and the second home appliance 2000 as the actually used device. An operation by which the first home appliance 1000 obtains the group information from the server device will be described in detail below with reference to FIGS. 4 to 5C.

According to an embodiment of the present disclosure, the first home appliance 1000 may establish a short-range wireless communication channel with the mobile terminal that has been communicably connected to the second home appliance 2000, and obtain the group information from the mobile terminal through the short-range wireless communication channel. An operation by which the first home appliance 1000 obtains the group information from the mobile terminal will be described in detail below with reference to FIGS. 6 to 7D.

According to an embodiment of the present disclosure, the first home appliance 1000 may obtain the group information through device-to-device (D2D) communication with the second home appliance 2000. For example, the first home appliance 1000 may receive an input of assigning the first home appliance 1000 as the assistant device directly from a user through a user input interface. Also, the first home appliance 1000 may obtain, from the second home appliance 2000 through short-range wireless communication, identification information of the second home appliance 2000, the role information of the second home appliance 2000 indicating that the second home appliance 2000 has been assigned as the actually used device, and the communication connection information of the second home appliance 2000. An operation by which the first home appliance 1000 obtains the group information through the D2D communication with the second home appliance 2000 will be described in detail below with reference to FIGS. 8 to 9B.

According to an embodiment of the present disclosure, when the group information is obtained, the first home appliance 1000 may perform communication connection (e.g., Bluetooth, WFD, Zigbee, or Z-wave) with the second home appliance 2000, based on the group information. Also, the first home appliance 1000 may store the group information in the memory 1400. Hereinafter, a process by which the first home appliance 1000 obtains the group information may be defined as a process by which the first home appliance 1000 and the second home appliance 2000 perform a grouping operation, and a state in which the first home appliance 1000 has obtained the group information may be defined as a state in which grouping with the second home appliance 2000 is completed.

In operation S220, the first home appliance 1000 according to an embodiment of the present disclosure may activate a group mode for operating the first home appliance 1000 as an assistant device of the second home appliance 2000, based on the group information. Here, the group mode may denote a mode of transmitting/receiving data through communication connection between grouped home appliances.

According to an embodiment of the present disclosure, when the user selects (e.g., touches) a button for executing the group mode through the user input interface of the first home appliance 1000, the first home appliance 1000 may activate the group mode. Here, the first home appliance 1000 may identify its role (i.e., role assigned to the first home appliance 1000), based on the group information. For example, when the group information includes the role information of the first home appliance 1000 indicating that the first home appliance 1000 has been assigned as the assistant device, the first home appliance 1000 may identify that its role (i.e., role assigned to the first home appliance 1000) is the assistant device, based on the group information. Also, when the group information includes the role information of the second home appliance 2000 indicating that the second home appliance 2000 has been assigned as the actually used device, the first home appliance 1000 may identify that its role (i.e., role assigned to the first home appliance 1000) is the assistant device contrary to a role of the second home appliance 2000.

According to an embodiment of the present disclosure, when the group mode is activated, the first home appliance 1000 may prepare to perform operations as the assistant device, according to the role assigned to the first home appliance 1000. For example, when a communication channel with the second home appliance 2000 is not established, the first home appliance 1000 may establish the communication channel with the second home appliance 2000, based on the communication connection information of the second home appliance 2000, included in the group information. Here, the communication channel may be a short-range communication channel (e.g., one of a Bluetooth communication channel, a BLE communication channel, a WFD communication channel, a Zigbee communication channel, and a Z-wave communication channel), but is not limited thereto.

According to an embodiment of the present disclosure, when the first home appliance 1000 has been communicably connected to the second home appliance 2000, the first home appliance 1000 may identify whether the communication channel with the second home appliance 2000 is maintained. When the communication connection with the second home appliance 2000 is released, the first home appliance 1000 may re-establish the communication channel with the second home appliance 2000.

In operation S230, the first home appliance 1000 according to an embodiment of the present disclosure may receive information related to operations of the second home appliance 2000 from the second home appliance 2000 assigned as the actually used device, through the communication channel established based on the communication connection information of the second home appliance 2000.

The information (hereinafter, referred to as operation information) related to the operations of the second home appliance 2000 may include text or an image corresponding to a present operating state, code indicating the present operating state, a time remaining until operation completion, an error message indicating an operation is stopped, and information indicating that an operation is completed, but is not limited thereto.

According to an embodiment of the present disclosure, the first home appliance 1000 may receive the operation information of the second home appliance 2000 at predetermined intervals from the second home appliance 2000. For example, the first home appliance 1000 may receive the operation information of the second home appliance 2000 every 1 minute.

According to an embodiment of the present disclosure, the first home appliance 1000 may receive the operation information of the second home appliance 2000 when there is a change in the operating state of the second home appliance 2000. For example, when the second home appliance 2000 is a washing machine, the second home appliance 2000 may provide, to the first home appliance 1000, information related to a soaking operation when the soaking operation starts, provide, to the first home appliance 1000, information related to a washing operation when the washing operation starts, and provide, to the first home appliance 1000, information related to a spin-drying operation when the spin-drying operation starts.

According to an embodiment of the present disclosure, the first home appliance 1000 may receive the operation information of the second home appliance 2000 from the second home appliance 2000, when an event assigned by the user occurs in the second home appliance 2000. For example, when the second home appliance 2000 is a dryer and the user set the first home appliance 1000 to receive (for example, receive only) information indicating that a drying operation is completed, the first home appliance 1000 may receive the operation information (e.g., drying operation completion) of the second home appliance 2000 when the drying operation is completed in the second home appliance 2000.

According to an embodiment of the present disclosure, the first home appliance 1000 may receive the operation information of the second home appliance 2000 from the second home appliance 2000 by requesting the second home appliance 2000 for the operation information at predetermined intervals or without a separate request.

In operation S240, the first home appliance 1000 according to an embodiment of the present disclosure may output the information related to the operations of the second home appliance 2000, in the group mode.

According to an embodiment of the present disclosure, the first home appliance 1000 may obtain information (hereinafter, UI information of the second home appliance 2000) about a second user interface corresponding to the second home appliance 2000. The UI information of the second home appliance 2000 may denote information about an interface for the second home appliance 2000 to interact with the user. For example, the UI information of the second home appliance 2000 may include a graphical user interface (GUI) for displaying the operating state of the second home appliance 2000, a menu screen for selecting an operating mode of the second home appliance 2000, a screen for providing operation error information related to the second home appliance 2000, an input screen for receiving a control command from the user, speech guide information related to the operations of the second home appliance 2000, and speech instruction information for controlling the second home appliance 2000, but is not limited thereto.

According to an embodiment of the present disclosure, the first home appliance 1000 may receive the UI information of the second home appliance 2000 from at least one of the server device, the mobile terminal, or the second home appliance 2000, but is not limited thereto. According to an embodiment of the present disclosure, when the UI information of the second home appliance 2000 is pre-stored in the memory 1400 of the first home appliance 1000, the first home appliance 1000 may call the UI information of the second home appliance 2000 from the memory 1400 when the group mode is activated.

According to an embodiment of the present disclosure, when the group mode is activated, the first home appliance 1000 may display the GUI of the second home appliance 2000 on the first user interface (e.g., the output interface 1300) of the first home appliance 1000, based on the UI information corresponding to the second home appliance 2000. Here, the first home appliance 1000 may output the information related to the operations of the second home appliance 2000 through the GUI of the second home appliance 2000, displayed on the first user interface (e.g., the output interface 1300).

Meanwhile, according to an embodiment of the present disclosure, when the first home appliance 1000 is performing original functions, the first home appliance 1000 may alternately display a GUI of the first home appliance 1000, which corresponds to the original functions of the first home appliance 1000, and the GUI of the second home appliance 2000, on the output interface 1300. Here, the first home appliance 1000 may alternately display the GUI of the first home appliance 1000 and the GUI of the second home appliance 2000 at pre-set time intervals. For example, when the first home appliance 1000 is an air purifier and the second home appliance 2000 is a washing machine, a GUI of the air purifier and a GUI of the washing machine may be alternately displayed every 5 seconds on a display of the air purifier. When the output interface 1300 of the first home appliance 1000 includes a display having a large size, the first home appliance 1000 may simultaneously display the GUI of the first home appliance 1000 and the GUI of the second home appliance 2000 on the display.

According to an embodiment of the present disclosure, when the first home appliance 1000 does not perform the original functions but operates (for example, only operates) as the assistant device, the first home appliance 1000 may display (for example, display only) the GUI of the second home appliance 2000 on the output interface 1300.

Meanwhile, according to an embodiment of the present disclosure, when the second home appliance 2000 includes a plurality of home appliances, the first home appliance 1000 may display GUIs corresponding to the plurality of home appliances on the output interface 1300 of the first home appliance 1000. Here, when the display of the first home appliance 1000 is larger than a threshold size, the GUIs corresponding to the plurality of home appliances may be displayed on the display of the first home appliance 1000 together. Alternatively, when the display of the first home appliance 1000 is smaller than the threshold size, the GUIs corresponding to the plurality of home appliances may be alternately displayed on the display of the first home appliance 1000. An embodiment in which the second home appliance 2000 includes the plurality of home appliances will be described in detail below with reference to FIG. 15.

According to an embodiment of the present disclosure, even when the second home appliance 2000 is located in a space where the user does not stay often, the user may identify the operation information of the second home appliance 2000 through the first home appliance 1000 grouped with the second home appliance 2000, and thus user convenience is increased. Hereinafter, a method by which the first home appliance 1000 activates the group mode will be described in more detail with reference to FIG. 3.

Figure 3:
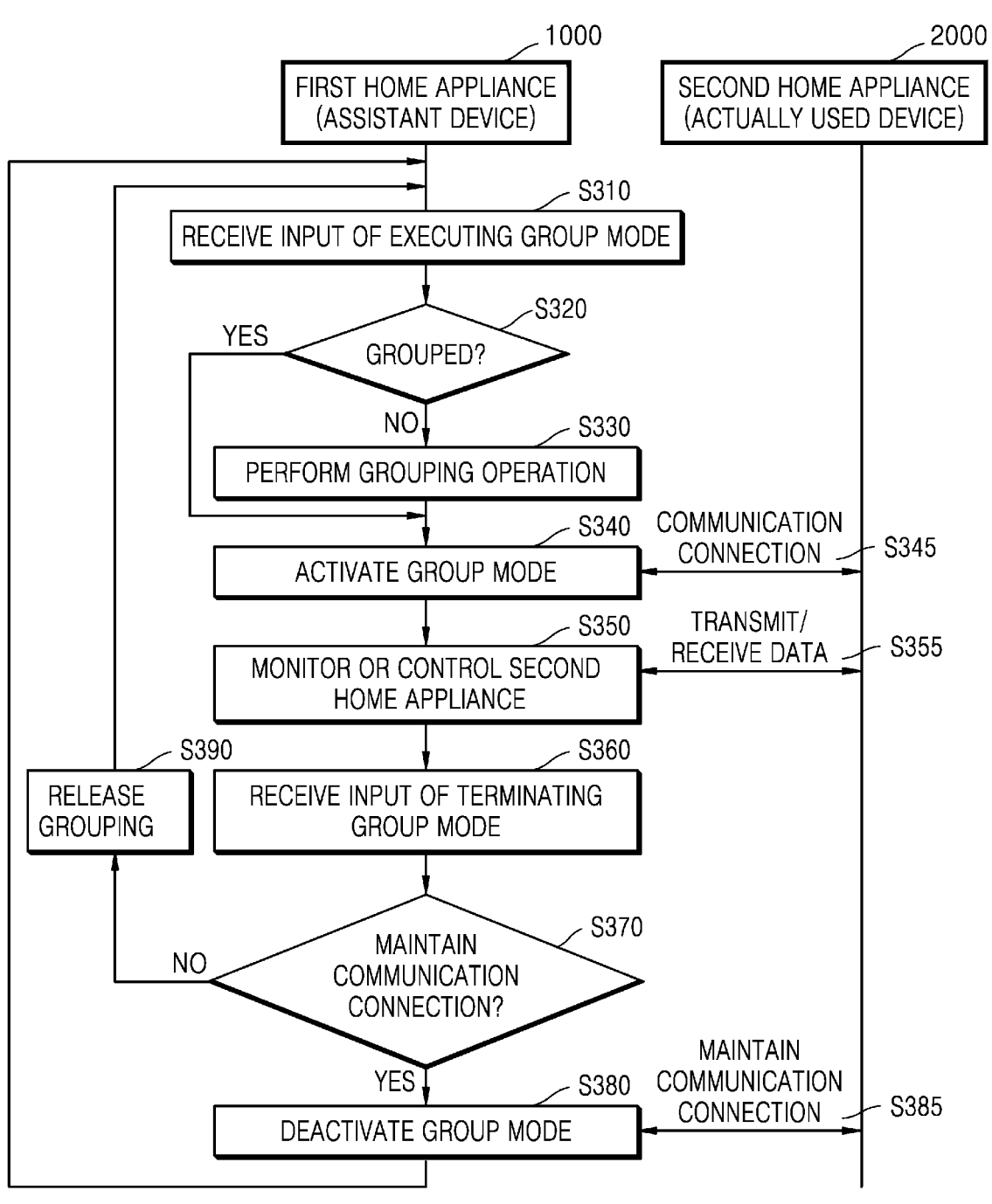
FIG. 3 illustrates a method by which a first home appliance activates a group mode, according to an embodiment of the present disclosure.

FIG. 3 illustrates the method by which the first home appliance 1000 activates the group mode, according to an embodiment of the present disclosure. In FIG. 3, an example in which the first home appliance 1000 is assigned as the assistant device and the second home appliance 2000 is assigned as the actually used device is described.

In operation S310, the first home appliance 1000 according to an embodiment of the present disclosure may receive, from the user, an input of executing the group mode. For example, the first home appliance 1000 may receive an input of selecting a certain button related to a group function, arranged in the first home appliance 1000. Alternatively, the first home appliance 1000 may receive, from the user, a speech command for executing the group mode.

In operation S320, upon receiving the input of executing the group mode from the user, the first home appliance 1000 according to an embodiment of the present disclosure may determine whether the first home appliance 1000 is grouped with an external device (e.g., the second home appliance 2000). For example, when the group information (e.g., at least one of the role information of the first home appliance 1000, the role information of the second home appliance 2000, or the communication connection information of the second home appliance 2000) is stored in the memory 1400, the first home appliance 1000 may be determined to be grouped with the external device (e.g., the second home appliance 2000).

According to an embodiment of the present disclosure, when it is determined that the first home appliance 1000 is grouped with the second home appliance 2000, operation S340 may be performed and the first home appliance 1000 may immediately activate the group mode. For example, the first home appliance 1000 may operate as the assistant device of the second home appliance 2000, based on the group information. Here, the first home appliance 1000 may identify whether a D2D communication channel (e.g., a short-range wireless communication channel) with the second home appliance 2000 is maintained. When the D2D communication channel (e.g., the short-range wireless communication channel) with the second home appliance 2000 is released, the first home appliance 1000 may establish the D2D communication channel (e.g., the short-range wireless communication channel) again, based on the group information (e.g., the communication connection information of the second home appliance 2000).

In operation S330, the first home appliance 1000 according to an embodiment of the present disclosure may perform a grouping operation when the first home appliance 1000 is not grouped with the external device (e.g., the second home appliance 2000). The grouping operation may denote a process by which the first home appliance 1000 obtains the group information. For example, the grouping operation may denote an operation of obtaining the group information related to the user input of grouping the first home appliance 1000 and the second home appliance 2000 by assigning the first home appliance 1000 as the assistant device and assigning the second home appliance 2000 as the actually used device.

According to an embodiment of the present disclosure, the first home appliance 1000 may perform the grouping operation by obtaining the group information from the server device that has received the user input of assigning the first home appliance 1000 as the assistant device and the second home appliance 2000 as the actually used device. A process by which the first home appliance 1000 performs the grouping operation in association with the server device will be described in detail below with reference to FIG. 4.

According to an embodiment of the present disclosure, the first home appliance 1000 may perform the grouping operation by establishing the short-range wireless communication channel with the mobile terminal that has been communicably connected to the second home appliance 2000, and obtaining the group information from the mobile terminal through the short-range wireless communication channel. A process by which the first home appliance 1000 performs the grouping operation in association with the mobile terminal will be described in detail below with reference to FIG. 6.

According to an embodiment of the present disclosure, the first home appliance 1000 may perform the grouping operation by obtaining the group information through the D2D communication with the second home appliance 2000. A process by which the first home appliance 1000 performs the grouping operation in association with the second home appliance 2000 will be described in detail below with reference to FIG. 8.

In operation S340, the first home appliance 1000 according to an embodiment of the present disclosure may activate the group mode when the first home appliance 1000 is grouped with the external device (e.g., the second home appliance 2000). Here, in operation S345, according to an embodiment of the present disclosure, the first home appliance 1000 may perform communication connection with the second home appliance 2000.

For example, the first home appliance 1000 may request the second home appliance 2000 for the communication connection, based on the communication connection information of the second home appliance 2000. A communication connection request may include a paring request. "Paring" may denote, for example, a procedure of identifying a code, identification information, security information, or authentication information assigned for mutual communication connection between the first home appliance 1000 and the second home appliance 2000, which support a Bluetooth function. The first home appliance 1000 may establish a Bluetooth communication channel by pairing with the second home appliance 2000. Establishing the Bluetooth communication channel may denote that the first home appliance 1000 and the second home appliance 2000 may transmit/receive data through Bluetooth communication. Meanwhile, when the first home appliance 1000 and the second home appliance 2000 have been previously paired together, a paring operation may be skipped and the Bluetooth communication may be immediately performed.

According to an embodiment of the present disclosure, the first home appliance 1000 and the second home appliance 2000 may be connected to each other through BLE communication. For example, the first home appliance 1000 may establish a BLE communication channel with the second home appliance 2000. Here, the BLE communication channel may be a non-connection type virtual communication channel through which the first home appliance 1000 and the second home appliance 2000 transmit/receive advertising packets through mutual scanning, or may be a connection type communication channel in which a session is formed according to a BLE connection request of the first home appliance 1000.

According to an embodiment of the present disclosure, the first home appliance 1000 and the second home appliance 2000 may be connected to each other through WFD communication. For example, the first home appliance 1000 and the second home appliance 2000 may exchange device-related information, such as a mutual device name or a device type, and form a new P2P group by determining which home appliance is to be a P2P group owner (GO). Here, the P2P GO may operate as an access point (AP) and a P2P client may operate as a station (STA).

For example, the first home appliance 1000 may transmit a probe request frame in a search state and the second home appliance 2000 may transmit a probe response frame with respect to the probe request frame, and thus the first home appliance 1000 may discover the second home appliance 2000. Here, the first home appliance 1000 may more quickly discover the second home appliance 2000 when a device identification value (e.g., a media access control (MAC) address) of the second home appliance 2000 is received as the communication connection information of the second home appliance 2000 from the server device or the mobile terminal.

When the first home appliance 1000 discovers the second home appliance 2000, the first home appliance 1000 and the second home appliance 2000 may proceed with a P2P GO negotiation process. At this time, the first home appliance 1000 may be determined as the P2P GO and the second home appliance 2000 may be determined as the P2P client, but an embodiment is not limited thereto. When the first home appliance 1000 is determined as the P2P GO, the first home appliance 1000 may perform a communication operation in a P2P group.

Meanwhile, according to an embodiment of the present disclosure, an authentication process may be performed before the first home appliance 1000 and the second home appliance 2000 perform the WFD communication. For example, the first home appliance 1000 and the second home appliance 2000 may perform a process of exchanging personal identification number (PIN) information input through a touch panel or the like by the user.

In operation S350, the first home appliance 1000 according to an embodiment of the present disclosure may operate as the assistant device of the second home appliance 2000 by monitoring or controlling the second home appliance 2000. In operation S355, the first home appliance 1000 may transmit data to the second home appliance 2000 or receive data from the second home appliance 2000 through the communication channel established with the second home appliance 2000. Here, the communication channel may be a short-range communication channel (e.g., one of a Bluetooth communication channel, a BLE communication channel, a WFD communication channel, a Zigbee communication channel, and a Z-wave communication channel), but is not limited thereto.

For example, the first home appliance 1000 may monitor the second home appliance 2000 by receiving, from the second home appliance 2000, and outputting the information related to the operations of the second home appliance 2000. The information (hereinafter, referred to as the operation information) related to the operations of the second home appliance 2000 may include text or an image corresponding to a present operating state, code indicating the present operating state, a time remaining until operation completion, an error message indicating an operation is stopped, and information indicating that an operation is completed, but is not limited thereto. An operation by which the first home appliance 1000 receives, from the second home appliance 2000, and outputs the information related to the operations of the second home appliance 2000 has been described in detail with reference to operations S230 and S240 of FIG. 2, and thus details thereof are not provided again.

According to an embodiment of the present disclosure, the first home appliance 1000 may receive, from the user, an input of controlling the second home appliance 2000. In this case, the first home appliance 1000 may control the second home appliance 2000 by transmitting a control command corresponding to the input of controlling the second home appliance 2000 to the second home appliance 2000 through the communication channel established with the second home appliance 2000. An operation by which the first home appliance 1000 controls the second home appliance 2000 according to a user input will be described in detail below with reference to FIG. 11.

In operation S360, the first home appliance 1000 according to an embodiment of the present disclosure may receive an input of terminating the group mode. For example, the first home appliance 1000 may receive an input of selecting a certain button related to the group function, arranged in the first home appliance 1000. Alternatively, the first home appliance 1000 may receive, from the user, a speech command for terminating the group mode.

According to an embodiment of the present disclosure, the input of terminating the group mode may include an input of releasing the grouping and an input of deactivating the group mode. The input of releasing the grouping may be an input of releasing the grouping by releasing the communication connection with the second home appliance 2000, and the input of deactivating the group mode may be an input of deactivating the group mode while maintaining the communication connection with the second home appliance 2000. Accordingly, according to an embodiment of the present disclosure, the input of terminating the group mode may include information about whether to maintain the communication connection with the second home appliance 2000.

In operation S370, the first home appliance 1000 may determine whether to maintain the communication connection with the second home appliance 2000, based on a type of the user input.

For example, when a first user input of the user pressing a group button one time is received while the group mode is activated, the first home appliance 1000 may identify the first user input as the input of deactivating the group mode while maintaining the communication connection, and when a second user input of pressing the group button two or more times is received while the group mode is activated, the first home appliance 1000 may identify the second user input as the input of releasing the grouping by releasing the communication connection.

Also, when a third user input of the user pressing the group button shorter than a certain time (e.g., 3 seconds) is received while the group mode is activated, the first home appliance 1000 may identify the third user input as the input of deactivating the group mode while maintaining the communication connection, and when a fourth user input of the user pressing the group button longer than a certain time (e.g., 3 seconds) is received while the group mode is activated, the first home appliance 1000 may identify the fourth user input as the input of releasing the grouping by releasing the communication connection.

In operation S380, when the input of terminating the group mode is identified as the input of deactivating the group mode, the first home appliance 1000 according to an embodiment of the present disclosure may deactivate the group mode and stop data transmission/reception with the second home appliance 2000.

Here, in operation S385, the first home appliance 1000 according to an embodiment of the present disclosure may maintain the communication connection with the second home appliance 2000. In this case, the first home appliance 1000 and the second home appliance 2000 may switch a communication mode to a power saving mode or a sleep mode.

Meanwhile, when the input of executing the group mode is received again from the user after the group mode is deactivated, the first home appliance 1000 may activate the group mode (perform operations S310, 320, and 340). At this time, the communication modes of the first home appliance 1000 and the second home appliance 2000 may be switched from the power saving mode or the sleep mode to an activated mode.

In operation S390, when the input of terminating the group mode is identified as the input of releasing the grouping, the first home appliance 1000 according to an embodiment of the present disclosure may perform a grouping release operation. For example, the first home appliance 1000 may release the communication connection with the second home appliance 2000. Also, the first home appliance 1000 may delete, from the memory 1400, the group information related to the user input of grouping the first home appliance 1000 and the second home appliance 2000 by assigning the first home appliance 1000 as the assistant device and assigning the second home appliance 2000 as the actually used device.

When the input of executing the group mode is received again from the user after the grouping between the first home appliance 1000 and the second home appliance 2000 is released, the first home appliance 1000 may perform the grouping operation again (perform operations S310 to S330). Hereinafter, a method by which the first home appliance 1000 and the second home appliance 2000 perform the grouping operation will be described in detail.

Figure 4:
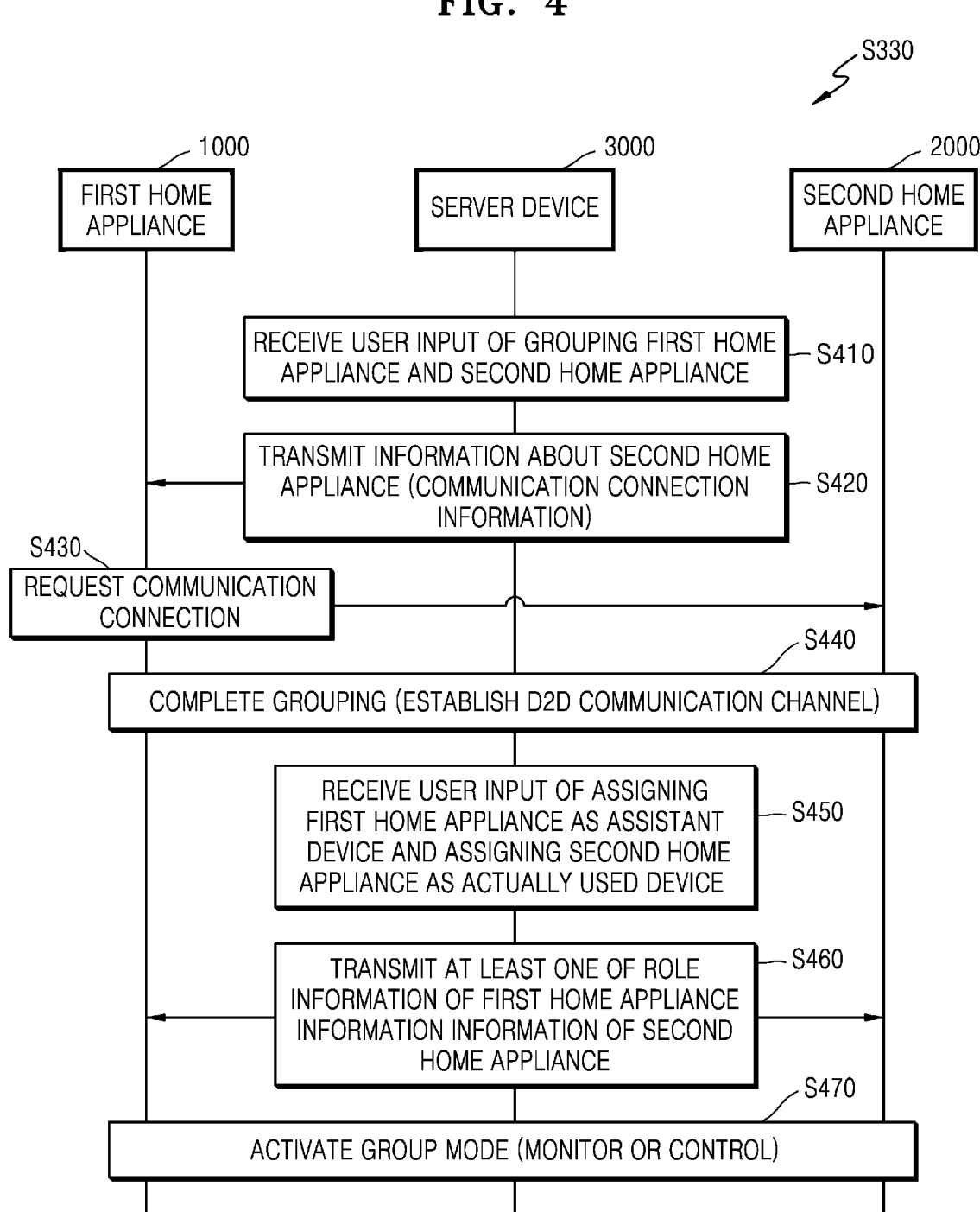
FIG. 4 illustrates a method of performing a grouping operation through a server device, according to an embodiment of the present disclosure.

FIG. 4 illustrates a method of performing a grouping operation through a server device, according to an embodiment of the present disclosure.

In operation S410, a server device 3000 according to an embodiment of the present disclosure may receive a user input of grouping the first home appliance 1000 and the second home appliance 2000.

According to an embodiment of the present disclosure, the server device 3000 may be a device management server for managing home appliances. The server device 3000 may manage the home appliances, based on account information. For example, the first home appliance 1000 and the second home appliance 2000 may be registered in the server device 3000 under a same user account.

According to an embodiment of the present disclosure, the server device 3000 may provide an application for managing a home appliance through a display device and receive a user input through the application executed by the display device. For example, the user may group the first home appliance 1000 and the second home appliance 2000 by executing the application installed in the display device and selecting the first home appliance 1000 and the second home appliance 2000 from an execution screen of the application. A method by which the user selects the first home appliance 1000 and the second home appliance 2000 from the execution screen of the application may vary. For example, the user may connect an icon of the first home appliance 1000 and an icon of the second home appliance 2000, which are displayed on the execution screen of the application, through a touch interaction, or may select the first home appliance 1000 and the second home appliance 2000 through a speech input. In this case, the server device 3000 may receive, from the display device, the user input of grouping the first home appliance 1000 and the second home appliance 2000.

In operation S420, when the user input of grouping the first home appliance 1000 and the second home appliance 2000 is received, the server device 3000 may transmit information about the second home appliance 2000 to the first home appliance 1000.

The information about the second home appliance 2000 may include the identification information of the second home appliance 2000, the communication connection information of the second home appliance 2000, and the like, but is not limited thereto. The communication connection information of the second home appliance 2000 may be information enabling an external device to be connected to the second home appliance 2000. For example, when the second home appliance 2000 supports Wi-Fi communication, the communication connection information of the second home appliance 2000 may include a timestamp, identification information (e.g., a service set identifier (SSID), a basic service set identifier (BSSID) or a MAC address), channel information, function information (e.g., tethering capability), and state information, but is not limited thereto. When the second home appliance 2000 supports Bluetooth communication, the communication connection information of the second home appliance 2000 may include a Bluetooth (BT) address, a product name, and profile information, but is not limited thereto.

According to an embodiment of the present disclosure, the information about the second home appliance 2000 may be pre-stored in the server device 3000. For example, when the second home appliance 2000 is registered in the server device 3000, the server device 3000 may store the information about the second home appliance 2000 in a home appliance database (DB). When the information about the second home appliance 2000 is not pre-stored, the server device 3000 may request the second home appliance 2000 for the information about the second home appliance 2000 and receive the same.

In operation S430, the first home appliance 1000 according to an embodiment of the present disclosure may request the second home appliance 2000 for communication connection. For example, the first home appliance 1000 may request the second home appliance 2000 for the communication connection, based on the communication connection information of the second home appliance 2000, received from the server device 3000.

Meanwhile, according to another embodiment of the present disclosure, the server device 3000 may transmit communication connection information of the first home appliance 1000 to the second home appliance 2000 and the second home appliance 2000 may request the first home appliance 1000 for communication connection, based on the communication connection information of the first home appliance 1000.

In operation S440, according to an embodiment of the present disclosure, the second home appliance 2000 may respond to the communication connection request of the first home appliance 1000, and thus, the short-range wireless communication channel may be established between the first home appliance 1000 and the second home appliance 2000. The short-range wireless communication channel may include one of a Bluetooth communication channel, a BLE communication channel, a WFD communication channel, a Zigbee communication channel, and a Z-wave communication channel, but is not limited thereto. According to an embodiment of the present disclosure, a state in which the first home appliance 1000 and the second home appliance 2000 have established the D2D communication channel (e.g., the short-range wireless communication channel) may be defined as a grouping completed state.

In operation S450, according to an embodiment of the present disclosure, the server device 3000 may receive the user input of assigning the first home appliance 1000 as the assistant device and assigning the second home appliance 2000 as the actually used device. For example, the user may execute the application installed in the display device, and assign the first home appliance 1000 as the assistant device and assign the second home appliance 2000 as the actually used device from the execution screen of the application. The user may input, to the display device, a speech command of assigning the first home appliance 1000 as the assistant device and assigning the second home appliance 2000 as the actually used device. In this case, the server device 3000 may receive, from the display device, the user input of assigning the first home appliance 1000 as the assistant device and assigning the second home appliance 2000 as the actually used device.

In operation S460, the server device 3000 according to an embodiment of the present disclosure may transmit, to at least one of the first home appliance 1000 or the second home appliance 2000, at least one of the role information of the first home appliance 1000 (e.g., the assistant device) or the role information of the second home appliance 2000 (e.g., the actually used device).

For example, the server device 3000 may transmit the role information of the first home appliance 1000 and the role information of the second home appliance 2000 to the first home appliance 1000. In this case, the first home appliance 1000 may transmit at least one of the role information of the first home appliance 1000 or the role information of the second home appliance 2000 to the second home appliance

2000 through the short-range wireless communication channel. Alternatively, the server device 3000 may transmit the role information of the first home appliance 1000 and the role information of the second home appliance 2000 to the second home appliance 2000. In this case, the second home appliance 2000 may transmit at least one of the role information of the first home appliance 1000 or the role information of the second home appliance 2000 to the first home appliance 1000 through the short-range wireless communication channel.

The server device 3000 may transmit the role information of the first home appliance 1000 and the role information of the second home appliance 2000 to both the first home appliance 1000 and the second home appliance 2000. Also, the server device 3000 may transmit the role information of the first home appliance 1000 to the first home appliance 1000 and transmit the role information of the second home appliance 2000 to the second home appliance 2000.

In operation S470, the first home appliance 1000 and the second home appliance 2000 may activate the group mode. For example, the first home appliance 1000 may activate the group mode to operate as the assistant device of the second home appliance 2000, and the second home appliance 2000 may activate the group mode to operate as the actually used device. When the first home appliance 1000 operates as the assistant device of the second home appliance 2000, the first home appliance 1000 may monitor the operations of the second home appliance 2000 or control the second home appliance 2000. An operation by which the first home appliance 1000 monitors or controls the second home appliance 2000 corresponds to operation S350 of FIG. 3, and thus details thereof are not provided again.

According to an embodiment of the present disclosure, operation S450 may be performed before operation S420. In this case, the server device 3000 may simultaneously transmit, to the first home appliance 1000, the information about the second home appliance 2000 and the role information of the second home appliance 2000 (e.g., the actually used device) together.

Meanwhile, when the user switches roles of the first home appliance 1000 and the second home appliance 2000 from the execution screen of the application, the server device 3000 may transmit information about a role switch to the first home appliance 1000 and the second home appliance 2000. For example, when the user switches the role of the first home appliance 1000 from the assistant device to the actually used device and switches the role of the second home appliance 2000 from the actually used device to the assistant device, the server device 3000 may transmit information to operate as the actually used device to the first home appliance 1000 and transmit information to operate as the assistant device to the second home appliance 2000.

According to an embodiment of the present disclosure, when the first home appliance 1000 and the second home appliance 2000 are connectable to an external network through a router (e.g., an AP), the user may simply group the first home appliance 1000 and the second home appliance 2000 through the execution screen of the application provided by the server device 3000. Operations by which the first home appliance 1000 and the second home appliance 2000 group through the server device 3000 will be described in more detail with reference to FIGS. 5A to 5C.

Figure 5A:
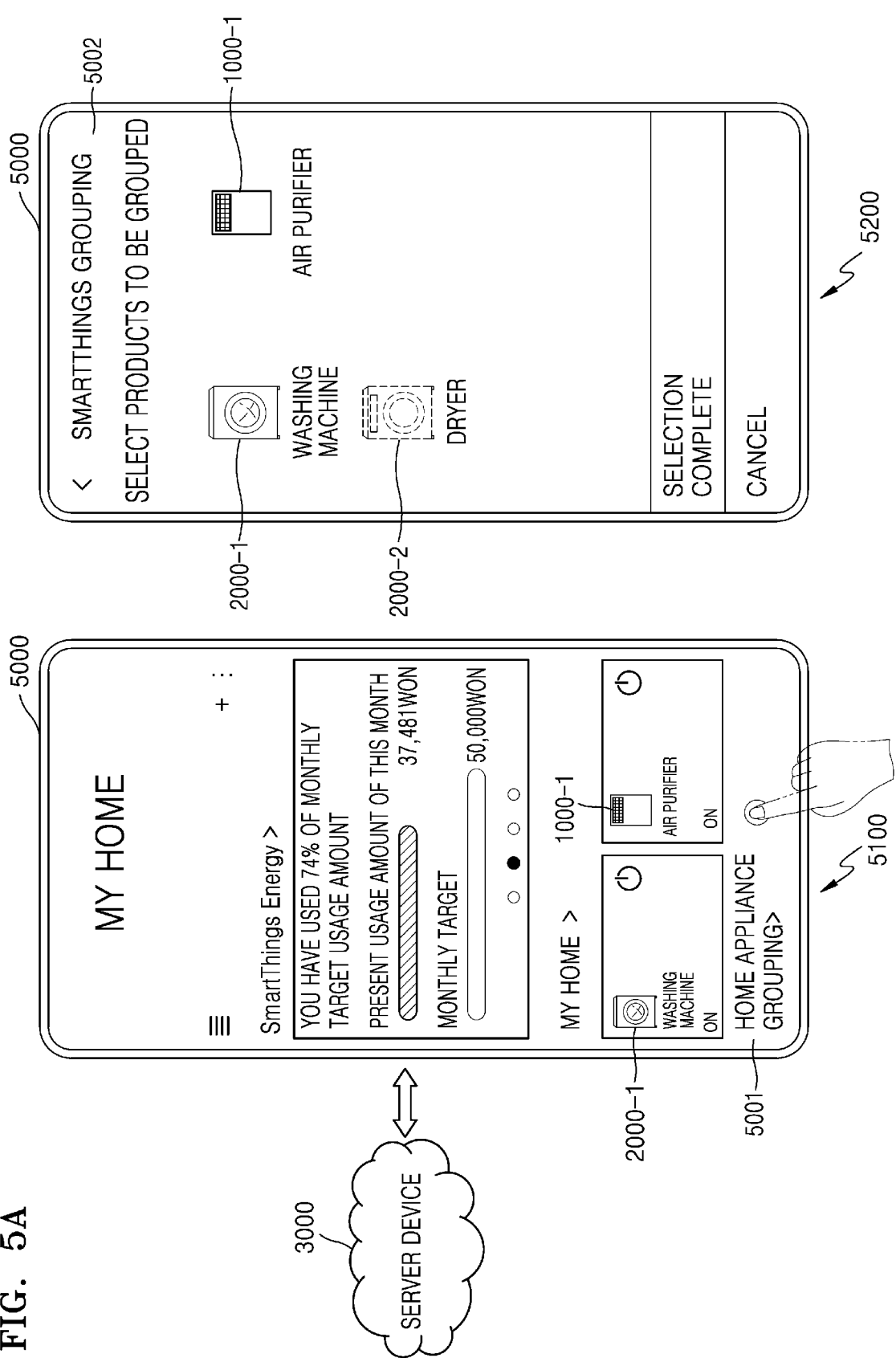
FIG. 5A illustrates an operation of grouping a first home appliance and a second home appliance through a server device, according to an embodiment of the present disclosure.
Figure 5B:
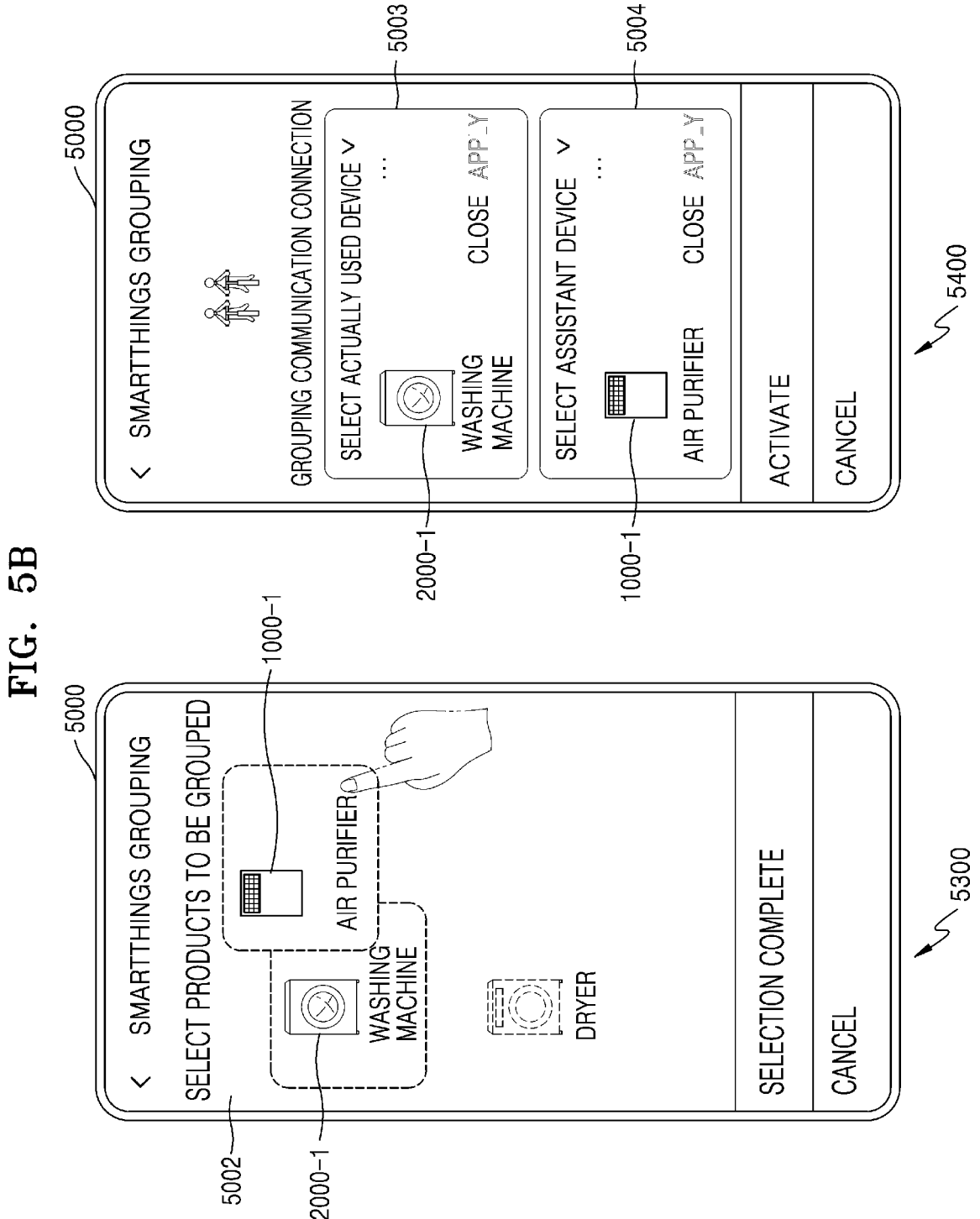
FIG. 5B illustrates an operation of grouping a first home appliance and a second home appliance through a server device, according to an embodiment of the present disclosure.
Figure 5C:
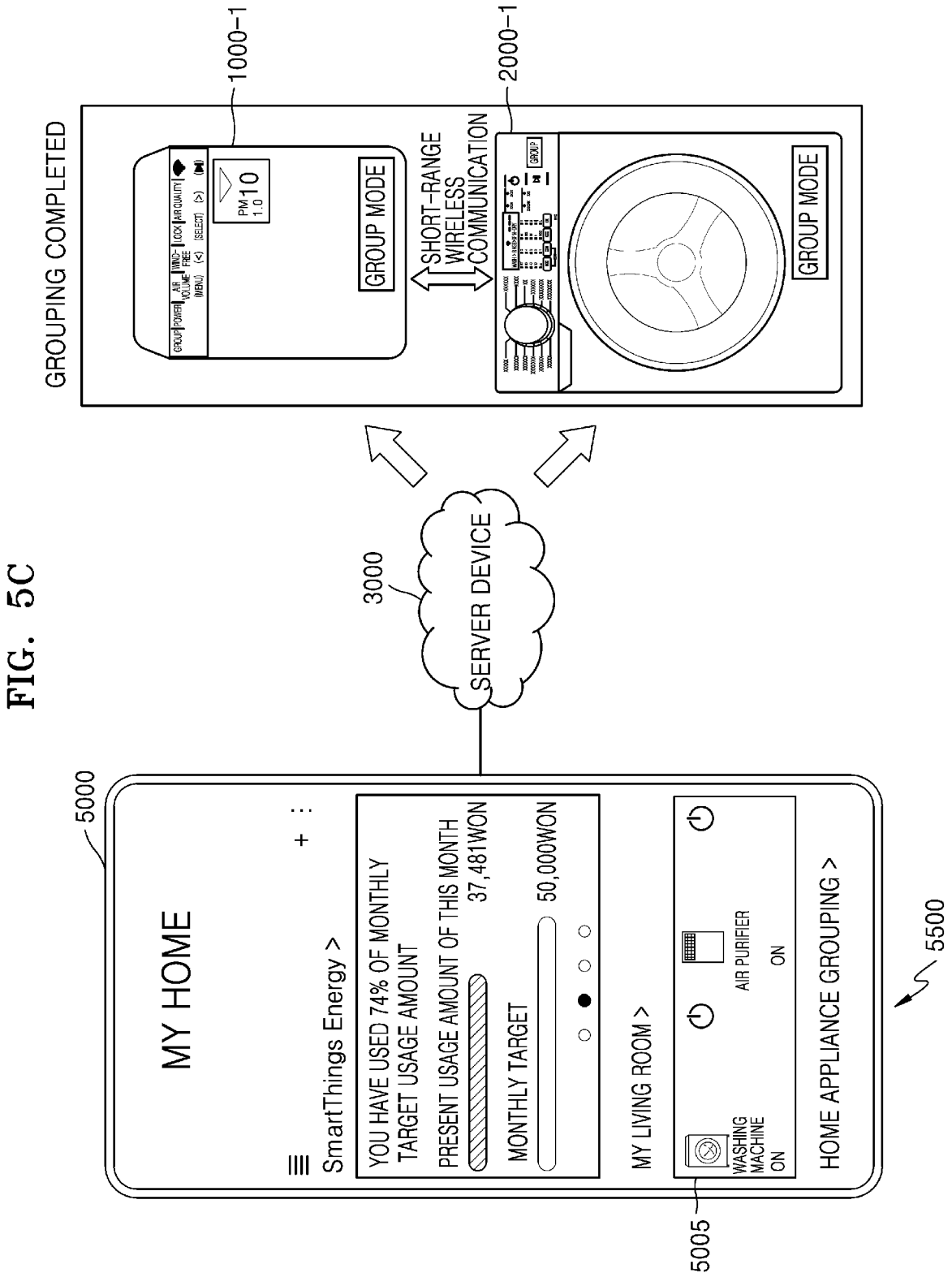
FIG. 5C illustrates an operation of grouping a first home appliance and a second home appliance through a server device, according to an embodiment of the present disclosure.

FIGS. 5A to 5C are diagrams for describing an operation of grouping the first home appliance 1000 and the second home appliance 2000 through the server device 3000, according to an embodiment of the present disclosure. In FIGS. 5A to 5C, an example in which the first home appliance 1000 assigned as the assistant device is an air purifier 1000-1 and the second home appliance 2000 assigned as the actually used device is a washing machine 2000-1 will be described.

Referring to FIG. 5A, the user may execute a home appliance management application provided by the server device 3000, through a display device 5000 accessible to the server device 3000. The display device 5000 may be a device that is connected to the first home appliance 1000 and the second home appliance 2000 under same account information.

Referring to a reference numeral 5100 of FIG. 5A, when the user executes the home appliance management application, the display device 5000 may display an execution screen of the home appliance management application. The execution screen of the home appliance management application may display a list of home appliances installed in the house and an item for grouping home appliances (e.g., a home appliance grouping icon 5001). To group home appliances, the user may select the home appliance grouping icon 5001.

Referring to a reference numeral 5200 of FIG. 5A, when the user selects the home appliance grouping icon 5001, the display device 5000 may provide a grouping setting window 5002. Here, the grouping setting window 5002 may display home appliances capable of providing a grouping function from among the home appliances inside the house. For example, an icon of a home appliance (e.g., the washing machine 2000-1 and the air purifier 1000-1) capable of providing the grouping function from among the home appliances inside the house may be displayed in an activated state, and an icon of a home appliance (e.g., a dryer 2000-2) incapable of providing the grouping function may be displayed in an inactivated state.

Referring to a reference numeral 5300 of FIG. 5B, the user may select home appliances desired to be grouped. For example, when the user wants to group the washing machine 2000-1 and the air purifier 1000-1, the user may drag an icon of the air purifier 1000-1 from the grouping setting window 5002 over an icon of the washing machine 2000-1 while touching the icon of the air purifier 1000-1, and then drop the icon of the air purifier 1000-1. In this case, the server device 3000 may obtain information indicating that the user is grouping the washing machine 2000-1 and the air purifier 1000-1 through the display device 5000, and perform communication connection between the washing machine 2000-1 and the air purifier 1000-1. For example, the server device 3000 may command the washing machine 2000-1 to perform the communication connection with the air purifier 1000-1 while transmitting communication connection information of the air purifier 1000-1, or may command the air purifier 1000-1 to perform the communication connection with the washing machine 2000-1 while transmitting communication connection information of the washing machine 2000-1. In this case, the washing machine 2000-1 and the air purifier 1000-1 may establish a communication channel.

Referring to a reference numeral 5400 of FIG. 5B, when the washing machine 2000-1 and the air purifier 1000-1 have completed the communication connection, the execution screen of the application may display a popup window indicating grouping communication connection completion. Here, the popup window may include a field for assigning roles of home appliances. For example, the popup window may include a first field 5003 for assigning an actually used device and a second field 5004 for assigning an assistant device. The user may assign the washing machine 2000-1, from among the grouped washing machine 2000-1 and air purifier 1000-1, as the actually used device through the first field 5003. The user may assign the air purifier 1000-1, from among the grouped washing machine 2000-1 and air purifier 1000-1, as the assistant device through the second field 5004.

Meanwhile, in FIG. 5B, an example in which the user determines the roles of the home appliances after selecting the home appliances to be grouped has been described, but the user may simultaneously select the home appliance to be grouped and determine the roles thereof. For example, when a guide to touch an icon of a home appliance to be selected as an actually used device and then move the same over an icon of a home appliance to be selected as an assistant device is provided, the server device 3000 may define a home appliance corresponding to an icon first touched by the user as an actually used device and define a home appliance corresponding to an icon touched afterwards as an assistant device.

Referring to FIG. 5C, the server device 3000 may receive an input of assigning the washing machine 2000-1 as the actually used device and assigning the air purifier 1000-1 as the assistant device through the display device 5000. Also, the server device 3000 may transmit role information to the air purifier 1000-1 and the washing machine 2000-1. For example, the server device 3000 may transmit, to the air purifier 1000-1, the role information to operate as the assistant device of the washing machine 2000-1. The server device 3000 may transmit, to the washing machine 2000-1, the role information to operate as the actually used device while providing information related to operations of the air purifier 1000-1.

Referring to a reference numeral 5500 of FIG. 5C, grouping information 5005 indicating that the washing machine 2000-1 and the air purifier 1000-1 have been grouped may be displayed on the execution screen of the application.

Then, when the user presses a button for activating a group mode of the air purifier 1000-1 and the washing machine 2000-1, the air purifier 1000-1 and the washing machine 2000-1 may activate the group mode and perform respective roles in the group. For example, the washing machine 2000-1 may perform original functions (e.g., a washing function) while transmitting operation information related to washing to the air purifier 1000-1 through short-range wireless communication. The air purifier 1000-1 may receive the operation information of the washing machine 2000-1 from the washing machine 2000-1 through the short-range wireless communication and output the operation information of the washing machine 2000-1 through a display or a speaker. In this case, the user may monitor an operating state of the washing machine 2000-1 through the air purifier 1000-1 located in a living room, without having to move to a balcony where the washing machine 2000-1 is located.

Meanwhile, according to an embodiment of the present disclosure, the user may switch the roles of the washing machine 2000-1 and the air purifier 1000-1 through the execution screen of the application. When the user switches the roles of the washing machine 2000-1 and the air purifier 1000-1, the washing machine 2000-1 may operate as an assistant device of the air purifier 1000-1.

Figure 6:
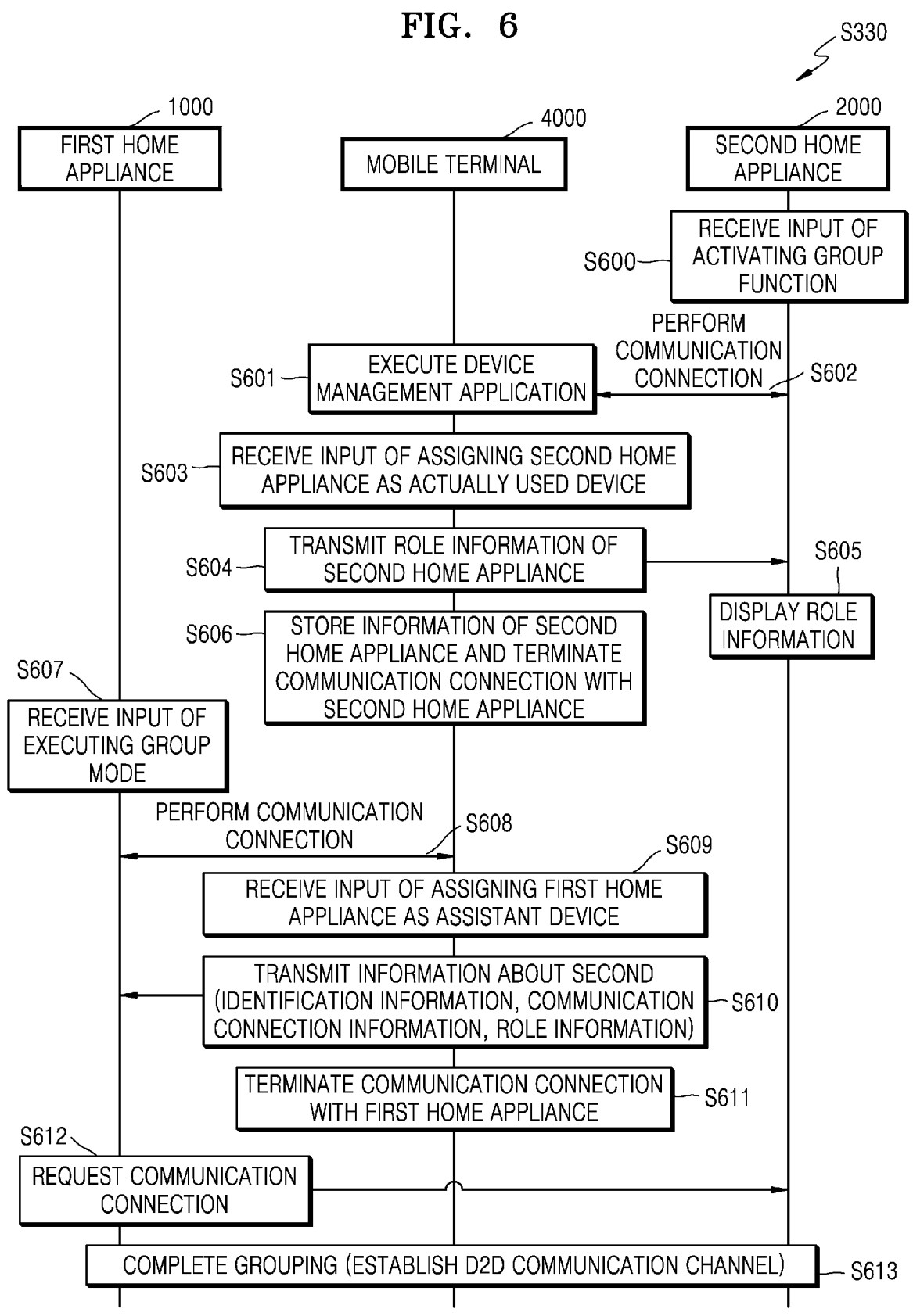
FIG. 6 illustrates a method of performing a grouping operation through a mobile terminal, according to an embodiment of the present disclosure.

FIG. 6 illustrates a method of performing the grouping operation through a mobile terminal 4000, according to an embodiment of the present disclosure. In FIG. 6, an example in which the first home appliance 1000 is assigned as the assistant device and the second home appliance 2000 is assigned as the actually used device is described.

In operation 5600, the second home appliance 2000 may receive the input of executing the group mode. For example, the second home appliance 2000 may receive an input of selecting a certain button related to the group function, arranged in the second home appliance 2000. Alternatively, the second home appliance 2000 may receive, from the user, a speech command for executing the group mode. Here, because the second home appliance 2000 is not in a grouped state, a grouping setting mode may be activated to perform the grouping operation.

According to an embodiment of the present disclosure, when the input of executing the group mode is received, the second home appliance 2000 may prepare communication connection with the mobile terminal 4000. For example, the second home appliance 2000 may operate in a detection mode for the mobile terminal 4000 to detect the second home appliance 2000. Also, the second home appliance 2000 may broadcast a BLE advertising packet.

In operation 5601, the mobile terminal 4000 may execute an application for home appliance management. The mobile terminal 4000 may be one of a smartphone, a tablet PC, a digital camera, an electronic book terminal, and a wearable device, but is not limited thereto. Hereinafter, an example in which the mobile terminal 4000 is a smartphone will be described.

In operation 5602, when the user executes the application in the mobile terminal 4000, the mobile terminal 4000 may scan the surroundings and detect the second home appliance 2000. Also, the mobile terminal 4000 may detect the second home appliance 2000 by receiving the BLE advertising packet broadcasted by the second home appliance 2000.

When the second home appliance 2000 is detected, the mobile terminal 4000 may display an icon of the second home appliance 2000 on an execution screen of the application. At this time, when the user selects the icon of the second home appliance 2000, the mobile terminal 4000 may perform a pairing procedure with the second home appliance 2000 and establish a short-range wireless communication channel (e.g., a Bluetooth communication channel or a BLE communication channel) with the second home appliance 2000. When the second home appliance 2000 and the mobile terminal 4000 have been paired with each other before, the pairing procedure may be omitted.

Meanwhile, when the BLE advertising packet broadcasted by the second home appliance 2000 includes some (or all) of a manufacture identification (ID), a Wi-Fi MAC address, an SSID, a timestamp, channel information, and a product serial number of the second home appliance 2000, the mobile terminal 4000 may perform a pre-determined D2D protocol to establish a WFD communication channel with the second home appliance 2000.

In operation 5603, the mobile terminal 4000 according to an embodiment of the present disclosure may receive an input of assigning the second home appliance 2000 as the actually used device. For example, the mobile terminal 4000 may receive a user input of assigning the second home appliance 2000 as the actually used device, on the execution screen of the application.

In operation 5604, the mobile terminal 4000 according to an embodiment of the present disclosure may transmit the role information of the second home appliance 2000 to the second home appliance 2000. For example, the mobile terminal 4000 may transmit the role information indicating that the second home appliance 2000 has been assigned as the actually used device to the second home appliance 2000 through the short-range wireless communication channel.

In operation 5605, the second home appliance 2000 according to an embodiment of the present disclosure may receive the role information of the second home appliance 2000 from the mobile terminal 4000 and display the role information of the second home appliance 2000 on the display.

For example, the second home appliance 2000 may display, on the display, text, an image, or an icon indicating that the second home appliance 2000 is operating as the actually used device. According to an embodiment of the present disclosure, the second home appliance 2000 may output the role information of the second home appliance 2000 in a speech signal.

In operation 5606, when the role information is transmitted to the second home appliance 2000, the mobile terminal 4000 according to an embodiment of the present disclosure may store the information of the second home appliance 2000 in a memory and terminate the communication connection with the second home appliance 2000. For example, the mobile terminal 4000 may release the short-range wireless communication channel with the second home appliance 2000.

The information of the second home appliance 2000 may include the identification information of the second home appliance 2000, the communication connection information of the second home appliance 2000, and the role information of the second home appliance 2000, but is not limited thereto.

Even when the communication connection between the mobile terminal 4000 and the second home appliance 2000 is terminated, the grouping is not yet completed, and thus, the grouping setting mode of the second home appliance 2000 may maintain an activated state. Meanwhile, the mobile terminal 4000 may activate a scan mode to find another home appliance to be grouped with the second home appliance 2000.

In operation 5607, the first home appliance 1000 may receive an input of executing the group mode. For example, the first home appliance 1000 may receive an input of selecting a certain button related to the group function, arranged in the first home appliance 1000. Alternatively, the first home appliance 1000 may receive, from the user, a speech command for executing the group mode. Here, because the first home appliance 1000 is not in a grouped state, the grouping setting mode may be activated to perform the grouping operation.

In operation 5608, when the input of executing the group mode is received, the first home appliance 1000 may prepare communication connection with the mobile terminal 4000. For example, the first home appliance 1000 may operate in a detection mode for the mobile terminal 4000 to detect the first home appliance 1000. Also, the first home appliance 1000 may broadcast a BLE advertising packet.

The mobile terminal 4000 may scan the surroundings to detect the first home appliance 1000. Also, the mobile terminal 4000 may detect the first home appliance 1000 by receiving the BLE advertising packet broadcasted by the first home appliance 1000.

When the first home appliance 1000 is detected, the mobile terminal 4000 may display an icon of the first home appliance 1000 on the execution screen of the application. At this time, when the user selects the icon of the first home appliance 1000, the mobile terminal 4000 may perform a pairing procedure with the first home appliance 1000 and establish a short-range wireless communication channel (e.g., a Bluetooth communication channel or a BLE communication channel) with the first home appliance 1000.

When the first home appliance 1000 and the mobile terminal 4000 have been paired with each other before, the pairing procedure may be omitted.

Meanwhile, when the BLE advertising packet broadcasted by the first home appliance 1000 includes some (or all) of a manufacture ID, a Wi-Fi MAC address, an SSID, and a product serial number of the first home appliance 1000, the mobile terminal 4000 may perform a pre-determined D2D protocol to establish a WFD communication channel with the first home appliance 1000.

In operation 5609, the mobile terminal 4000 according to an embodiment of the present disclosure may receive an input of assigning the first home appliance 1000 as the assistant device. For example, the mobile terminal 4000 may receive a user input of assigning the first home appliance 1000 as the assistant device, on the execution screen of the application.

In operation 5610, when the first home appliance 1000 is assigned as the assistant device of the second home appliance 2000, the mobile terminal 4000 according to an embodiment of the present disclosure may transmit the information about the second home appliance 2000 to the first home appliance 1000. For example, the mobile terminal 4000 may transmit, to the first home appliance 1000, the identification information of the second home appliance 2000, the communication connection information of the second home appliance 2000, and the role information of the second home appliance 2000.

The communication connection information of the second home appliance 2000 may be information enabling the first home appliance 1000 to be connected to the second home appliance 2000. For example, when the second home appliance 2000 supports Wi-Fi communication, the communication connection information of the second home appliance 2000 may include a timestamp, identification information (e.g., an SSID, a BSSID or a MAC address), channel information, function information (e.g., tethering capability), and state information, but is not limited thereto. When the second home appliance 2000 supports Bluetooth communication, the communication connection information of the second home appliance 2000 may include a BT address, a product name, and profile information, but is not limited thereto.

In operation 5611, when the information about the second home appliance 2000 is transmitted to the first home appliance 1000, the mobile terminal 4000 may terminate the communication connection with the first home appliance 1000.

In operation 5612, the first home appliance 1000 according to an embodiment of the present disclosure may request the second home appliance 2000 for communication connection. For example, the first home appliance 1000 may request the second home appliance 2000 for the communication connection, based on the communication connection information of the second home appliance 2000, received from the mobile terminal 4000.

In operation 5613, according to an embodiment of the present disclosure, the second home appliance 2000 may respond to the communication connection request of the first home appliance 1000, and thus, the short-range wireless communication channel may be established between the first home appliance 1000 and the second home appliance 2000. The short-range wireless communication channel may include one of a Bluetooth communication channel, a BLE communication channel, a WFD communication channel, a Zigbee communication channel, and a Z-wave communication channel, but is not limited thereto. According to an embodiment of the present disclosure, a state in which the first home appliance 1000 and the second home appliance 2000 have established the D2D communication channel (the short-range wireless communication channel) may be defined as the grouping completed state.

When the grouping of the first home appliance 1000 and the second home appliance 2000 is completed, the first home appliance 1000 and the second home appliance 2000 may activate the group mode according to a user input. In this case, the first home appliance 1000 may operate as the assistant device of the second home appliance 2000 and the second home appliance 2000 may operate as the actually used device. When the first home appliance 1000 operates as the assistant device of the second home appliance 2000, the first home appliance 1000 may monitor the operations of the second home appliance 2000 or control the second home appliance 2000.

According to an embodiment of the present disclosure, even when the first home appliance 1000 and the second home appliance 2000 are not connected to an external network through a router (e.g., an AP), the user may simply group the first home appliance 1000 and the second home appliance 2000 through the execution screen of the application provided by the mobile terminal 4000. Operations by which the first home appliance 1000 and the second home appliance 2000 group through the mobile terminal 4000 will be described in more detail with reference to FIGS. 7A to 7D.

FIGS. 7A to 7D are diagrams for describing an operation of grouping the first home appliance 1000 and the second home appliance 2000 through the mobile terminal 4000, according to an embodiment of the present disclosure. In FIGS. 7A to 7D, an example in which the first home appliance 1000 assigned as the assistant device is the air purifier 1000-1 and the second home appliance 2000 assigned as the actually used device is the washing machine 2000-1 will be described.

Figure 7A:
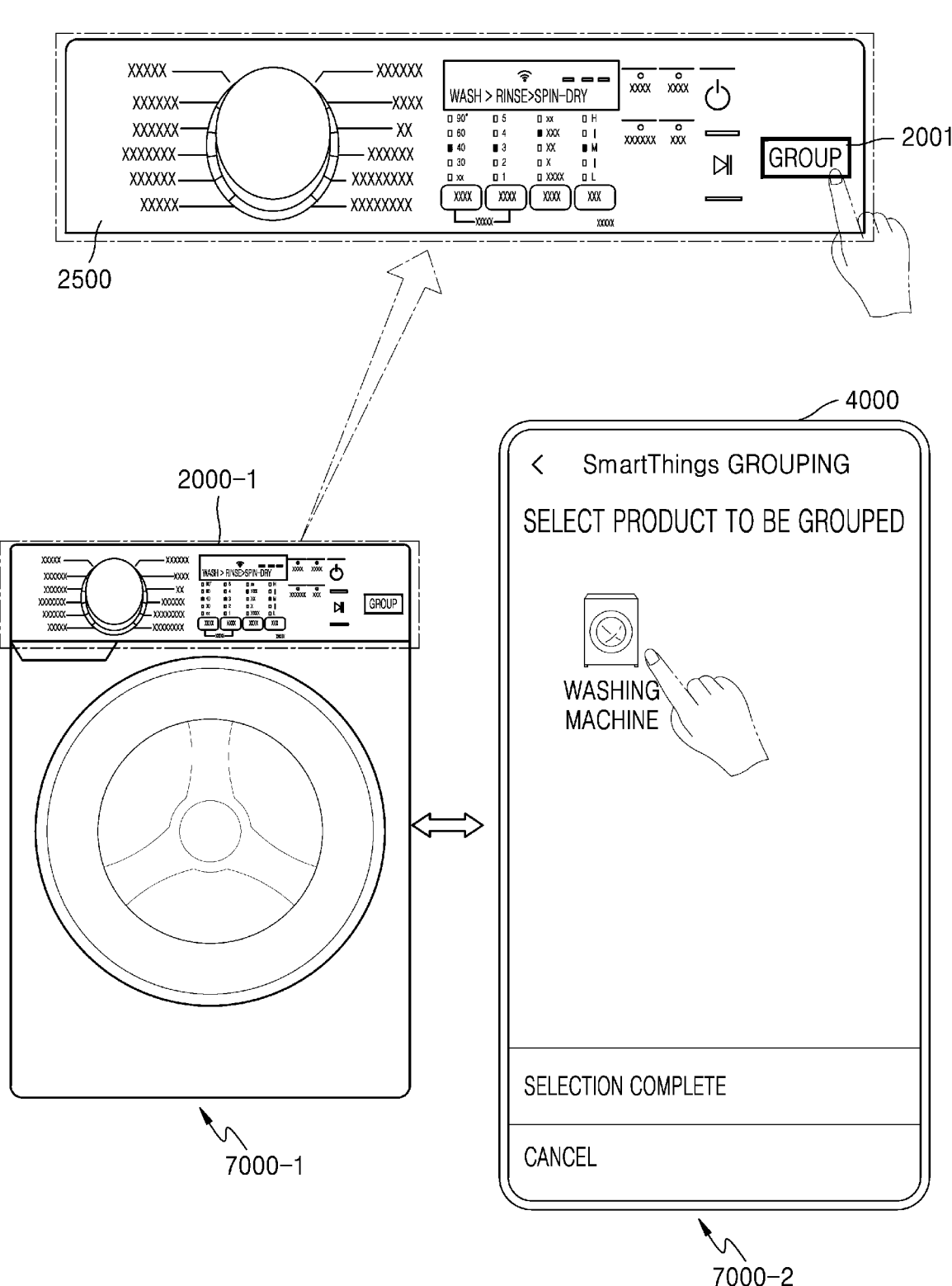
FIG. 7A illustrates an operation of grouping a first home appliance and a second home appliance through a mobile terminal, according to an embodiment of the present disclosure.

Referring to a reference numeral 7000-1 of FIG. 7A, the user may touch a group button 2001 included in a user input interface 2500 of the washing machine 2000-1. An input of touching the group button 2001 may be an input of executing the group mode or an input of activating the grouping function. Upon detecting the user input of touching the group button 2001, the washing machine 2000-1 may activate the grouping setting mode and prepare the communication connection with the mobile terminal 4000. For example, the washing machine 2000-1 may operate in a detection mode for the mobile terminal 4000 to detect the washing machine 2000-1. Also, the washing machine 2000-1 may broadcast a BLE advertising packet.

Referring to a reference numeral 7000-2 of FIG. 7A, the user may execute the application for the home appliance management in the mobile terminal 4000 after pressing the group button 2001 of the washing machine 2000-1. In this case, the mobile terminal 4000 may detect the washing machine 2000-1 by scanning the surroundings. Also, the mobile terminal 4000 may detect the washing machine 2000-1 by receiving the BLE advertising packet broadcasted by the washing machine 2000-1.

When the washing machine 2000-1 is detected, the mobile terminal 4000 may display the icon of the washing machine 2000-1 on an execution screen 7001 of the application. Here, when the user selects the icon of the washing machine 2000-1 from the execution screen 7001 of the application, the mobile terminal 4000 may perform the pairing procedure with the washing machine 2000-1 and establish the short-range wireless communication channel (e.g., the Bluetooth communication channel or the BLE communication channel) with the washing machine 2000-1.

Meanwhile, when the BLE advertising packet broadcasted by the washing machine 2000-1 includes some (or all) of a manufacture ID, a Wi-Fi MAC address, an SSID, a timestamp, channel information, and a product serial number of the washing machine 2000-1, the mobile terminal 4000 may perform the pre-determined D2D protocol to establish the WFD communication channel with the washing machine 2000-1.

Referring to a reference numeral 7000-3 of FIG. 7B, the user may assign the washing machine 2000-1 as the actually used device by using a first field 7002 for assigning an actually used device, included in the execution screen 7001 of the application. Here, the mobile terminal 4000 may transmit, to the washing machine 2000-1, role information indicating assignment as the actually used device.

Referring to a reference numeral 7000-4 of FIG. 7B, the washing machine 2000-1 may display the role information on a display 2510 or output a speech indicating the role information, based on the role information received from the mobile terminal 4000. For example, the washing machine 2000-1 may display text ("TARGET") indicating an actually used device to flicker on the display 2510.

Figure 7C:
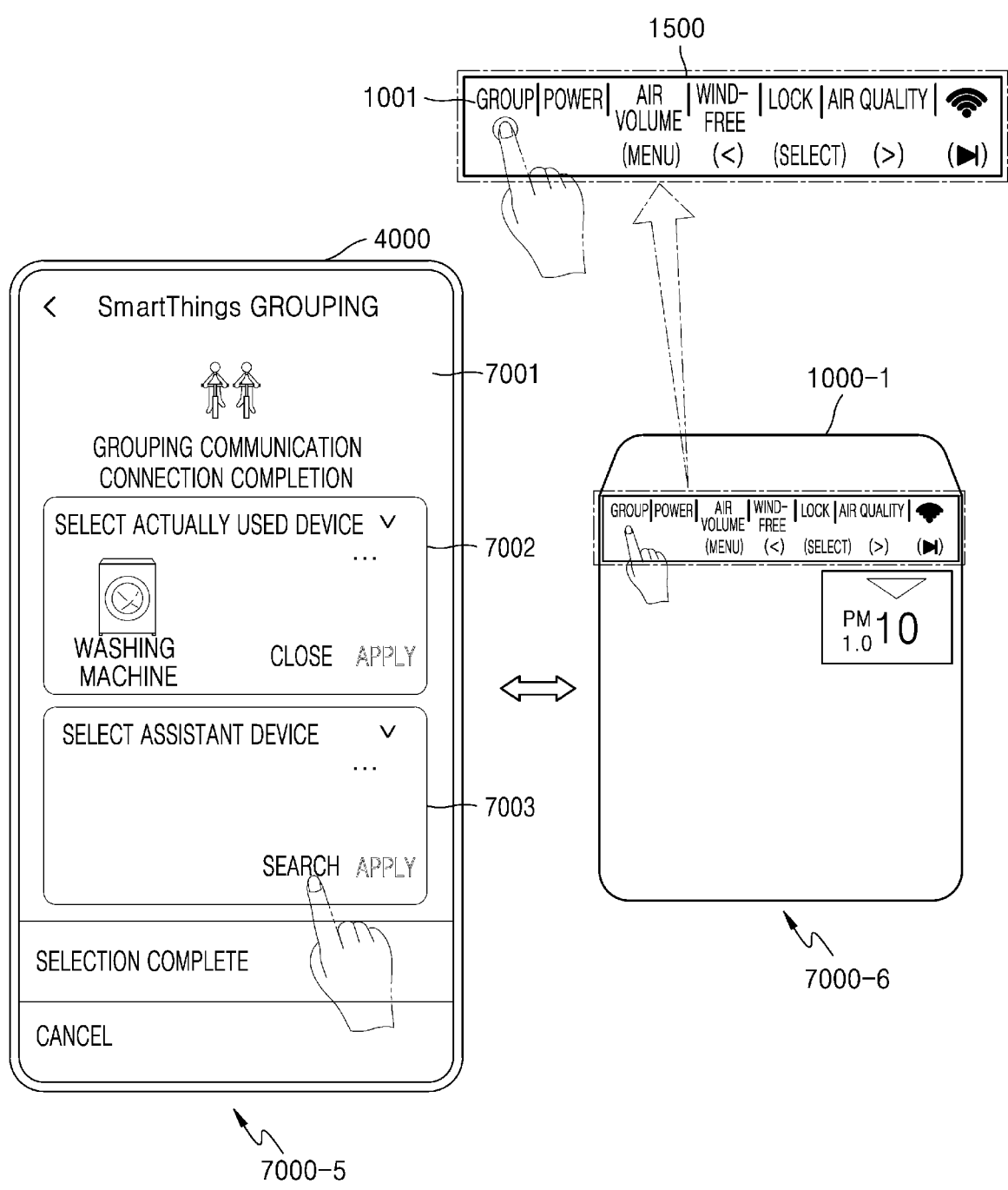
FIG. 7C illustrates an operation of grouping a first home appliance and a second home appliance through a mobile terminal, according to an embodiment of the present disclosure.

Referring to a reference numeral 7000-5 of FIG. 7C, the mobile terminal 4000 may receive a user input of selecting a button for searching for an assistant device from a second field 7003 for assigning an assistant device, included in the execution screen 7001 of the application. In this case, the mobile terminal 4000 may store the information of the washing machine 2000-1 in a memory, and then terminate communication with the washing machine 2000-1 and prepare to be connected to a home appliance that is to operate as an assistant device. Even when the communication connection with the mobile terminal 4000 is terminated, the washing machine 2000-1 may maintain the grouping setting mode in an activated state.

Referring to a reference numeral 7000-6 of FIG. 7C, the air purifier 1000-1 may receive a user input of touching a group button 1001 included in a user input interface 1500 of the air purifier 1000-1. An input of touching the group button 1001 may be an input of executing the group mode or an input of activating the grouping function. Upon detecting the user input of touching the group button 1001, the air purifier 1000-1 may activate the grouping setting mode and prepare the communication connection with the mobile terminal 4000. For example, the air purifier 1000-1 may operate in a detection mode for the mobile terminal 4000 to detect the air purifier 1000-1. Also, the air purifier 1000-1 may broadcast a BLE advertising packet.

Figure 7D:
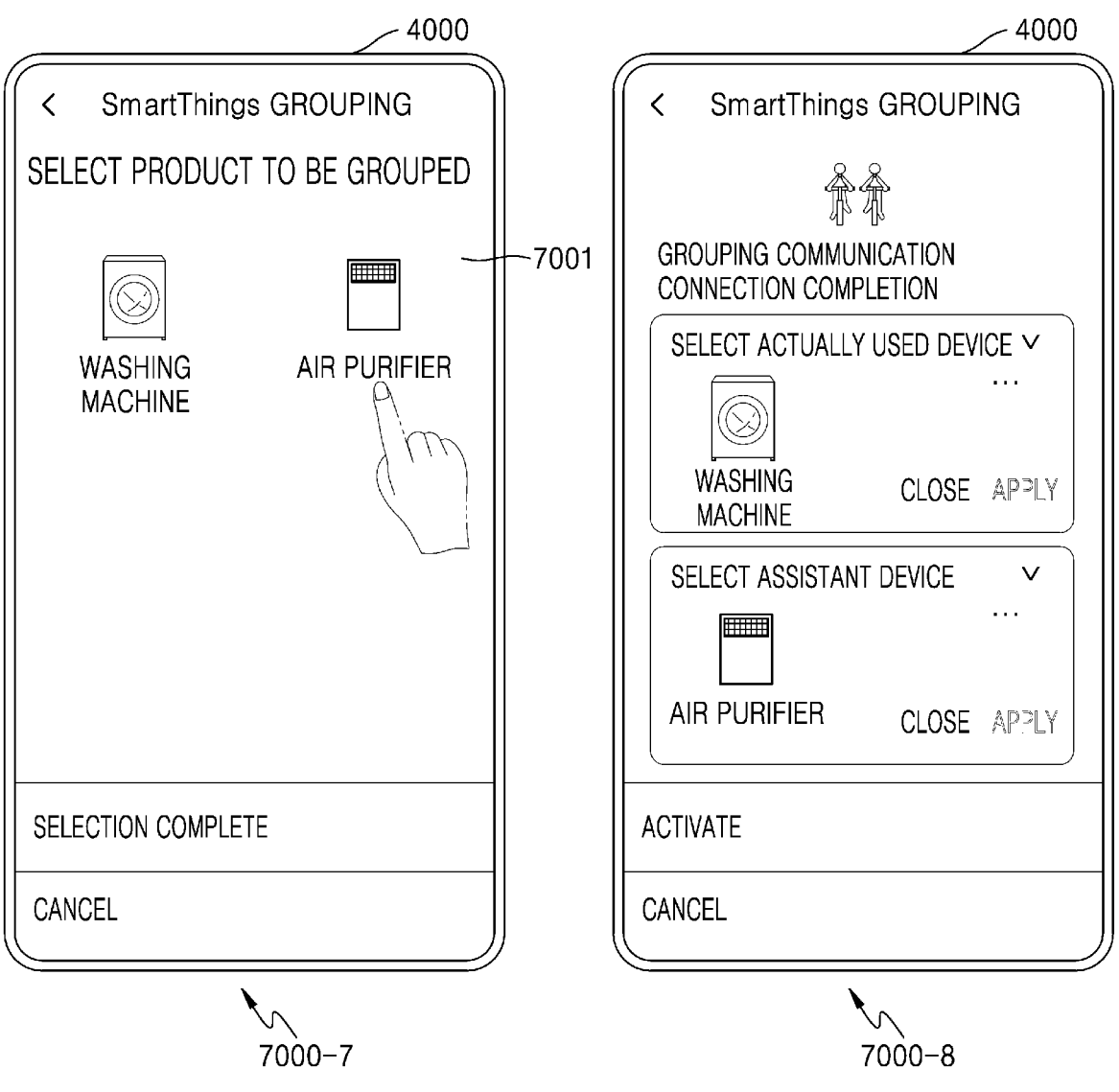
FIG. 7D illustrates an operation of grouping a first home appliance and a second home appliance through a mobile terminal, according to an embodiment of the present disclosure.

Referring to a reference numeral 7000-7 of FIG. 7D, the mobile terminal 4000 may detect the air purifier 1000-1 by scanning the surroundings. Also, the mobile terminal 4000 may detect the air purifier 1000-1 by receiving the BLE advertising packet broadcasted by the air purifier 1000-1. When the air purifier 1000-1 is detected, the mobile terminal 4000 may display the icon of the air purifier 1000-1 on the execution screen 7001 of the application.

Here, when the user selects the icon of the air purifier 1000-1 from the execution screen 7001 of the application, the mobile terminal 4000 may perform the pairing procedure with the air purifier 1000-1 and establish the short-range wireless communication channel (e.g., the Bluetooth communication channel or the BLE communication channel) with the air purifier 1000-1.

Meanwhile, when the BLE advertising packet broadcasted by the air purifier 1000-1 includes some (or all) of a manufacture ID, a Wi-Fi MAC address, an SSID, a timestamp, channel information, and a product serial number of the air purifier 1000-1, the mobile terminal 4000 may perform the pre-determined D2D protocol to establish the WFD communication channel with the air purifier 1000-1.

Referring to a reference numeral 7000-8 of FIG. 7D, the mobile terminal 4000 may transmit, to the air purifier 1000-1, the information about the washing machine 2000-1, stored in the memory. For example, the mobile terminal 4000 may transmit, to the air purifier 1000-1, the identification information of the washing machine 2000-1, the communication connection information of the washing machine 2000-1, and the role information of the washing machine 2000-1. Also, the mobile terminal 4000 may terminate the communication with the air purifier 1000-1. The air purifier 1000-1 in which the grouping setting mode is activated may establish the communication channel with the washing machine 2000-1, based on the information about the washing machine 2000-1, received from the mobile terminal 4000. Then, when the group mode is activated in the air purifier 1000-1 and the washing machine 2000-1, the air purifier 1000-1 may operate as the assistant device of the washing machine 2000-1.

In FIGS. 7A to 7D, an example in which the user touches the group button in the washing machine 2000-1 and the air purifier 1000-1 to activate the grouping function is described, but an embodiment is not limited thereto. For example, the user may activate the grouping function in the washing machine 2000-1 and the air purifier 1000-1 through a speech input or an input (IR signal transmission) through a remote control device.

Meanwhile, according to an embodiment of the present disclosure, the user may switch the roles of the washing machine 2000-1 and the air purifier 1000-1 through the execution screen 7001 of the application. When the user switches the roles of the washing machine 2000-1 and the air purifier 1000-1, the washing machine 2000-1 may operate as the assistant device of the air purifier 1000-1.

Figure 8:
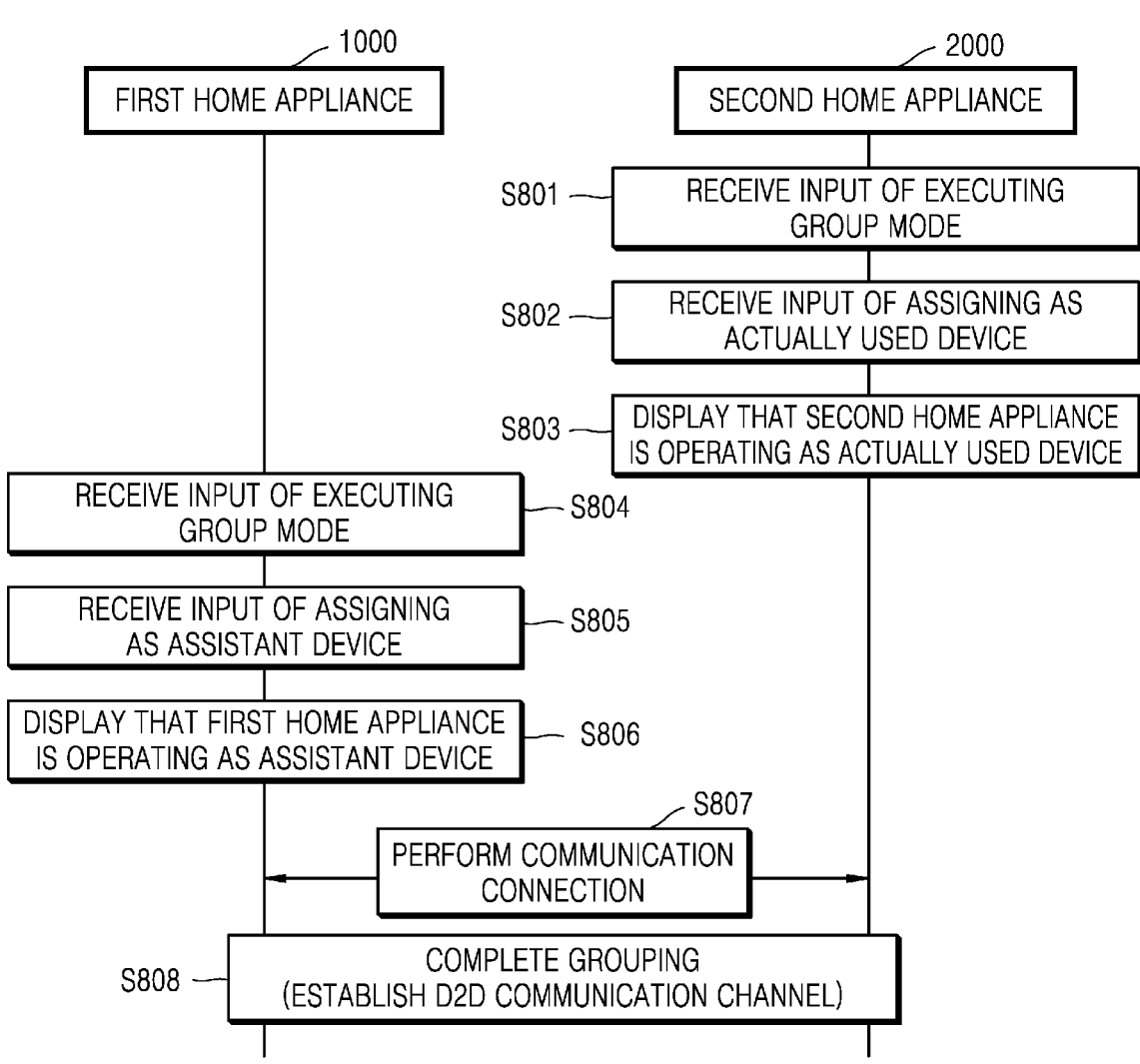
FIG. 8 illustrates a method of performing a grouping operation through device-to-device (D2D) communication between a first home appliance and a second home appliance, according to an embodiment of the present disclosure.

FIG. 8 illustrates a method of performing the grouping operation through the D2D communication between the first home appliance 1000 and the second home appliance 2000, according to an embodiment of the present disclosure. In FIG. 8, an example in which the first home appliance 1000 is assigned as the assistant device and the second home appliance 2000 is assigned as the actually used device is described.

In operation 5801, the second home appliance 2000 may receive the input of executing the group mode. For example, the second home appliance 2000 may receive the input of selecting the certain button related to the group function, arranged in the second home appliance 2000. Alternatively, the second home appliance 2000 may receive, from the user, the speech command for executing the group mode. Here, because the second home appliance 2000 is not in a grouped state, the grouping setting mode may be activated to perform the grouping operation.

According to an embodiment of the present disclosure, when the input of executing the group mode is received, the second home appliance 2000 may prepare communication connection with another home appliance (e.g., the first home appliance 1000). For example, the second home appliance 2000 may operate in the detection mode for the first home appliance 1000 to detect the second home appliance 2000. Also, the second home appliance 2000 may broadcast the BLE advertising packet.

In operation 5802, the second home appliance 2000 may receive an input of assigning as the actually used device. For example, the second home appliance 2000 may receive, through the user input interface, an input of assigning the role of the second home appliance 2000 as the actually used device.

In operation 5803, the second home appliance 2000 may display that the second home appliance 2000 is operating as the actually used device. For example, the second home appliance 2000 may display, on the display, the text, the image, or the icon indicating that the second home appliance 2000 is operating as the actually used device. According to an embodiment of the present disclosure, the second home appliance 2000 may output the role information of the second home appliance 2000 in a speech signal.

In operation 5804, the first home appliance 1000 may receive the input of executing the group mode. For example, the first home appliance 1000 may receive the input of selecting the certain button related to the group function, arranged in the first home appliance 1000. Alternatively, the first home appliance 1000 may receive, from the user, the speech command for executing the group mode. Here, because the first home appliance 1000 is not in a grouped state, the grouping setting mode may be activated to perform the grouping operation.

In operation 5805, the first home appliance 1000 according to an embodiment of the present disclosure may receive an input of assigning the first home appliance 1000 as the assistant device. For example, the first home appliance 1000 may receive, through the user input interface, an input of assigning the role of the first home appliance 1000 as the assistant device.

In operation 5806, the first home appliance 1000 according to an embodiment of the present disclosure may display that the first home appliance 1000 is operating as the assistant device. For example, the first home appliance 1000 may display, on the display, text (e.g., ASSISTANT or AUXILIARY), an image, or an icon indicating that the first home appliance 1000 is operating as the assistant device. According to an embodiment of the present disclosure, the first home appliance 1000 may output the role information of the first home appliance 1000 in a speech signal (or a voice signal). For example, the first home appliance 1000 may output, through a speaker, a guide speech of "operating as assistant device".

In operation 5807, the first home appliance 1000 and the second home appliance 2000 may perform communication connection. For example, the first home appliance 1000 may detect the second home appliance 2000 by scanning the surroundings. Also, the first home appliance 1000 may detect the second home appliance 2000 by receiving the BLE advertising packet broadcasted by the second home appliance 2000.

When the second home appliance 2000 is detected, the first home appliance 1000 may display, on the display, a popup window inquiring whether to group with the second home appliance 2000. At this time, when the user approves the grouping with the second home appliance 2000, the first home appliance 1000 may perform a pairing procedure with the second home appliance 2000 and establish a short-range wireless communication channel (e.g., a Bluetooth communication channel or a BLE communication channel) with the second home appliance 2000. When the second home appliance 2000 and the first home appliance 1000 have been paired with each other before, the pairing procedure may be omitted. Meanwhile, according to an embodiment of the present disclosure, a procedure by which the first home appliance 1000 displays the popup window inquiring whether to group with the second home appliance 2000 may be omitted.

Meanwhile, when the BLE advertising packet broadcasted by the second home appliance 2000 includes some (or all) of a manufacture identification (ID), a Wi-Fi MAC address, an SSID, a timestamp, channel information, and a product serial number of the second home appliance 2000, the first home appliance 1000 may perform a pre-determined D2D protocol to establish a WFD communication channel with the second home appliance 2000.

In operation 5808, according to an embodiment of the present disclosure, when the first home appliance 1000 and the second home appliance 2000 have established the D2D communication channel (short-range wireless communication channel), the first home appliance 1000 and the second home appliance 2000 may terminate the grouping setting mode and complete the grouping.

Meanwhile, according to an embodiment of the present disclosure, the first home appliance 1000 and the second home appliance 2000 may exchange the role information through the D2D communication channel (short-range wireless communication channel). For example, the first home appliance 1000 may transmit the role information of the first home appliance 1000 to the second home appliance 2000 and the second home appliance 2000 may transmit the role information of the second home appliance 2000 to the first home appliance 1000.

Thus, according to an embodiment of the present disclosure, the first home appliance 1000 and the second home appliance 2000 may complete the mutual grouping through the D2D communication without having to connect to an external network through a router (e.g., an AP). Hereinafter, an operation by which the first home appliance 1000 and the second home appliance 2000 complete the grouping through the D2D communication will be described in more detail below with reference to FIGS. 9A and 9B.

Figure 9A:
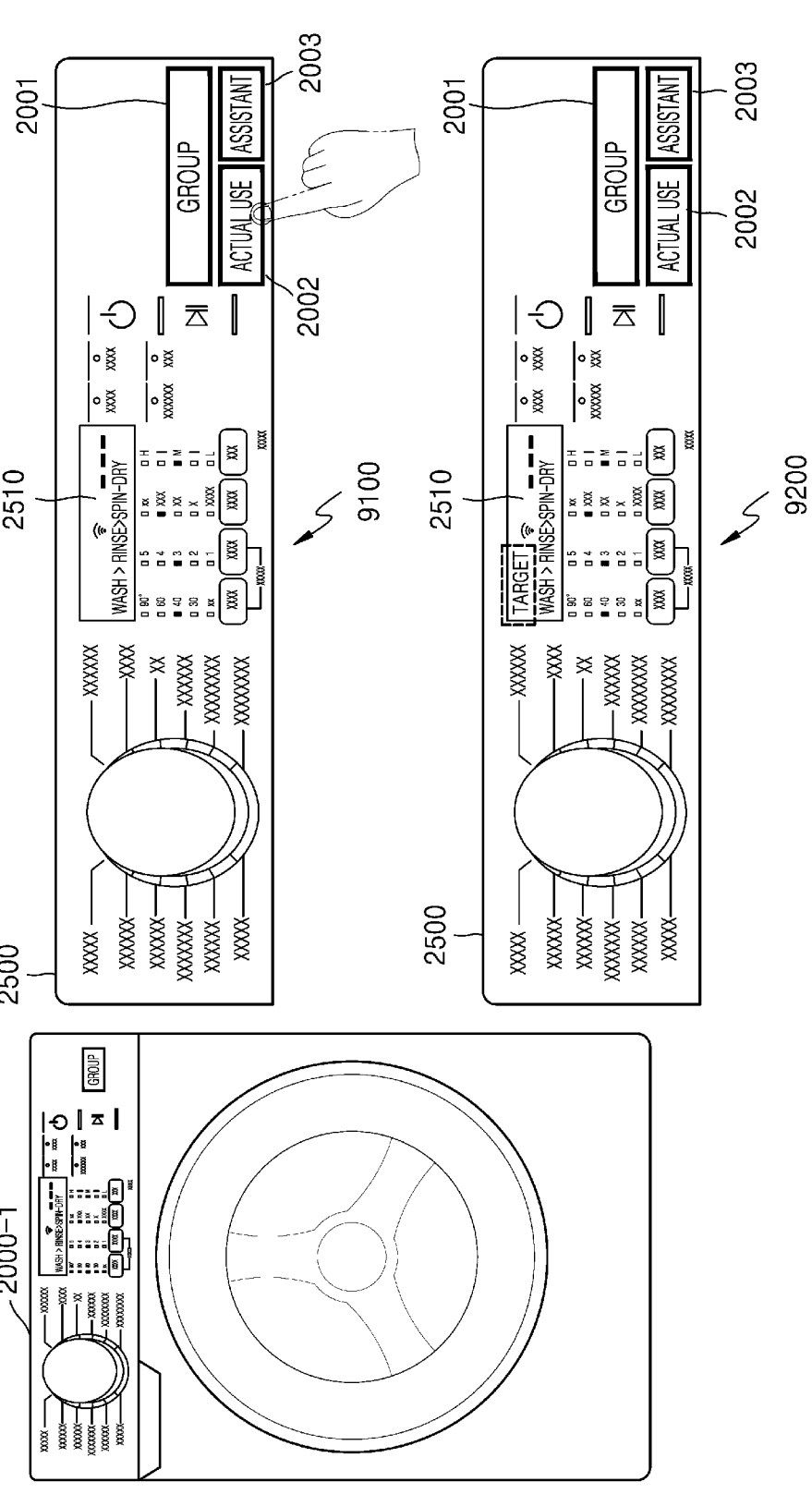
FIG. 9A illustrates an operation of grouping a first home appliance and a second home appliance through D2D communication, according to an embodiment of the present disclosure.
Figure 9B:
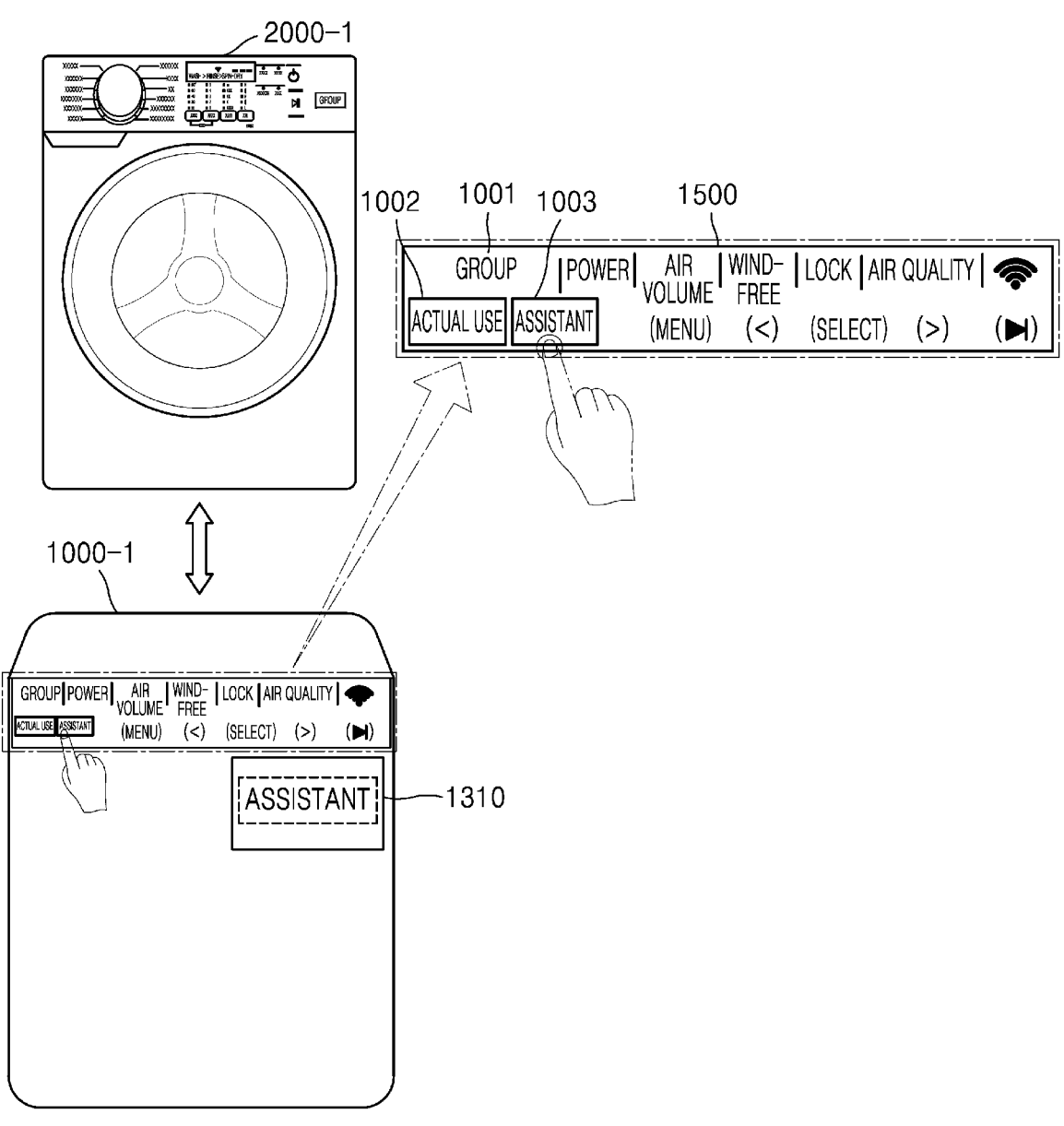
FIG. 9B illustrates an operation of grouping a first home appliance and a second home appliance through D2D communication, according to an embodiment of the present disclosure.

FIGS. 9A and 9B are diagrams for describing an operation of grouping the first home appliance 1000 and the second home appliance 2000 through the D2D communication, according to an embodiment of the present disclosure. In FIGS. 9A and 9B, an example in which the first home appliance 1000 assigned as the assistant device is the air purifier 1000-1 and the second home appliance 2000 assigned as the actually used device is the washing machine 2000-1 will be described.

Referring to a reference numeral 9100 of FIG. 9A, the user may touch the group button 2001 included in the user input interface 2500 of the washing machine 2000-1. The input of touching the group button 2001 may be an input of executing the group mode or an input of activating the grouping function. Upon detecting the user input of touching the group button 2001, the washing machine 2000-1 may activate the grouping setting mode and prepare the communication connection with another home appliance (e.g., the air purifier 1000-1) to be grouped. For example, the washing machine 2000-1 may operate in the detection mode for the air purifier 1000-1 to detect the washing machine 2000-1. Also, the washing machine 2000-1 may broadcast the BLE advertising packet.

The user may input the role of the washing machine 2000-1 after pressing the group button 2001. For example, the user may assign the role of the washing machine 2000-1 as the actually used device by selecting an actual use button 2002 included in the user input interface 2500.

Referring to a reference numeral 9200 of FIG. 9A, the washing machine 2000-1 may display the role information on the display 2510 or output a speech indicating the role information, based on the role information assigned by the user. For example, upon detecting the user pressing the actual use button 2002, the washing machine 2000-1 may display text ("TARGET") indicating the actually used device to flicker on the display 2510.

Referring to FIG. 9B, the air purifier 1000-1 may receive a user input of touching the group button 1001 included in the user input interface 1500 of the air purifier 1000-1. The input of touching the group button 1001 may be an input of executing the group mode or an input of activating the grouping function. Upon detecting the user input of touching the group button 1001, the air purifier 1000-1 may activate the grouping setting mode and prepare the communication connection with another home appliance (e.g., the washing machine 2000-1) to be grouped.

The user may input the role of the air purifier 1000-1 after pressing the group button 1001. For example, the user may assign the role of the air purifier 1000-1 as the assistant device by selecting an assistant button 1003 included in the user input interface 1500 of the air purifier 1000-1.

The air purifier 1000-1 may display the role information on a display 1310 or output a speech indicating the role information, based on the role information assigned by the user. For example, upon detecting the user pressing the assistant button 1003, the air purifier 1000-1 may display text ("ASSISTANT") indicating the assistant device to flicker on the display 1310.

The air purifier 1000-1 may detect the washing machine 2000-1 by scanning the surroundings. Also, the air purifier 1000-1 may detect the washing machine 2000-1 by receiving the BLE advertising packet broadcasted by the washing machine 2000-1. Here, the air purifier 1000-1 may perform the pairing procedure with the washing machine 2000-1 and establish the short-range wireless communication channel (e.g., the Bluetooth communication channel or the BLE communication channel) with the washing machine 2000-1. When the air purifier 1000-1 and the washing machine 2000-1 have been paired with each other before, the pairing procedure may be omitted.

Meanwhile, when the BLE advertising packet broadcasted by the washing machine 2000-1 includes some (or all) of a manufacture ID, a Wi-Fi MAC address, an SSID, a timestamp, channel information, and a product serial number of the washing machine 2000-1, the air purifier 1000-1 may perform the pre-determined D2D protocol to establish the WFD communication channel with the washing machine 2000-1.

According to an embodiment of the present disclosure, the air purifier 1000-1 and the washing machine 2000-1 may identify each other's roles through the D2D communication channel (e.g., the short-range wireless communication channel).

The roles of the air purifier 1000-1 and the washing machine 2000-1 may be switched according to a user input. For example, the user may switch the roles of the air purifier 1000-1 and the washing machine 2000-1 by using a user input interface of at least one of the air purifier 1000-1 or the washing machine 2000-1. An operation of switching the roles of the air purifier 1000-1 and the washing machine 2000-1 will be described in detail below with reference to FIGS. 13A to 14B.

When the group mode is activated in the air purifier 1000-1 and the washing machine 2000-1 after the grouping is completed, the air purifier 1000-1 and the washing machine 2000-1 may operate according to respective roles. For example, the air purifier 1000-1 may operate as the assistant device of the washing machine 2000-1. Hereinafter, a process by which the air purifier 1000-1 operates as the assistant device of the washing machine 2000-1 will be described with reference to FIG. 10.

Figure 10:
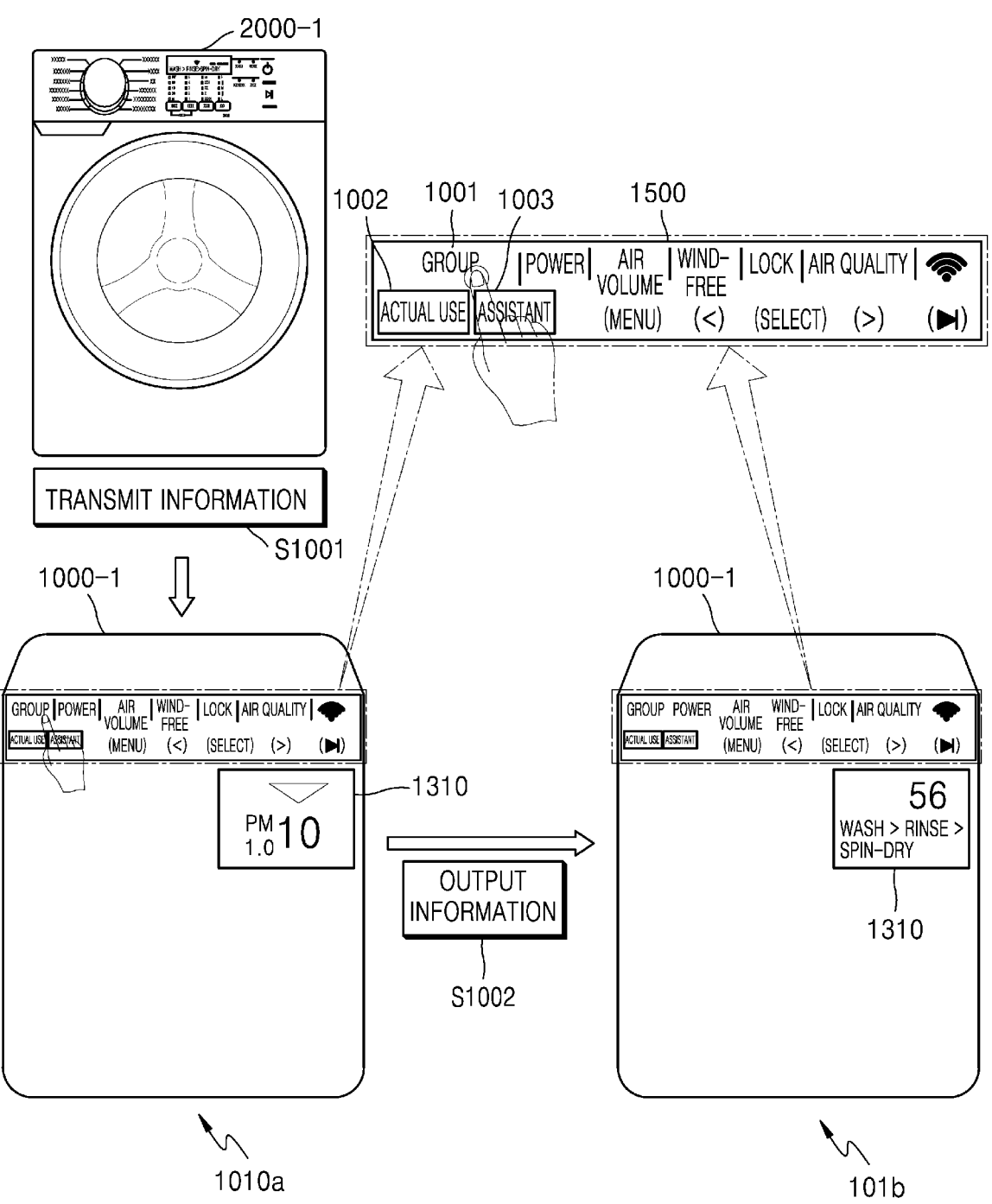
FIG. 10 illustrates an operation by which a first home appliance operating as an assistant device outputs information of a second home appliance operating as an actually used device, according to an embodiment of the present disclosure.

FIG. 10 illustrates an operation by which the first home appliance 1000 operating as the assistant device outputs the information of the second home appliance 2000 operating as the actually used device, according to an embodiment of the present disclosure. In FIG. 10, an example in which the first home appliance 1000 assigned as the assistant device is the air purifier 1000-1 and the second home appliance 2000 assigned as the actually used device is the washing machine 2000-1 will be described.

Referring to a reference numeral 1010a of FIG. 10, the air purifier 1000-1 may receive an input of selecting the group button 1001 included in the user input interface 1500. Here, when the air purifier 1000-1 and the washing machine 2000-1 are grouped, the air purifier 1000-1 may activate the group mode and operate as the assistant device of the washing machine 2000-1, according to the role information.

Meanwhile, the washing machine 2000-1 may also activate the group mode and the washing machine 2000-1 may operate as the actually used device according to the role information. Accordingly, the washing machine 2000-1 may perform the washing operation that is the original functions while transmitting information related to the washing operation to the air purifier 1000-1 (operation S1001).

Referring to a reference numeral 1010b of FIG. 10, the air purifier 1000-1 may output, on the display 1310, the information received from the washing machine 2000-1 (operation S1002). Here, the air purifier 1000-1 may identify the UI information of the washing machine 2000-1 and output the information related to the washing operation, based on the UI information of the washing machine 2000-1. For example, the air purifier 1000-1 may display, on the display 1310, information indicating that the washing operation is performed according to processes of "wash>rinse>spin-dry", and a total time is "56 minutes".

When the air purifier 1000-1 is performing the original functions, the air purifier 1000-1 may alternately display, on the display 1310, information related to the original functions (e.g., PM 1.0 10) and the information related to the washing operation (e.g., wash>rinse>spin-dry 56).

Figure 11:
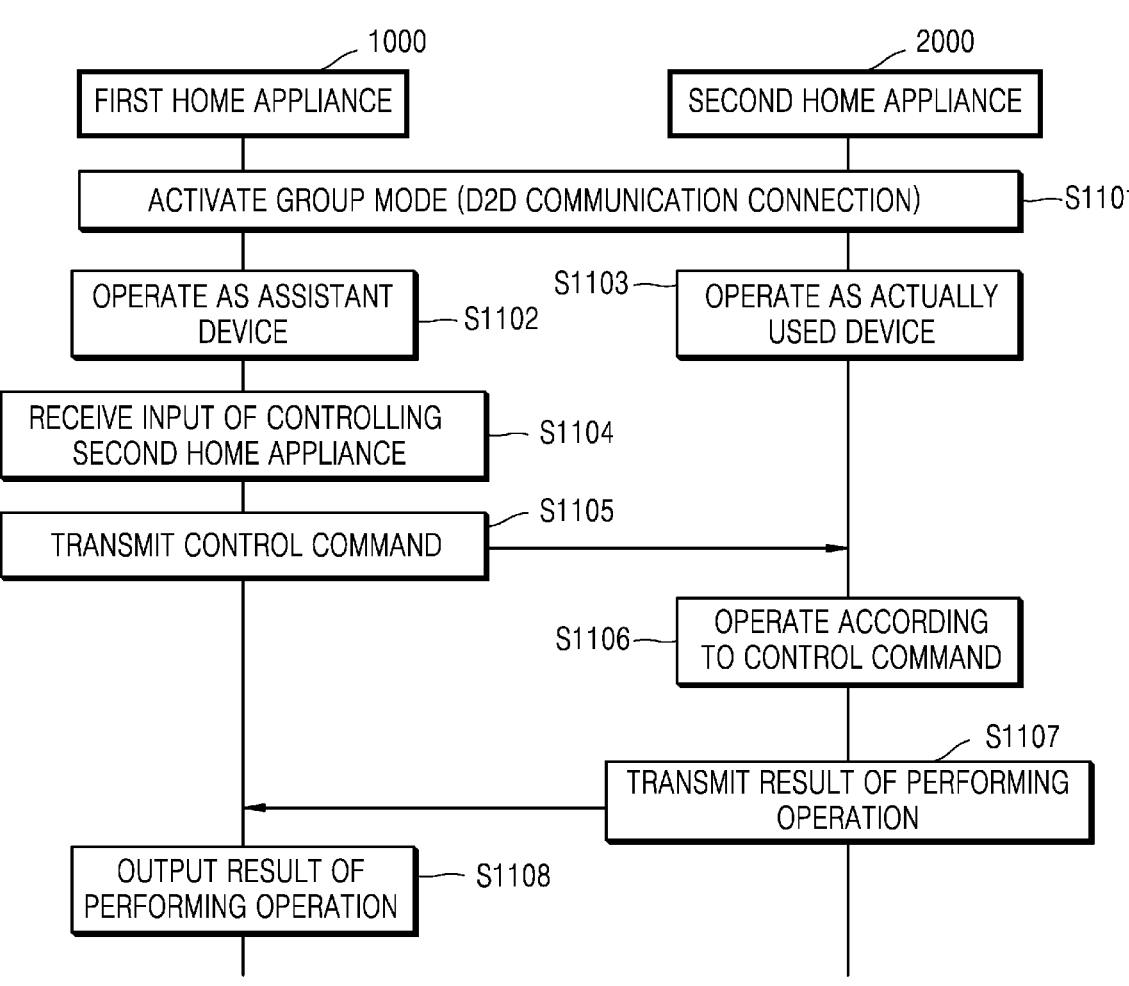
FIG. 11 illustrates a method by which a first home appliance operating as an assistant device controls a second home appliance operating as an actually used device, according to an embodiment of the present disclosure.

FIG. 11 illustrates a method by which the first home appliance 1000 operating as the assistant device controls the second home appliance 2000 operating as the actually used device, according to an embodiment of the present disclosure. In FIG. 11, an example in which the grouping between the first home appliance 1000 and the second home appliance 2000 is completed will be described.

In operation S1101, the first home appliance 1000 and the second home appliance 2000, according to an embodiment of the present disclosure, may activate the group mode. For example, when the user presses a group button of at least one of the first home appliance 1000 or the second home appliance 2000, the first home appliance 1000 and the second home appliance 2000 may activate the group mode. When the group mode is activated, the first home appliance 1000 and the second home appliance 2000 may transmit/receive data through the D2D communication channel (e.g., the short-range wireless communication channel).

In operation S1102, the first home appliance 1000 according to an embodiment of the present disclosure may operate as the assistant device of the second home appliance 2000. For example, when the group mode is activated, the first home appliance 1000 may identify the role information in the group of the first home appliance 1000. When the role of the first home appliance 1000 is the assistant device, based on a result of identifying the role information in the group, the first home appliance 1000 may operate as the assistant device. The first home appliance 1000 may operate as the assistant device of the second home appliance 2000 by outputting the operation information of the second home appliance 2000, received from the second home appliance 2000.

In operation S1103, the second home appliance 2000 according to an embodiment of the present disclosure may operate as the actually used device. For example, when the group mode is activated, the second home appliance 2000 may identify the role information in the group of the second home appliance 2000. When the role of the second home appliance 2000 is the actually used device, based on a result of identifying the role information in the group, the second home appliance 2000 may operate as the actually used device. The second home appliance 2000 may operate as the actually used device by providing the operation information of the second home appliance 2000 to the first home appliance 1000.

In operation S1104, the first home appliance 1000 according to an embodiment of the present disclosure may receive an input of controlling the second home appliance 2000. For example, when the group mode is activated, the first home appliance 1000 may activate a group function button or a group function GUI corresponding to functions related to the group mode. The group function button or the group function GUI may include a control button or a control GUI for controlling the second home appliance 2000.

The first home appliance 1000 may receive a user input of controlling the second home appliance 2000 through the group function button or the group function GUI. The user input of controlling the second home appliance 2000 may include an input of terminating an operation of the second home appliance 2000, an input of pausing an operation of the second home appliance 2000, an input of changing an operating mode of the second home appliance 2000, an input of starting a specific operation of the second home appliance 2000, and an input of initializing an operation of the second home appliance 2000, but is not limited thereto.

In operation S1105, the first home appliance 1000 according to an embodiment of the present disclosure may transmit a control command corresponding to the input of controlling the second home appliance 2000 to the second home appliance 2000. For example, the first home appliance 1000 may transmit, to the second home appliance 2000, the control command through the D2D communication channel (e.g., the Bluetooth communication channel, the BLE communication channel, the WFD communication channel, the Zigbee communication channel, or the Z-wave communication channel).

In operation S1106, the second home appliance 2000 according to an embodiment of the present disclosure may operate according to the control command. For example, the second home appliance 2000 may, based on the control command received from the first home appliance 1000, terminate an operation, pause an operation, change an operating mode, start a specific operation, or initialize an operation, but is not limited thereto.

In operation S1107, the second home appliance 2000 according to an embodiment of the present disclosure may transmit a result of performing an operation to the first home appliance 1000. For example, the second home appliance 2000 may transmit the result of performing an operation through the D2D communication channel (e.g., the Bluetooth communication channel, the BLE communication channel, the WFD communication channel, the Zigbee communication channel, or the Z-wave communication channel).

In operation S1108, the first home appliance 1000 according to an embodiment of the present disclosure may output the result of performing an operation of the second home appliance 2000. For example, the first home appliance 1000 may display the result of performing an operation on a display or may output a speech message indicating the result of performing an operation through a speaker.

According to an embodiment of the present disclosure, even when the second home appliance 2000 is located in a space where the user does not stay often, the user may control operations of the second home appliance 2000 through the first home appliance 1000 grouped with the second home appliance 2000, and thus user convenience is increased. In addition, the user does not need to always hold a mobile terminal (e.g., a smartphone) to remotely control the second home appliance 2000. Meanwhile, the first home appliance 1000 assigned as the assistant device may control the second home appliance 2000 assigned as the actually used device, through the short-range wireless communication without having to connect to an external network through a Wi-Fi router (AP), and thus a control method according to an embodiment of the present disclosure may not be sensitive to communication latency according to a network situation. Hereinafter, a method by which the first home appliance 1000 controls the second home appliance 2000 will be described in more detail with reference to FIG. 12.

Figure 12:
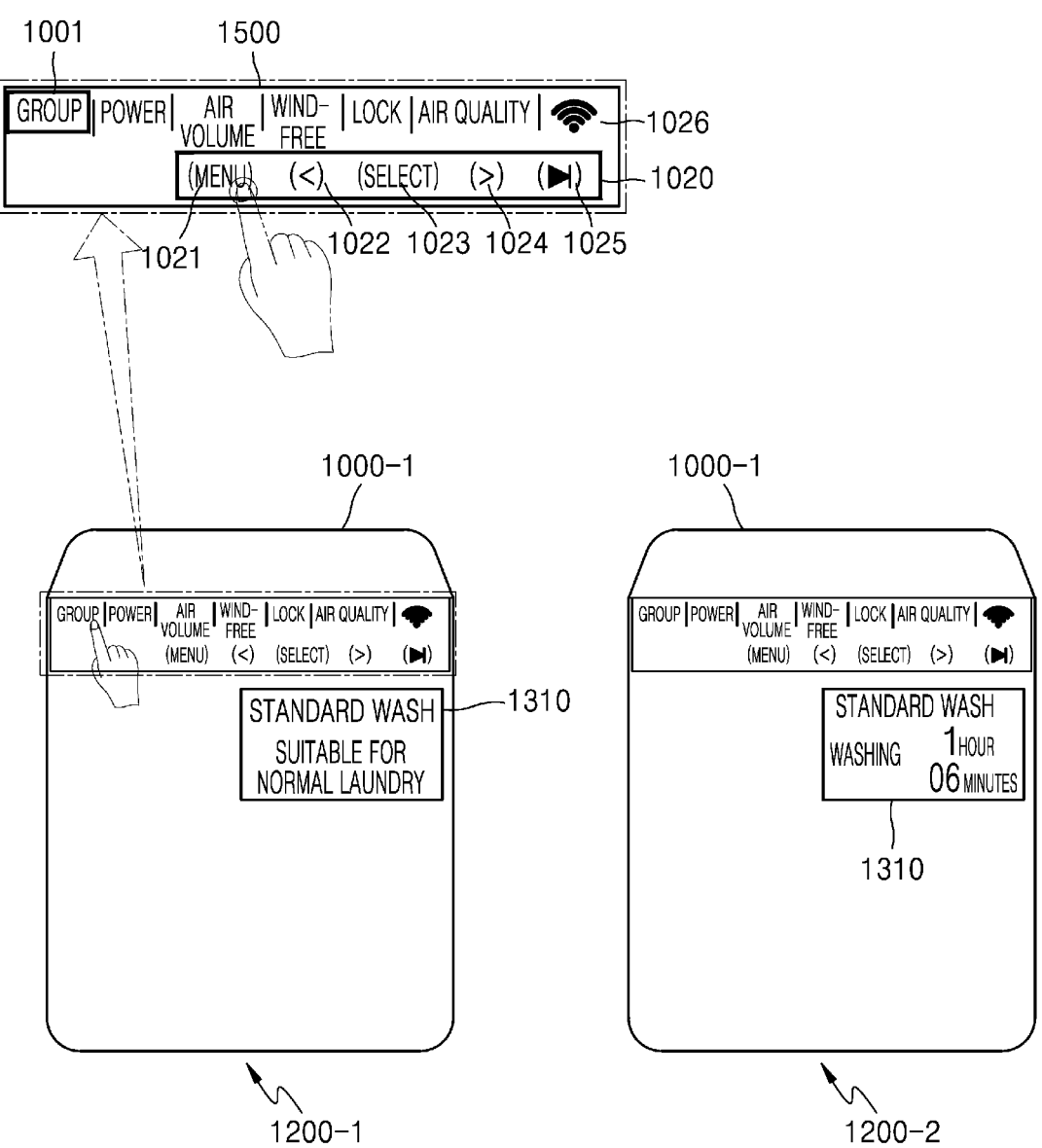
FIG. 12 illustrates an operation by which a first home appliance operating as an assistant device controls a second home appliance operating as an actually used device, according to an embodiment of the present disclosure.

FIG. 12 illustrates an operation by which the first home appliance 1000 operating as the assistant device controls the second home appliance 2000 operating as the actually used device, according to an embodiment of the present disclosure. In FIG. 12, an example in which the first home appliance 1000 operating as the assistant device is the air purifier 1000-1 and the second home appliance 2000 operating as the actually used device is the washing machine 2000-1 will be described.

Referring to a reference numeral 1200-1 of FIG. 12, the air purifier 1000-1 may receive an input of executing the group mode from the user. For example, the air purifier 1000-1 may receive a user input of touching the group button 1001 included in the user input interface 1500. In this case, the air purifier 1000-1 may activate the group mode and activate group function buttons 1020 corresponding to functions related to the group mode. The group function buttons 1020 may include buttons for controlling the actually used device. For example, the group function buttons 1020 may include a menu button 1021, a previous button 1022, a select button 1023, a next button 1024, a pause button 1025, and the like, but are not limited thereto. The user input interface 1500 may include one or more other buttons 1026 for power, air volume, wind-free, lock, air quality, and wireless connection (e.g., Wi-Fi connection).

When the user selects the menu button 1021, the air purifier 1000-1 may display, on the display 1310, a laundry course list (e.g., standard wash, ultra-power wash, ultra-save wash, boiling wash, wool/lingerie, baby clothes, quick wash, and the like). Here, because the display 1310 is not large, the air purifier 1000-1 may not display the laundry course list on one screen, but may sequentially display the laundry course list according to an input of selecting the previous button 1022 or the next button 1024. For example, the air purifier 1000-1 may first display the standard wash on the display 1310, and when the user presses the next button 1024, the ultra-power wash may be displayed on the display 1310 instead of the standard wash, and when the user presses the next button 1024 again, the ultra-save wash may be displayed on the display 1310 instead of the ultra-power wash.

Meanwhile, when the user presses the menu button 1021 longer than a certain time (e.g., 3 seconds), the air purifier 1000-1 may display, on the display 1310, an option function list (e.g., a washing temperature, the number of rinses, a spin speed, a drying level, and the like) corresponding to a laundry course (e.g., the standard wash) being currently displayed or sub-menus (e.g., bubble soak, add laundry, detergent amount, softener amount, drum light, reservation, child protection, and the like) for setting an additional function. Here, the user may use the previous button 1022 or the next button 1024 to control an option or additional function of the washing machine 2000-1.

When the user presses the select button 1023 while the "standard wash" is displayed on the display 1310, the air purifier 1000-1 may transmit a control command to perform a standard wash course to the washing machine 2000-1.

Referring to a reference numeral 1200-2 of FIG. 12, the washing machine 2000-1 may perform the standard wash course according to the control command received from the air purifier 1000-1 while transmitting, to the air purifier 1000-1, operation information (e.g., laundry course information, operating state information, and information about a remaining time until operation completion). Here, the air purifier 1000-1 may display the operation information of the washing machine 2000-1 on the display 1310. For example, the air purifier 1000-1 may display, on the display 1310, the laundry course information (standard wash), the operating state information (e.g., washing), and the information about the remaining time until operation completion (e.g., 1 hour 6 minutes).

Meanwhile, according to an embodiment of the present disclosure, when the user selects the pause button 1025, the air purifier 1000-1 may transmit a control command to pause an operation of the washing machine 2000-1 to the washing machine 2000-1. In this case, the washing machine 2000-1 may pause the operation according to the control command and transmit information indicating a pause state to the air purifier 1000-1. The air purifier 1000-1 may output, on the display 1310, information indicating that the washing machine 2000-1 is in the pause state.

Thus, according to an embodiment of the present disclosure, the user may easily control the washing machine 2000-1 by using the air purifier 1000-1 without having to move to a space where the washing machine 2000-1 is located.

Meanwhile, according to an embodiment of the present disclosure, the user may switch the roles of the air purifier 1000-1 operating as the assistant device and the washing machine 2000-1 operating as the actually used device, through simple manipulation. Hereinafter, an operation of switching roles of an assistant device and an actually used device will be described in detail.

Figure 13A:
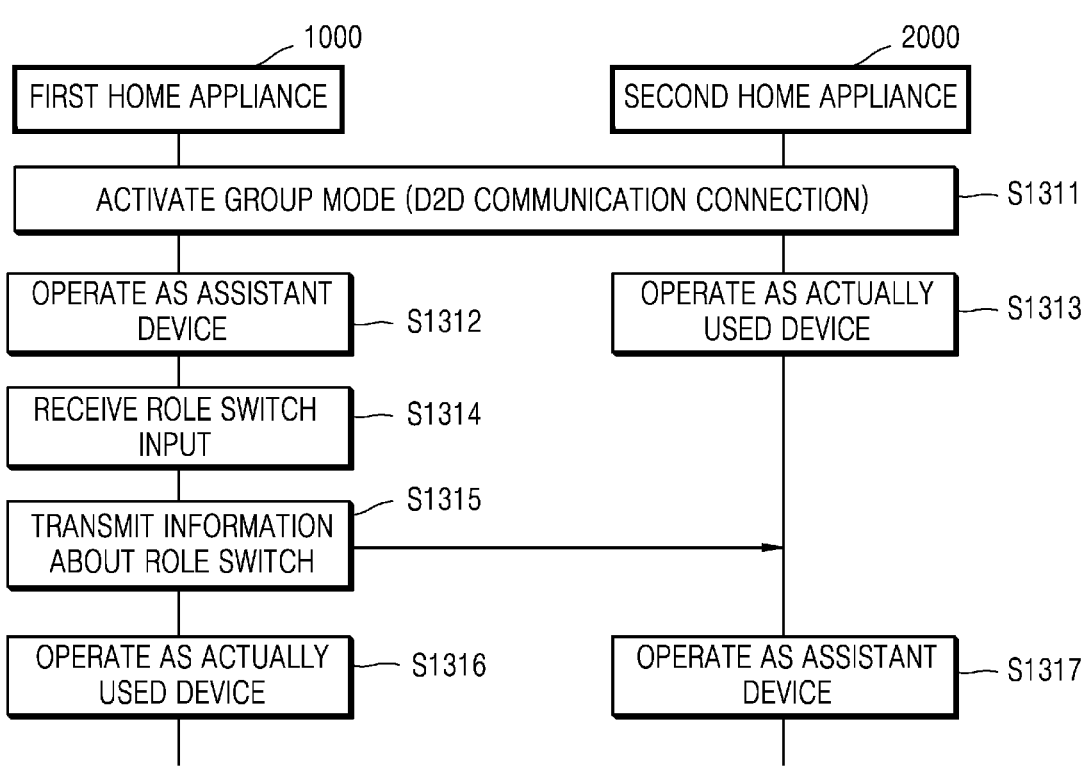
FIG. 13A illustrates a method of switching roles between a first home appliance and a second home appliance, according to an embodiment of the present disclosure.

FIG. 13A illustrates a method of switching the roles between the first home appliance 1000 and the second home appliance 2000, according to an embodiment of the present disclosure.

In operation S1311, the first home appliance 1000 and the second home appliance 2000, according to an embodiment of the present disclosure, may activate the group mode. For example, when the user presses a group button of at least one of the first home appliance 1000 or the second home appliance 2000, the first home appliance 1000 and the second home appliance 2000 may activate the group mode. When the group mode is activated, the first home appliance

1000 and the second home appliance 2000 may transmit/receive data through the D2D communication channel (e.g., the short-range wireless communication channel).

In operation S1312, the first home appliance 1000 according to an embodiment of the present disclosure may operate as the assistant device of the second home appliance 2000. For example, when the group mode is activated, the first home appliance 1000 may identify the role information in the group of the first home appliance 1000. When the role of the first home appliance 1000 is the assistant device, based on a result of identifying the role information in the group, the first home appliance 1000 may operate as the assistant device. The first home appliance 1000 may operate as the assistant device of the second home appliance 2000 by outputting the operation information of the second home appliance 2000, received from the second home appliance 2000.

In operation S1313, the second home appliance 2000 according to an embodiment of the present disclosure may operate as the actually used device. For example, when the group mode is activated, the second home appliance 2000 may identify the role information in the group of the second home appliance 2000. When the role of the second home appliance 2000 is the actually used device, based on a result of identifying the role information in the group, the second home appliance 2000 may operate as the actually used device. The second home appliance 2000 may operate as the actually used device by providing the operation information of the second home appliance 2000 to the first home appliance 1000.

In operation S1314, the first home appliance 1000 according to an embodiment of the present disclosure may receive a role switch input. For example, the first home appliance 1000 may receive an input of changing the roles of the first home appliance 1000 and the second home appliance 2000. The role switch input may be an input of selecting a specific button included in a user input interface of the first home appliance 1000 or a speech input instructing a role switch, but is not limited thereto.

In operation S1315, the first home appliance 1000 according to an embodiment of the present disclosure may transmit information about a role switch to the second home appliance 2000. For example, the first home appliance 1000 may transmit the information about the role switch to the second home appliance 2000 through the D2D communication channel (e.g., the short-range wireless communication channel). The information about the role switch is information indicating that the roles of the first home appliance 1000 and the second home appliance 2000 are switched, and may include at least one of information about a switched role of the first home appliance 1000 or information about a switched role of the second home appliance 2000.

In operation S1316, the first home appliance 1000 according to an embodiment of the present disclosure may operate as an actually used device instead of the assistant device, according to the role switch input. For example, the first home appliance 1000 may stop an operation of outputting the operation information of the second home appliance 2000 and transmit operation information of the first home appliance 1000 to the second home appliance 2000.

In operation S1317, the second home appliance 2000 according to an embodiment of the present disclosure may operate as an assistant device of the first home appliance 1000 instead of the actually used device, based on the information about the role switch, received from the first home appliance 1000. For example, the second home appliance 2000 may operate as the assistant device of the first home appliance 1000 by outputting the operation information of the first home appliance 1000, received from the first home appliance 1000.

Figure 13B:
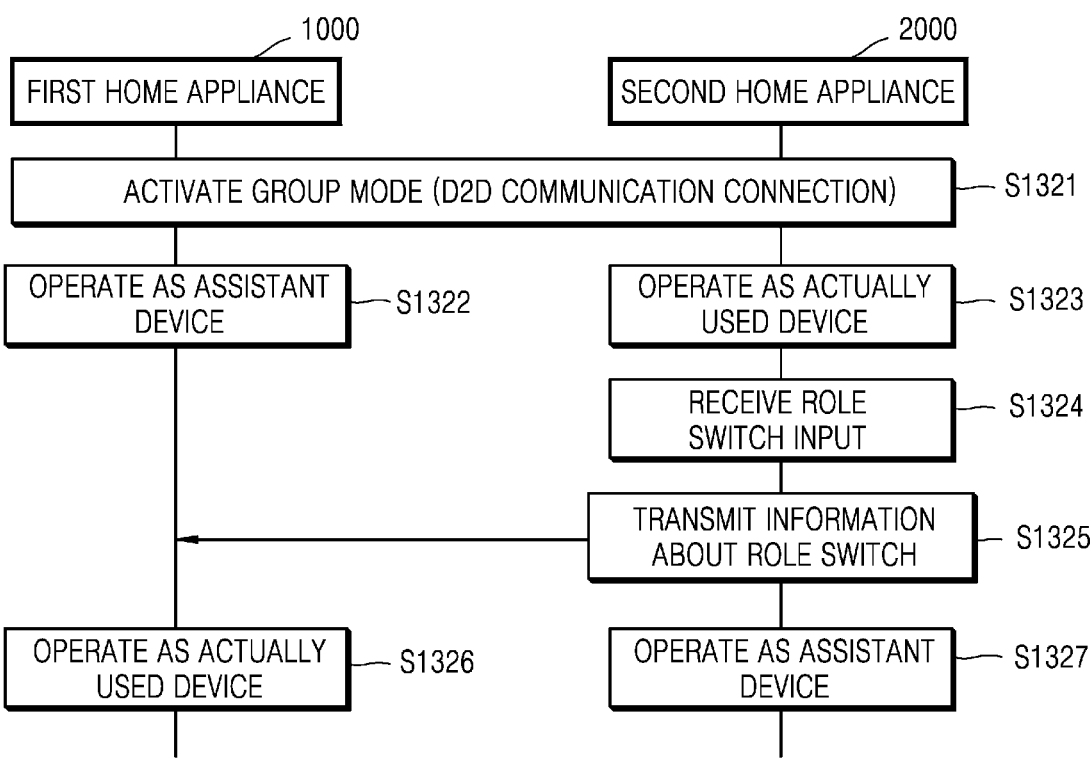
FIG. 13B illustrates a method of switching roles between a first home appliance and a second home appliance, according to an embodiment of the present disclosure.

FIG. 13B illustrates a method of switching the roles between the first home appliance 1000 and the second home appliance 2000, according to an embodiment of the present disclosure.

In operation S1321, the first home appliance 1000 and the second home appliance 2000, according to an embodiment of the present disclosure, may activate the group mode. In operation S1322, the first home appliance 1000 according to an embodiment of the present disclosure may operate as the assistant device of the second home appliance 2000. In operation S1323, the second home appliance 2000 according to an embodiment of the present disclosure may operate as the actually used device. Operations S1321 to S1323 correspond to operations S1311 to S1313 of FIG. 13A, and thus details thereof are not provided again.

In operation S1324, the second home appliance 2000 according to an embodiment of the present disclosure may receive a role switch input. For example, the second home appliance 2000 may receive an input of changing the roles of the first home appliance 1000 and the second home appliance 2000. The role switch input may be an input of selecting a specific button included in a user input interface of the second home appliance 2000 or a speech input instructing a role switch, but is not limited thereto.

In operation S1325, the second home appliance 2000 according to an embodiment of the present disclosure may transmit information about a role switch to the first home appliance 1000. For example, the second home appliance 2000 may transmit the information about the role switch to the first home appliance 1000 through the D2D communication channel (e.g., the short-range wireless communication channel). The information about the role switch is information indicating that the roles of the first home appliance 1000 and the second home appliance 2000 are switched, and may include at least one of information about a switched role of the first home appliance 1000 or information about a switched role of the second home appliance 2000.

In operation S1326, the first home appliance 1000 according to an embodiment of the present disclosure may operate as an actually used device instead of the assistant device, based on the information about the role switch, received from the second home appliance 2000. For example, the first home appliance 1000 may stop an operation of outputting the operation information of the second home appliance 2000 and transmit operation information of the first home appliance 1000 to the second home appliance 2000.

In operation S1327, the second home appliance 2000 according to an embodiment of the present disclosure may operate as an assistant device of the first home appliance 1000 instead of the actually used device, according to the role switch input. For example, the second home appliance 2000 may operate as the assistant device of the first home appliance 1000 by outputting the operation information of the first home appliance 1000, received from the first home appliance 1000.

Figure 14A:
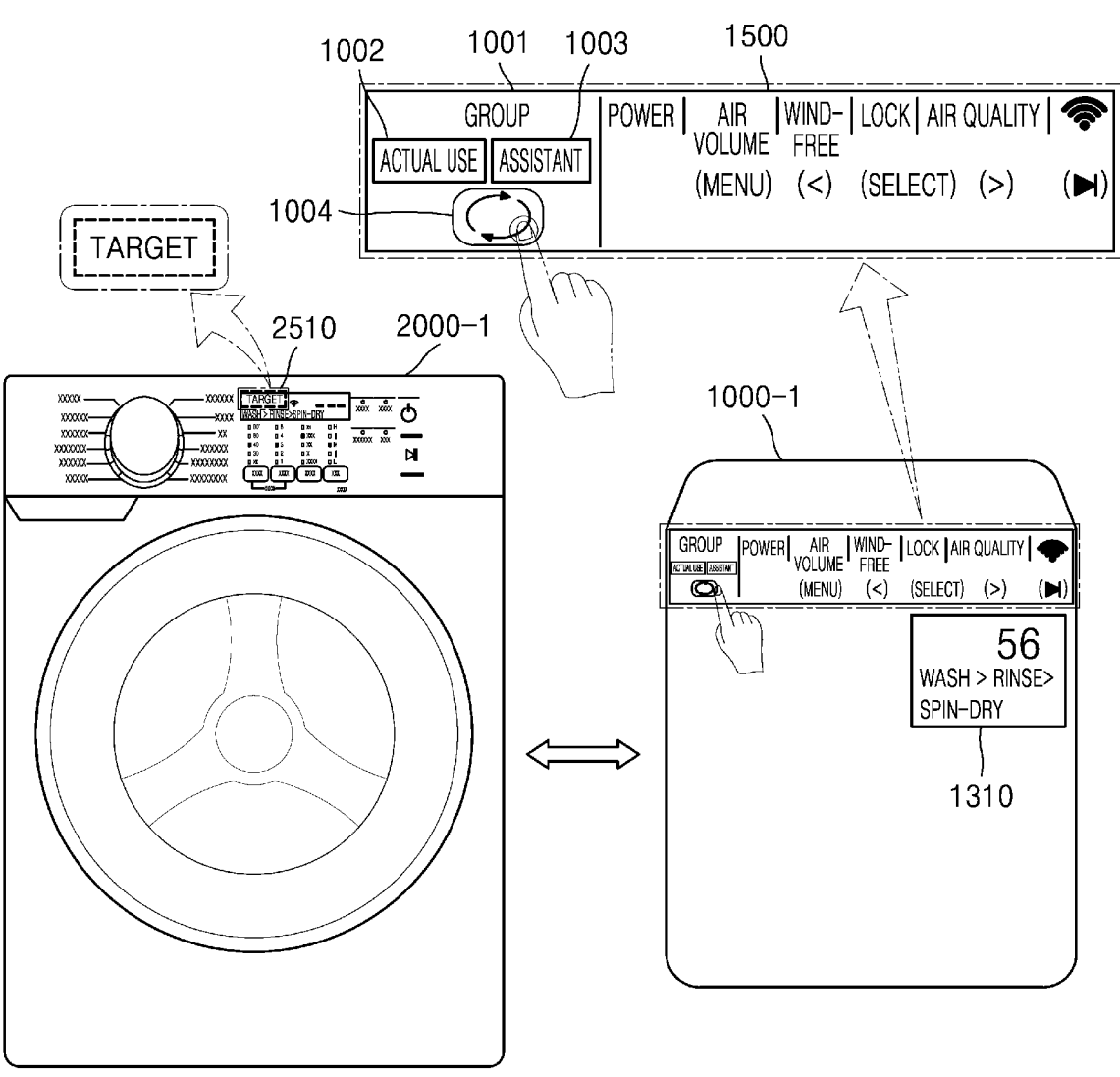
FIG. 14A illustrates an operation of switching roles between a first home appliance and a second home appliance, according to an embodiment of the present disclosure.
Figure 14B:
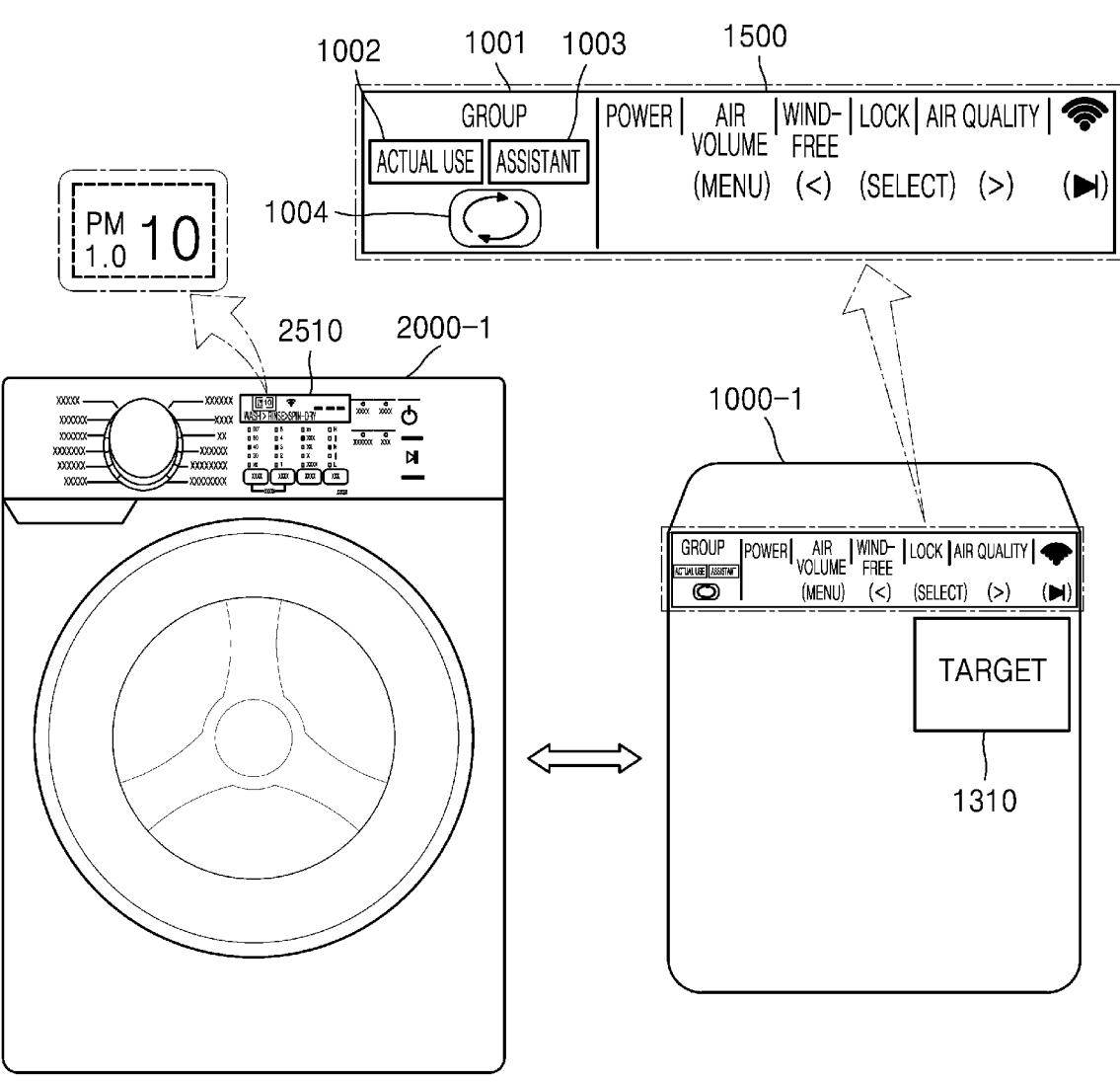
FIG. 14B illustrates an operation of switching roles between a first home appliance and a second home appliance, according to an embodiment of the present disclosure.

FIGS. 14A and 14B are diagrams for describing an operation of switching the roles between the first home appliance 1000 and the second home appliance 2000, according to an embodiment of the present disclosure. In FIGS. 14A and 14B, an example in which the first home appliance 1000 is the air purifier 1000-1 and the second home appliance 2000 is the washing machine 2000-1 will be described.

Referring to FIG. 14A, the washing machine 2000-1 and the air purifier 1000-1 may activate the group mode. Here, the washing machine 2000-1 may operate as the actually used device, based on the role information of the washing machine 2000-1, and the air purifier 1000-1 may operate as the assistant device of the washing machine 2000-1, based on the role information of the air purifier 1000-1. For example, because the washing machine 2000-1 is operating as the actually used device, text ("TARGET") indicating the actually used device may be displayed on the display 2510 of the washing machine 2000-1. Also, because the air purifier 1000-1 is operating as the assistant device of the washing machine 2000-1, the operation information (e.g., wash>rinse>spin-dry, 56) of the washing machine 2000-1 may be displayed on the display 1310 of the air purifier 1000-1.

Here, the user may select a role switch button 1004 included in the user input interface 1500 of the air purifier 1000-1. Upon detecting an input of selecting the role switch button 1004, the air purifier 1000-1 may transmit information about a role switch to the washing machine 2000-1. For example, the air purifier 1000-1 may transmit, to the washing machine 2000-1, information about the switched role of the washing machine 2000-1.

Referring to FIG. 14B, the washing machine 2000-1 may operate as the assistant device of the air purifier 1000-1, based on the information about the switched role, received from the air purifier 1000-1. For example, the washing machine 2000-1 may stop an operation of transmitting the operation information of the washing machine 2000-1 to the air purifier 1000-1 and receive the operation information of the air purifier 1000-1 from the air purifier 1000-1. Also, the washing machine 2000-1 may display, on the display 2510, the operation information (e.g., PM 1.0, 10) of the air purifier 1000-1.

Meanwhile, the air purifier 1000-1 may operate as an actually used device upon detecting the input of selecting the role switch button 1004. For example, the air purifier 1000-1 may display text ("TARGET") indicating the actually used device on the display 1310 and transmit the operation information of the air purifier 1000-1 to the washing machine 2000-1.

In FIGS. 14A and 14B, an example in which the user selects the role switch button 1004 included in the user input interface 1500 of the air purifier 1000-1 has been described, but an embodiment is not limited thereto. For example, the user may select a role switch button arranged in the washing machine 2000-1.

Figure 15:
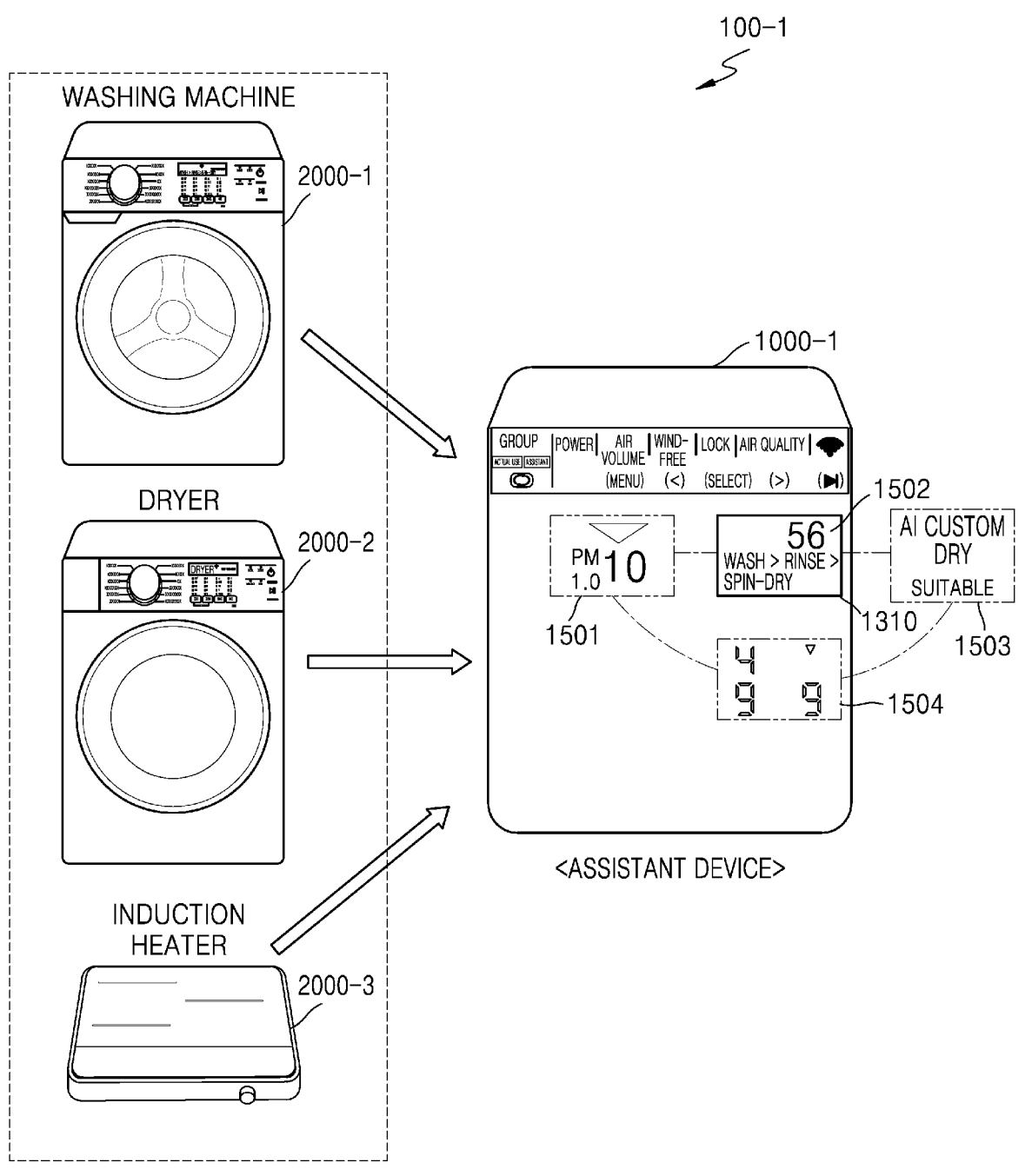
FIG. 15 illustrates a system for grouping a first home appliance operating as an assistant device and a plurality of actually used devices, according to an embodiment of the present disclosure.

FIG. 15 illustrates a system for grouping the first home appliance 1000 operating as an assistant device and a plurality of actually used devices 2000-1, 2000-2, and 2000-3, according to an embodiment of the present disclosure.

According to an embodiment of the present disclosure, a grouping system 100-1 may include one assistant device and a plurality of actually used devices. Here, the one assistant device may be communicably connected to the plurality of actually used devices through a mesh network. For example, when the assistant device operates as P2P GO (soft AP), the assistant device may transmit/receive data to/from the plurality of actually used devices through a WFD communication channel.

Referring to FIG. 15, the washing machine 2000-1, a dryer 2000-2, and an induction heater 2000-3 may operate as actually used devices, and the air purifier 1000-1 may operate as an assistant device. Here, the washing machine 2000-1, the dryer 2000-2, and the induction heater 2000-3 may transmit respective pieces of operation information to the air purifier 1000-1. The air purifier 1000-1 may receive the operation information of the washing machine 2000-1, the operation information of the dryer 2000-2, and the operation information of the induction heater 2000-3, through short-range wireless communication.

The air purifier 1000-1 may display GUIs corresponding to the plurality of actually used devices 2000-1, 2000-2, and 2000-3, on the display 1310. For example, the air purifier 1000-1 may display a first GUI 1501 including operation information of the air purifier 1000-1, a second GUI 1502 including operation information of the washing machine 2000-1, a third GUI 1503 including operation information of the dryer 2000-2, and a fourth GUI 1504 including operation information of the induction heater 2000-3 on the display 1310 at certain time intervals (e.g., 30 seconds). In this case, the user may monitor operating states of the washing machine 2000-1, the dryer 2000-2, and the induction heater 2000-3 together through the air purifier 1000-1 without having to move to respective spaces where the washing machine 2000-1, the dryer 2000-2, and the induction heater 2000-3 are located. Also, the user may control at least one of the washing machine 2000-1, the dryer 2000-2, or the induction heater 2000-3 by using the air purifier 1000-1.

Figure 16:
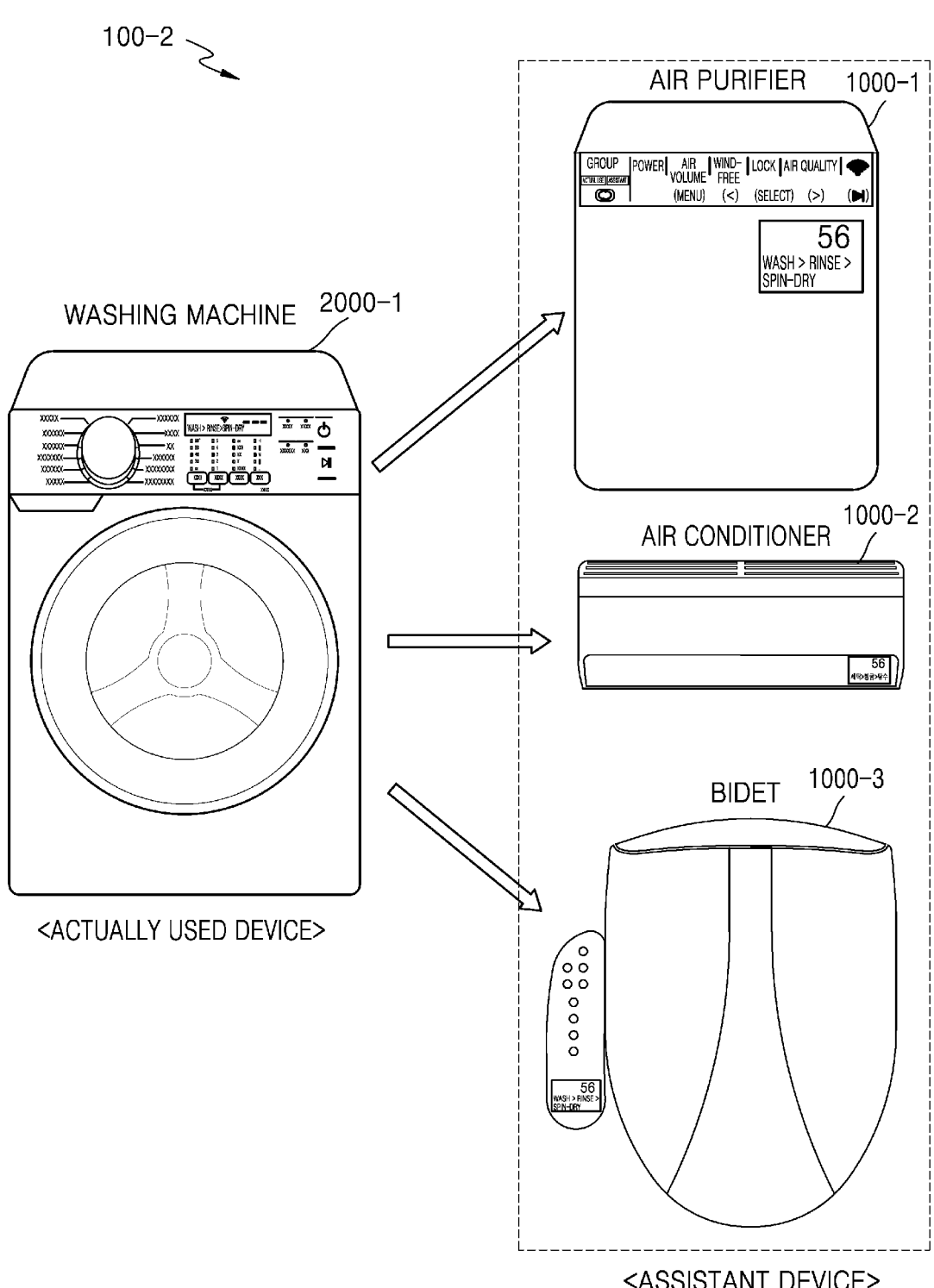
FIG. 16 illustrates a system for grouping a second home appliance operating as an actually used device and a plurality of assistant devices, according to an embodiment of the present disclosure.

FIG. 16 illustrates a system for grouping the second home appliance 2000 operating as an actually used device and a plurality of assistant devices 1000-1, 1000-2, and 1000-3, according to an embodiment of the present disclosure.

According to an embodiment of the present disclosure, a grouping system 100-2 may include one actually used device and a plurality of assistant devices. Here, the one actually used device may be communicably connected to the plurality of assistant devices through a mesh network. For example, when the actually used device operates as P2P GO (soft AP), the actually used device may transmit/receive data to/from the plurality of assistant devices through a WFD communication channel.

Referring to FIG. 16, the washing machine 2000-1 may operate as an actually used device and the air purifier 1000-1, an air conditioner 1000-2, and a bidet 1000-3 may operate as assistant devices. Here, operation information of the washing machine 2000-1 may be transmitted to each of the air purifier 1000-1, the air conditioner 1000-2, and the bidet 1000-3.

In this case, the air purifier 1000-1 may receive the operation information of the washing machine 2000-1 through short-range wireless communication and display the operation information of the washing machine 2000-1 on a display. The air conditioner 1000-2 may also receive the operation information of the washing machine 2000-1 through short-range wireless communication and display the operation information of the washing machine 2000-1 on a display. The bidet 1000-3 may also receive the operation information of the washing machine 2000-1 through short-range wireless communication and display the operation information of the washing machine 2000-1 on a display. In this case, the user may monitor an operating state of the washing machine 2000-1 through various assistant devices located nearby (the air purifier 1000-1, the air conditioner 1000-2, and the bidet 1000-3). Also, the user may control the washing machine 2000-1 by using at least one of the air purifier 1000-1, the air conditioner 1000-2, or the bidet 1000-3.

Figure 17:
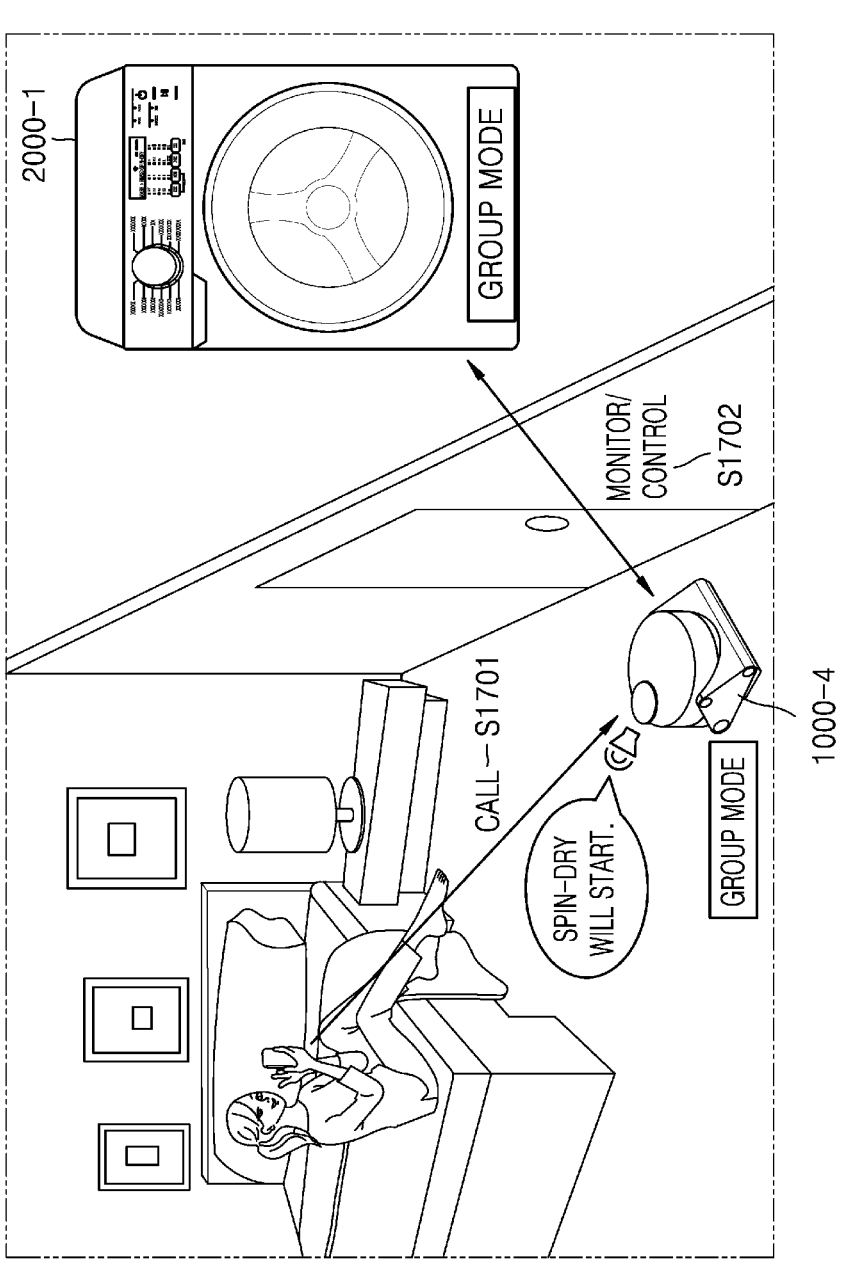
FIG. 17 illustrates a cleaning robot operating as an assistant device of a second home appliance, according to an embodiment of the present disclosure.

FIG. 17 illustrates a cleaning robot 1000-4 operating as an assistant device of the second home appliance 2000, according to an embodiment of the present disclosure.

According to an embodiment of the present disclosure, the cleaning robot 1000-4 and the washing machine 2000-1 may be grouped based on a user input of assigning the cleaning robot 1000-4 as an assistant device and the washing machine 2000-1 as an actually used device.

Referring to FIG. 17, the cleaning robot 1000-4 may move to a location assigned by the user (e.g., around the user) according to calling of the user. For example, the user may call the cleaning robot 1000-4 near a sofa by using an application installed in the mobile terminal 4000 while sitting on the sofa (operation S1701). In this case, the cleaning robot 1000-4 may move near the sofa.

Meanwhile, when a group mode is activated, the cleaning robot 1000-4 may operate as an assistant device of the washing machine 2000-1. Accordingly, the cleaning robot 1000-4 may receive operation information from the washing machine 2000-1 and output the received operation information to monitor or control the washing machine 2000-1 (operation S1702). For example, when operation information indicating that spin-dry will start is received from the washing machine 2000-1, the cleaning robot 1000-4 may output a speech message of "Spin-dry will start" to provide information about the washing machine 2000-1 that is an actually used device to the user. In this case, the user may monitor an operating state of the washing machine 2000-1 or control the washing machine 2000-1 by calling the cleaning robot 1000-4 without having to move to a place where the washing machine 2000-1 is installed, and thus user convenience may be increased.

Figure 18:
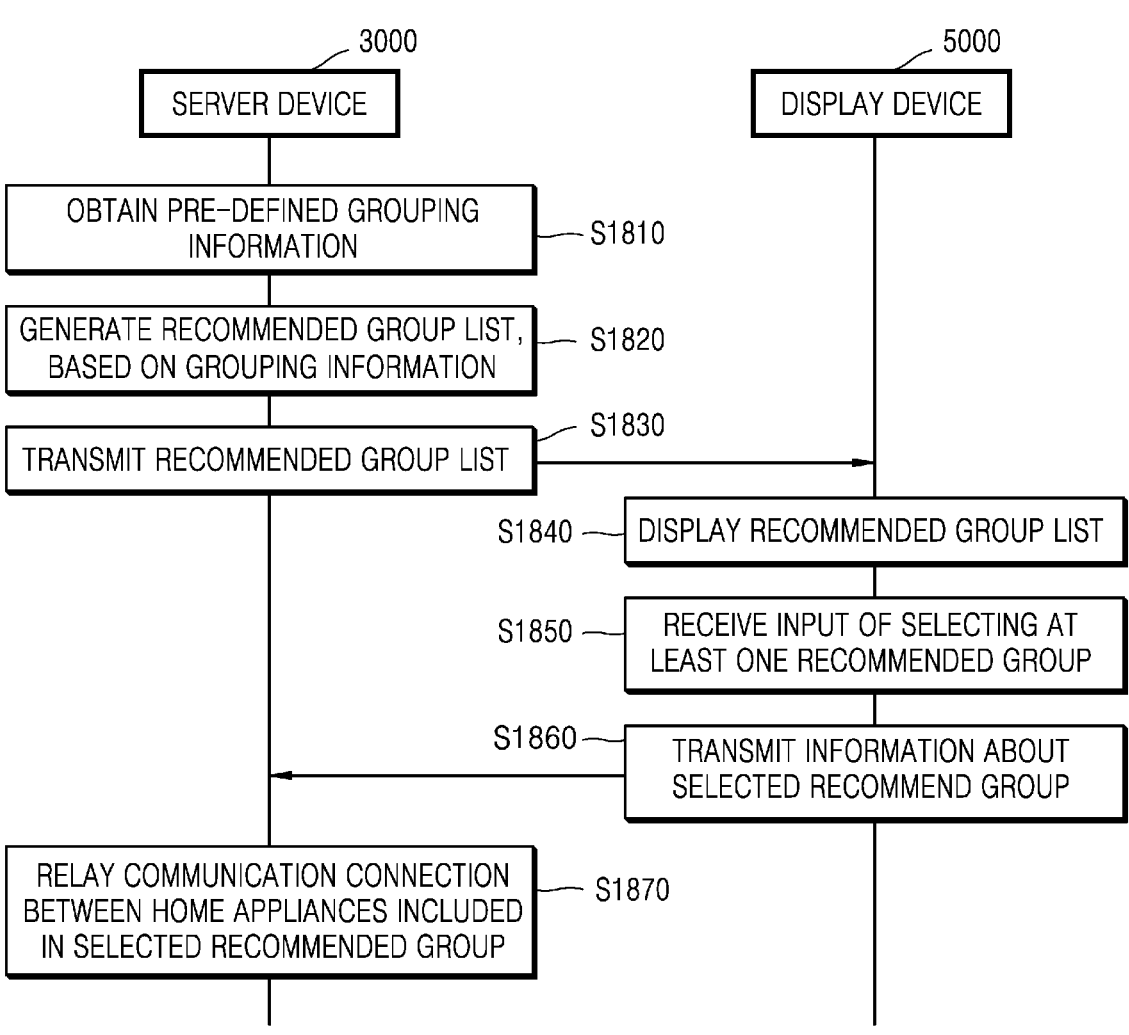
FIG. 18 illustrates a method by which a server device recommends a group of home appliances, according to an embodiment of the present disclosure.

FIG. 18 illustrates a method by which the server device 3000 recommends a group of home appliances, according to an embodiment of the present disclosure.

In operation 51810, the server device 3000 may obtain pre-defined grouping information. The pre-defined grouping information is information about pre-defined groups and may include information about home appliances included in the pre-defined groups, information about the number of times the pre-defined groups are used, and information about a user who defined groups (e.g., an age of the user, a gender of the user, and the like), but is not limited thereto.

In operation S1820, the server device 3000 may generate a recommended group list, based on the grouping information.

According to an embodiment of the present disclosure, the server device 3000 may generate the recommended group list by matching a plurality of home appliances. For example, referring to a reference numeral 1900-1 of FIG. 19, the server device 3000 may generate the recommended group list including a first recommended group 1911 in which a cleaning robot and an air conditioner are matched, a second recommended group 1912 in which an induction heater and a cleaning robot are matched, and a third recommended group 1913 in which a dryer and an induction heater are matched.

According to an embodiment of the present disclosure, the server device 3000 may generate the recommended group list, considering utilization of the user. For example, the server device 3000 may generate the recommended group list, based on information about the number of times the user uses a home appliance, context information of the user collected from the mobile terminal 4000 of the user (e.g., information about a time when the user mainly stays inside a house, information about a space where the user mainly stays inside the house, and the like), and information about a group selected by other users.

For example, when the number of times the user uses home appliances located in a kitchen is great, the server device 3000 may generate the recommended group list by matching a home appliance located in the kitchen and a home appliance located in a space where the user does not go frequently. Also, when the user mainly stays in a living room, based on a result of the server device 3000 analyzing location information of the user, received from the mobile terminal 4000 of the user, the server device 3000 may generate the recommended group list by matching an air purifier located in the living room and a dryer located in a balcony where the user does not go often. Meanwhile, when other users use a group, in which an air conditioner and a cleaning robot are matched, a lot, the server device 3000 may generate the group including an air conditioner and a cleaning robot as a recommended group.

According to an embodiment of the present disclosure, the server device 3000 may generate the recommended group list by using an artificial intelligence model. The artificial intelligence model may be generated or refined by learning groups used by users. The artificial intelligence model may be stored in a memory of the server device 3000 and continuously refined.

In operation 51830, the server device 3000 may transmit the recommended group list to the display device 5000. For example, when an application is executed in the display device 5000, the server device 3000 may provide the recommended group list to the display device 5000 through the application. The application executed by the display device 5000 may be an application providing a service related to a home appliance.

In operation S1840, the display device 5000 may display the recommended group list. For example, the display device 5000 may display the recommended group list on an execution screen of the application.

Figure 19:
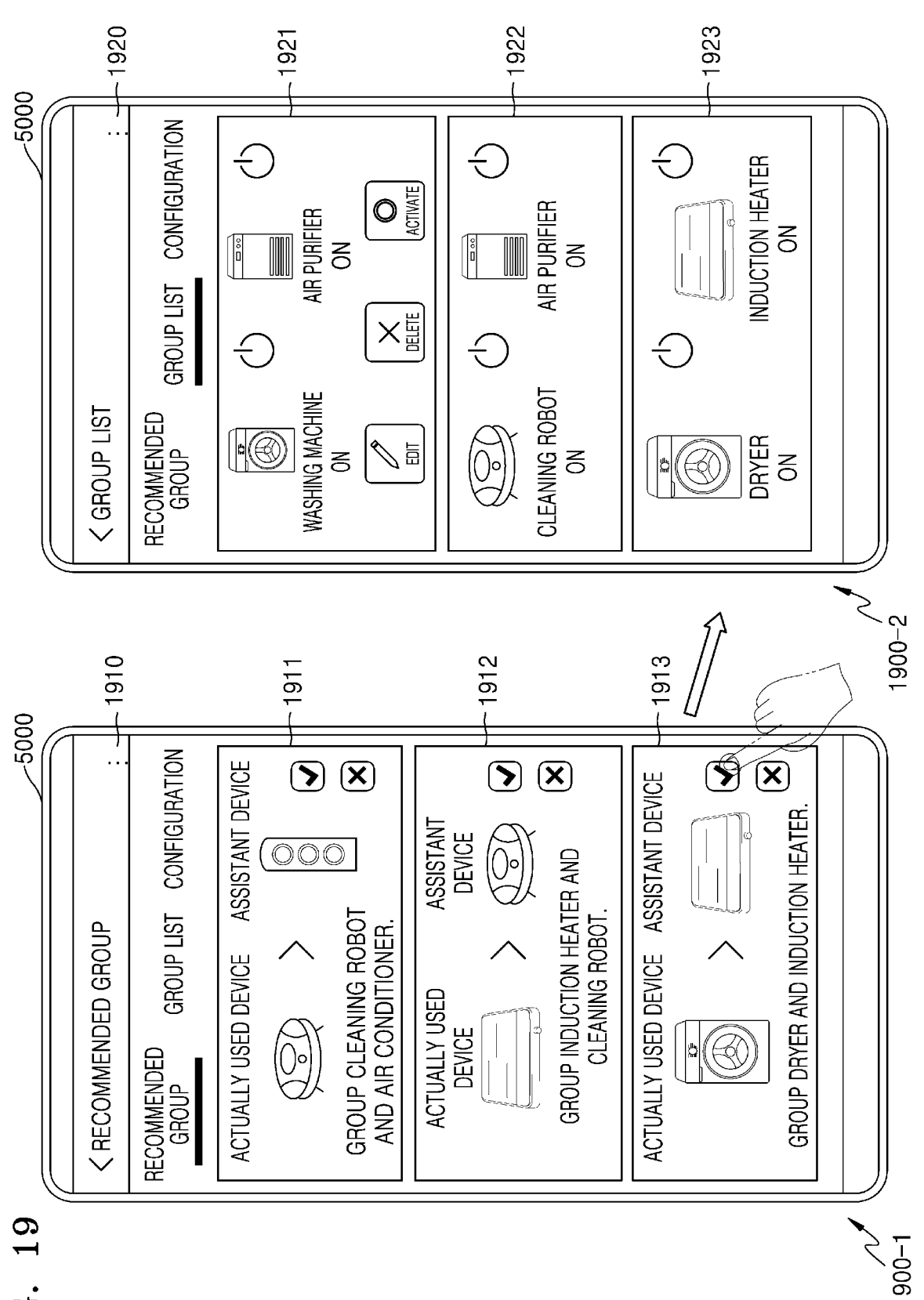
FIG. 19 illustrates an operation by which a server device provides a recommended group and a group list, according to an embodiment of the present disclosure.

Referring to the reference numeral 1900-1 of FIG. 19, the display device 5000 may display, on a recommended group screen 1910, the first recommended group 1911 in which a cleaning robot is operating as an actually used device and an air conditioner is operating an assistant device, the second recommended group 1912 in which an induction heater is operating as an actually used device and a cleaning robot is operating as an assistant device, and the third recommended group 1913 in which a dryer is operating as an actually used device and an induction heater is operating as an assistant device.

In operation S1850, the display device 5000 may receive, from the user, an input of selecting at least one recommended group from the recommended group list. For example, referring to the reference numeral 1900-1 of FIG. 19, the display device 5000 may receive an input of selecting the third recommended group 1913 from the recommended group screen 1910.

Referring to a reference numeral 1900-2 of FIG. 19, the display device 5000 may display, on a group list screen 1920, the third recommended group 1913 selected by the user from the recommended group screen 1910. For example, the display device 5000 may additionally display a third group 1923 corresponding to the third recommended group 1913 at a last field of the group list screen 1920. The group list screen 1920 may be a screen providing a list of groups in which an assistant device and an actually used device are matched by the user. For example, the group list screen 1920 may display a first group 1921 in which a washing machine and an air purifier are matched, a second group 1922 in which a cleaning robot and an air purifier are matched, and the third group 1923 in which a dryer and an induction heater are matched.

Referring back to FIG. 18, in operation S1860, the display device 5000 may transmit information about the selected recommended group to the server device 3000. For example, the server device 3000 may obtain the information about the recommended group selected by the user, through an application executed by the display device 5000.

In operation 51870, the server device 3000 may relay communication connection between home appliances included in the selected recommended group.

For example, referring to the reference numeral 1900-1 of FIG. 19, the server device 3000 may transmit information (e.g., identification information of the dryer, communication connection information of the dryer, and role information of the dryer) about the dryer to the induction heater operating as an assistant device, from among home appliances included in the third recommended group 1913. Here, the induction heater may request the dryer for communication connection, based on the communication connection information, and when the dryer responds to the request, the induction heater and the dryer may be communicably connected to each other. Meanwhile, the server device 3000 may transmit at least one of role information of the induction heater (e.g., an assistant device) or the role information of the dryer (e.g., an actually used device) to at least one of the induction heater or the dryer. Then, when group modes of the induction heater and the dryer are activated, the induction heater may operate as the assistant device of the dryer.

According to an embodiment of the present disclosure, the user may receive, from the server device 3000, a recommendation on a useful group, and easily perform grouping of home appliances included in a recommended group through the application.

Figure 20:
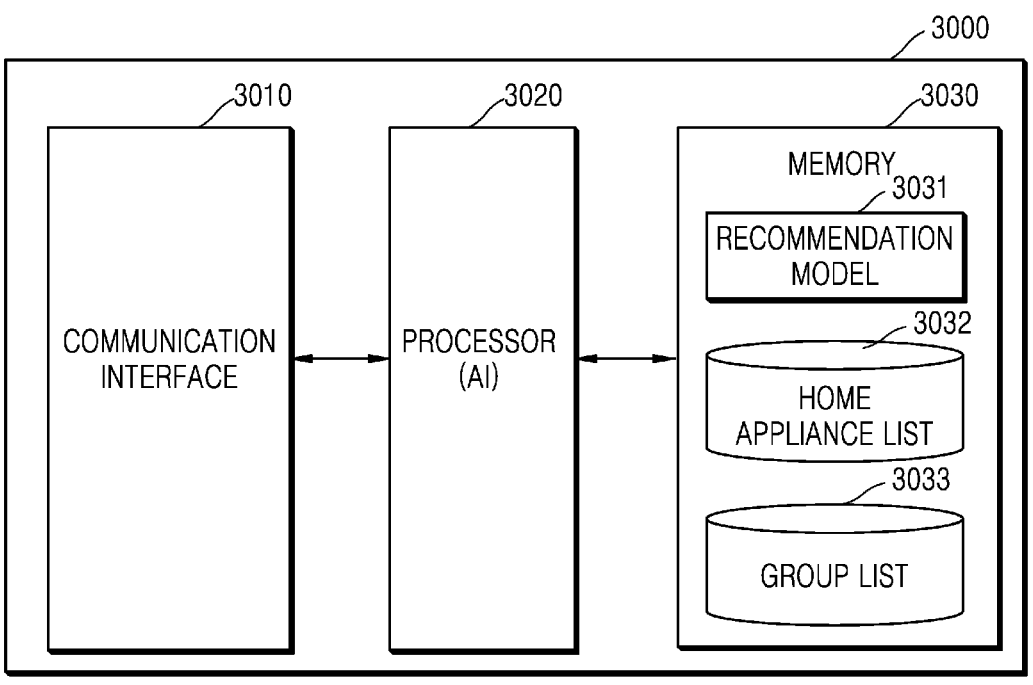
FIG. 20 is a block diagram for describing functions of a server device, according to an embodiment of the present disclosure.

FIG. 20 is a block diagram for describing functions of the server device 3000, according to an embodiment of the present disclosure.

According to an embodiment of the present disclosure, the server device 3000 may include a communication interface 3010, a processor 3020, and a memory 3030. However, not all of the components shown in FIG. 20 are essential components. The server device 3000 may be implemented by more components than those illustrated in FIG. 20 or the server device 3000 may be implemented by fewer components than those illustrated in FIG. 20.

Hereinafter, the above components will be described.

The communication interface 3010 may include one or more components enabling communication between the server device 3000 and home appliances, between the server device 3000 and the mobile terminal 4000, or between the server device 3000 and the display device 5000.

The communication interface 3010 may receive information of home appliances from the home appliances. For example, the communication interface 3010 may obtain operation information of the home appliances, identification information of the home appliances, and communication connection information of the home appliances. The communication interface 3010 may transmit data to the home appliances. For example, the communication interface 3010 may transmit a control command to the home appliances or transmit communication connection information of another home appliance to the home appliances.

The processor 3020 may control all operations of the server device 3000 by using a program or information stored in the memory 3030. For example, the processor 3020 may control the communication interface 3010 and the memory 3030.

The processor 3020 may monitor states of the home appliances by receiving operation information at certain cycles from the home appliances through the communication interface 3010. The processor 3020 may remotely control the home appliances. For example, when the user has registered a control condition in the server device 3000, the processor 3020 may remotely control a corresponding home appliance when the control condition is satisfied. The processor 3020 may control on/off of the home appliance or control an operating mode of the home appliance.

The processor 3020 may receive a user input of grouping the first home appliance 1000 and the second home appliance 2000 through an application. When the user input of grouping the first home appliance 1000 and the second home appliance 2000 is received, the processor 3020 may transmit information about the second home appliance 2000 to the first home appliance 1000 to relay communication connection between the first home appliance 1000 and the second home appliance 2000. The information about the second home appliance 2000 may include the identification information of the second home appliance 2000, the communication connection information of the second home appliance 2000, and the like, but is not limited thereto. The communication connection information of the second home appliance 2000 may be information enabling the first home appliance 1000 to be connected to the second home appliance 2000. For example, when the second home appliance 2000 supports Wi-Fi communication, the communication connection information of the second home appliance 2000 may include a timestamp, identification information (e.g., an SSID, a BSSID or a MAC address), channel information, function information (e.g., tethering capability), and state information, but is not limited thereto. When the second home appliance 2000 supports Bluetooth communication, the communication connection information of the second home appliance 2000 may include a BT address, a product name, and profile information, but is not limited thereto.

The processor 3020 may receive, through the application, a user input of assigning the first home appliance 1000 as an assistant device and assigning the second home appliance 2000 as an actually used device. The processor 3020 may transmit at least one of role information (e.g., the assistant device) of the first home appliance 1000 or role information (e.g., the actually used device) of the second home appliance 2000 to at least one of the first home appliance 1000 or the second home appliance 2000. In this case, when the first home appliance 1000 and the second home appliance 2000 execute group modes, the first home appliance 1000 may operate as the assistant device of the second home appliance 2000.

The memory 0030 may store a program for processes by the processor 3020, and may store pieces of input/output data. For example, the memory 3030 may store a recommendation model 3031, a home appliance list 3032, and a group list 3033.

The recommendation model 3031 may be an artificial intelligence model for generating a recommended group. The recommendation model 3031 may generate a recommended group list by matching a plurality of home appliances. The recommendation model 3031 may generate the recommended group list, considering utilization of the user. For example, the recommendation model 3031 may generate the recommended group list, based on information about the number of times the user uses a home appliance, context information of the user collected from the mobile terminal 4000 of the user (e.g., information about a space where the user mainly stays), and information about a group selected by other users.

The home appliance list 3032 may include information about home appliances registered in the server device 3000. For example, the home appliance list 3032 may include identification information of home appliances, account information of the home appliances, location information of the home appliances, and state information of the home appliances, but is not limited thereto. When a new home appliance is registered in the server device 3000, the home appliance list 3032 may be updated.

The group list 3033 may include home appliance groups that have been grouped by the user. The group list 3033 may include information of home appliances included in each group (identification information, type, and the like), and role information of home appliances included in each group, but is not limited thereto. When grouping of the first home appliance 1000 assigned as the assistant device and the second home appliance 2000 assigned as the actually used device is completed, information about a group in which the first home appliance 1000 and the second home appliance 2000 are matched may be added to the group list 3033.

A method according to an embodiment of the present disclosure may be recorded on a computer-readable recording medium by being implemented in the form of program commands executed by using various computers. The computer-readable recording medium may include at least one of a program command, a data file, or a data structure, independently or collectively. The program commands recorded in the computer-readable recording medium may be specially designed for the present disclosure or understood by one of ordinary skill in the computer software field. Examples of the computer-readable recording medium include magnetic media such as hard disks, floppy disks, and magnetic tapes, optical media such as CD-ROMs and DVDs, magneto-optical media such as floptical disks, and hardware devices specially configured to store and perform program commands, such as read-only memory (ROM), random-access memory (RAM), and flash memory. Examples of the computer command include machine codes generated by a compiler, and high-level language codes executable by a computer by using an interpreter.

Some embodiments of the present disclosure may also be realized in the form of a recording medium including instructions executable by a computer, such as a program module executed by a computer. A computer-readable medium may be an arbitrary available medium accessible by a computer, and includes all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. The communication medium typically includes a computer-readable instruction, a data structure, a program module, other data of a modulated data signal, or another transmission mechanism, and an example thereof includes an arbitrary information transmission medium. In addition, some embodiments of the present disclosure may be implemented as a computer program product or a computer program including computer-executable instructions, such as a computer-executable computer program.

A machine-readable storage medium may be provided in the form of a non-transitory storage medium. Here, the "non-transitory storage medium" denotes a tangible device and does not contain a signal (for example, electromagnetic waves). This term does not distinguish a case where data is stored in the storage medium semi-permanently and a case where the data is stored in the storage medium temporarily. For example, the "non-transitory storage medium" may include a buffer where data is temporarily stored.

Furthermore, a method according to an embodiment of the present disclosure may be provided by being included in a computer program product. The computer program products are products that can be traded between sellers and buyers. The computer program product may be distributed in the form of machine-readable storage medium (for example, a compact disc read-only memory (CD-ROM)), or distributed (for example, downloaded or uploaded) through an application store or directly or online between two user devices (for example, smartphones). In the case of online distribution, at least a part of the computer program product (for example, a downloadable application) may be at least temporarily generated or temporarily stored in a machine-readable storage medium, such as a server of a manufacturer, a server of an application store, or a memory of a relay server.

According to various embodiments of the present disclosure, provided are a method and system enabling a user to monitor or control operations of an actually used device through an assistant device at a convenient location by grouping the actually used device and the assistant device according to a user input and outputting, by the assistant device, information of the actually used device.

Also, according to various embodiments of the present disclosure, provided are a method and system enabling the first home appliance 1000 assigned as an assistant device to control the second home appliance 2000 assigned as an actually used device or output information of the second home appliance 2000 through short-range wireless communication, without having to connect to an external network through a Wi-Fi router (AP).

The first home appliance 1000 for outputting information related to the second home appliance 2000, according to an embodiment of the present disclosure, includes: the communication interface 1200 configured to communicate with the second home appliance 2000; the first user interface configured to output the information related to the second home appliance 2000; the memory 1400 storing one or more instructions; and at least one processor 1100. The at least one processor 1100 may be configured to execute the one or more instructions to obtain group information for grouping the first home appliance 1000 and the second home appliance 2000 by assigning the first home appliance 1000 as an assistant device and assigning the second home appliance 2000 as an actually used device. The at least one processor 1100 may activate a group mode for operating the first home appliance 1000 as an assistant device of the second home appliance 2000, based on the group information. The at least one processor 1100 may control the communication interface 1200 to receive information related to operations of the second home appliance 2000 from the second home appliance 2000 assigned as the actually used device, through a communication channel established based on communication connection information of the second home appliance 2000, the communication channel for being connected to the second home appliance 2000. The at least one processor 1100 may, in the group mode, output the information related to the operations of the second home appliance 2000 through the first user interface.

The group information according to an embodiment of the present disclosure may include at least one of role information of the first home appliance 1000 indicating that the first home appliance 1000 has been assigned as the assistant device, role information of the second home appliance 2000 indicating that the second home appliance 2000 has been assigned as the actually used device, or communication connection information of the second home appliance 2000.

The at least one processor 1100 according to an embodiment of the present disclosure may obtain the group information through the communication interface 1200 from the server device 3000 that received a user input of assigning the first home appliance 1000 as the assistant device and assigning the second home appliance 2000 as the actually used device.

The at least one processor 1100 may control the communication interface 1200 to establish a short-range wireless communication channel with the mobile terminal 4000 that has been communicably connected to the second home appliance 2000. The at least one processor 1100 may obtain the group information through the short-range wireless communication channel from the mobile terminal 4000.

The at least one processor 1100, according to an embodiment of the present disclosure, may receive an input of assigning the first home appliance 1000 as the assistant device from the user through the first user interface. The communication interface 1200 may obtain, from the second home appliance 2000 through short-range wireless communication, identification information of the second home appliance 2000, role information of the second home appliance 2000 indicating that the second home appliance 2000 has been assigned as the actually used device, and the communication connection information of the second home appliance 2000.

The at least one processor 1100 according to an embodiment of the present disclosure may obtain information about a second user interface corresponding to the second home appliance 2000. The at least one processor 1100 may display a GUI of the second home appliance 2000 on the first user interface, based on the information about the second user interface. The at least one processor 1100 may output the information related to the operations of the second home appliance 2000 through the GUI of the second home appliance 2000.

The at least one processor 1100 according to an embodiment of the present disclosure may alternately display a GUI of the first home appliance 1000 corresponding to original functions of the first home appliance 1000 and the GUI of the second home appliance 2000, on the first user interface.

The at least one processor 1100 according to an embodiment of the present disclosure may, when the second home appliance 2000 includes a plurality of home appliances, display GUIs corresponding to the plurality of home appliances on the first user interface.

The at least one processor 1100 according to an embodiment of the present disclosure may receive an input of controlling the second home appliance 2000. The at least one processor 1100 may control the communication interface 1200 to transmit a control command corresponding to the input of controlling the second home appliance 2000 to the second home appliance 2000 through the communication channel.

The at least one processor 1100 according to an embodiment of the present disclosure may switch operations of the first home appliance 1000 from operations as an assistant device to operations as an actually used device, in response to receiving an input of switching roles of the first home appliance 1000 and the second home appliance 2000.

The at least one processor 1100 according to an embodiment of the present disclosure may, in response to receiving an input of deactivating the group mode, terminate operations as the assistant device while maintaining a communication connection with the second home appliance 2000.

The at least one processor 1100 according to an embodiment of the present disclosure may, in response to receiving an input of requesting to release grouping, release a communication connection with the second home appliance 2000.

A method, performed by the first home appliance 1000, of outputting information related to the second home appliance 2000, according to an embodiment of the present disclosure, includes: obtaining group information for grouping the first home appliance 1000 and the second home appliance 2000 by assigning the first home appliance 1000 as an assistant device and assigning the second home appliance 2000 as an actually used device (S210); activating a group mode for operating the first home appliance 1000 as an assistant device of the second home appliance 2000, based on the group information (S220); receiving information related to operations of the second home appliance 2000 from the second home appliance 2000 assigned as the actually used device, through a communication channel established based on communication connection information of the second home appliance 2000, the communication channel for being connected to the second home appliance 2000 (S230); and outputting the information related to the operations of the second home appliance 2000, in the group mode (S240).

The obtaining of the group information, according to an embodiment of the present disclosure, may include obtaining the group information from the server device 3000 that received a user input of assigning the first home appliance 1000 as the assistant device and assigning the second home appliance 2000 as the actually used device.

The obtaining of the group information, according to an embodiment of the present disclosure, may include: establishing a short-range wireless communication channel with the mobile terminal 4000 that has been communicably connected to the second home appliance 2000; and obtaining the group information from the mobile terminal 4000 through the short-range wireless communication channel.

The obtaining of the group information, according to an embodiment of the present disclosure, may include: receiving an input of assigning the first home appliance 1000 as the assistant device from the user through a first user interface of the first home appliance 1000; and obtaining identification information of the second home appliance 2000, role information of the second home appliance 2000 indicating that the second home appliance 2000 has been assigned as the actually used device, and communication connection information of the second home appliance 2000, from the second home appliance 2000 through short-range wireless communication.

The outputting according to an embodiment of the present disclosure may include: obtaining information of a second user interface corresponding to the second home appliance 2000; displaying, on a first user interface of the first home appliance 1000, a GUI of the second home appliance 2000, based on the information of the second user interface; and outputting information related to operations of the second home appliance 2000 through the GUI of the second home appliance 2000.

The method according to an embodiment of the present disclosure may further include switching operations of the first home appliance 1000 from operations as an assistant device to operations as an actually used device, in response to receiving an input of switching roles of the first home appliance 1000 and the second home appliance 2000.

The method according to an embodiment of the present disclosure may further include, in response to receiving an input of deactivating the group mode, terminating operations as the assistant device while maintaining a communication connection with the second home appliance 2000.

While the embodiments of the present disclosure have been particularly shown and described in detail, it will be understood by one of ordinary skill in the art that various changes in form and details may be made therein without departing from the spirit and scope of the present disclosure as defined by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A first home appliance comprising:
a communication interface configured to communicate with a second home appliance;
a first user interface configured to output information related to the second home appliance; and
at least one processor operably coupled to the communication interface and the first user interface, the at least one processor configured to:
obtain group information for grouping the first home appliance and the second home appliance by assigning the first home appliance as an assistant device and assigning the second home appliance as an actual device, wherein the group information includes communication connection information of the second home appliance comprising a unique address of the second home appliance;
establish a communication channel with the second home appliance based on the communication connection information of the second home appliance included in the group information;
activate, based on establishing the communication channel, a group mode for operating the first home appliance as the assistant device of the second home appliance;
receive information related to operations of the second home appliance from the second home appliance assigned as the actual device via the communication channel established based on communication connection information of the second home appliance, wherein the communication channel is established by the first home appliance to connect with the second home appliance; and
output the information related to the operations of the second home appliance via the first user interface while the group mode is activated,
wherein the communication connection information of the second home appliance is stored at the first home appliance, including capability information of the second home appliance to communicate with external devices to be connected with the second home appliance.

2. The first home appliance of claim 1, wherein the group information comprises at least one of:
role information of the first home appliance indicating that the first home appliance is assigned as the assistant device; or role information of the second home appliance indicating that the second home appliance is assigned as the actual device.

3. The first home appliance of claim 1, wherein the at least one processor is further configured to obtain the group information via the communication interface from a server device that receives a user input for assigning the first home appliance as the assistant device and assigning the second home appliance as the actual device.

4. The first home appliance of claim 1, wherein the at least one processor is further configured to:
   establish a short-range wireless communication channel with a mobile terminal that is connected to the second home appliance; and
   obtain the group information from the mobile terminal via the short-range wireless communication channel.

5. The first home appliance of claim 1, wherein the at least one processor is further configured to receive, from a user via the first user interface, an input for assigning the first home appliance as the assistant device, and
   wherein the communication interface is further configured to obtain, from the second home appliance via a short-range wireless communication channel, identification information of the second home appliance, role information of the second home appliance indicating that the second home appliance is assigned as the actual device, and the communication connection information of the second home appliance.

6. The first home appliance of claim 1, wherein the at least one processor is further configured to:
   obtain information for a second user interface corresponding to the second home appliance;
   display, based on the information for the second user interface, a graphical user interface (GUI) of the second home appliance on the first user interface; and
   output the information related to the operations of the second home appliance via the GUI of the second home appliance.

7. The first home appliance of claim 6, wherein the at least one processor is further configured to, when the second home appliance comprises a plurality of home appliances, display, on the first user interface, GUIs corresponding to the plurality of home appliances.

8. The first home appliance of claim 1, wherein the at least one processor is further configured to display, on the first user interface, a graphical user interface (GUI) of the first home appliance corresponding to original functions of the first home appliance and a GUI of the second home appliance.

9. The first home appliance of claim 1, wherein the at least one processor is further configured to receive an input for controlling the second home appliance and transmit, to the second home appliance via the communication channel, a control command corresponding to the input for controlling the second home appliance.

10. The first home appliance of claim 1, wherein the at least one processor is further configured to switch operations of the first home appliance from operations as an assistant device to operations as the actual device in response to receiving an input of switching roles of the first home appliance and the second home appliance.

11. The first home appliance of claim 1, wherein the at least one processor is further configured to, in response to receiving an input for deactivating the group mode, terminate operations as the assistant device while maintaining the communication channel established to connect with the second home appliance.

12. The first home appliance of claim 1, wherein the at least one processor is further configured to, in response to receiving an input for requesting to release grouping, release the communication channel established to connect with the second home appliance.

13. A method performed by a first home appliance, the method comprising:
   obtaining group information for grouping the first home appliance and a second home appliance by assigning the first home appliance as an assistant device and assigning the second home appliance as an actual device, wherein the group information includes communication connection information of the second home appliance comprising a unique address of the second home appliance;
   establishing a communication channel with the second home appliance based on the communication connection information of the second home appliance included in the group information;
   activating, based on establishing the communication channel, a group mode for operating the first home appliance as the assistant device of the second home appliance;
   receiving information related to operations of the second home appliance from the second home appliance assigned as the actual device via a communication channel established based on communication connection information of the second home appliance, wherein the communication channel is established by the first home appliance to connect with the second home appliance; and
   outputting the information related to the operations of the second home appliance while the group mode is activated,
   wherein the communication connection information of the second home appliance is stored at the first home appliance, including capability information of the second home appliance to communicate with external devices to be connected with the second home appliance.

14. The method of claim 13, wherein the group information comprises at least one of:
   role information of the first home appliance indicating that the first home appliance is assigned as the assistant device; or
   role information of the second home appliance indicating that the second home appliance has been assigned as the actual device.

15. The method of claim 13, wherein the obtaining of the group information comprises obtaining the group information from a server device that receives a user input for assigning the first home appliance as the assistant device and assigning the second home appliance as the actual device.

16. The method of claim 13, further comprising:
   establishing a short-range wireless communication channel with a mobile terminal that is connected to the second home appliance; and
   obtaining the group information from the mobile terminal via the short-range wireless communication channel.

17. The method of claim 13, further comprising:
   receiving, from a user via a first user interface of the first home appliance, an input for assigning the first home appliance as the assistant device; and
   obtaining, from the second home appliance via a short-range wireless communication channel, identification information of the second home appliance, role information of the second home appliance indicating that the second home appliance is assigned as the used device, and the communication connection information of the second home appliance.

18. The method of claim 13, further comprising:

obtaining information for a second user interface corresponding to the second home appliance;

displaying, based on the information about the second user interface, a graphical user interface (GUI) of the second home appliance on a first user interface of the first home appliance; and outputting the information related to the operations of the second home appliance via the GUI of the second home appliance.

19. The method of claim 18, further comprising, when the second home appliance comprises a plurality of home appliances, displaying, on the first user interface, GUIs corresponding to the plurality of home appliances.

20. The method of claim 13, further comprising displaying, on a first user interface, a graphical user interface (GUI) of the first home appliance corresponding to original functions of the first home appliance and a GUI of the second home appliance.

* * * * *